United States Patent
Douglas et al.

(10) Patent No.: US 11,747,037 B2
(45) Date of Patent: Sep. 5, 2023

(54) BUILDING SYSTEM WITH AN IN-ZONE PLUME CONTROL SYSTEM

(71) Applicant: Johnson Controls Tyco IP Holdings LLP, Milwaukee, WI (US)

(72) Inventors: Jonathan D. Douglas, Mequon, WI (US); Kirk H. Drees, Cedarburg, WI (US); Clay G. Nesler, Washington, DC (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/496,101

(22) Filed: Oct. 7, 2021

(65) Prior Publication Data

US 2022/0113050 A1    Apr. 14, 2022

Related U.S. Application Data

(60) Provisional application No. 63/089,923, filed on Oct. 9, 2020.

(51) Int. Cl.
| | |
|---|---|
| *F24F 11/63* | (2018.01) |
| *F24F 11/00* | (2018.01) |
| *G05B 15/02* | (2006.01) |

(52) U.S. Cl.
CPC .......... *F24F 11/63* (2018.01); *F24F 11/0001* (2013.01); *G05B 15/02* (2013.01)

(58) Field of Classification Search
CPC ........ F24F 11/63; F24F 11/0001; G05B 15/02
See application file for complete search history.

(56) References Cited

U.S. PATENT DOCUMENTS

| | | | | |
|---|---|---|---|---|
| 6,062,977 | A | * | 5/2000 | Hague ...................... F24F 3/16 55/467 |
| 9,447,985 | B2 | | 9/2016 | Johnson |
| 10,359,748 | B2 | | 7/2019 | Elbsat et al. |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

U.S. Appl. No. 63/004,269, dated Apr. 2, 2020, Mc Namara et al.

(Continued)

*Primary Examiner* — Michael W Choi
(74) *Attorney, Agent, or Firm* — Foley & Lardner LLP

(57) ABSTRACT

A building system of a building includes an in-zone plume control system located within a zone of the building, the in-zone plume control system including one or more return air inlets comprising openings to receive one or more air plumes generated by one or more users. The in-zone plume control system includes one or more exhaust outlets configured to exhaust the one or more air plumes, a filter, and a fan configured to draw the one or more air plumes in through the one or more return air inlets, through the filter, and out through the one or more exhaust outlets back into the zone, wherein the filter is configured to filter the one or more air plumes to remove particles from the one or more air plumes before returning the one or more air plumes to the zone.

20 Claims, 46 Drawing Sheets

(56) References Cited

U.S. PATENT DOCUMENTS

| | | | |
|---|---|---|---|
| 10,655,881 | B2 | 5/2020 | Sinha et al. |
| 10,706,375 | B2 | 7/2020 | Wenzel et al. |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,107,390 | B2 | 8/2021 | Taylor et al. |
| 11,156,978 | B2 | 10/2021 | Johnson et al. |
| 2012/0199003 | A1* | 8/2012 | Melikov ............... G16H 50/80 454/192 |
| 2014/0363333 | A1* | 12/2014 | Carr ......................... A61L 9/03 422/123 |
| 2015/0316907 | A1 | 11/2015 | Elbsat et al. |
| 2018/0357577 | A1 | 12/2018 | Elbsat et al. |
| 2019/0347622 | A1 | 11/2019 | Elbsat et al. |
| 2021/0016216 | A1* | 1/2021 | Popa-Simil ............. F24F 3/167 |
| 2021/0313075 | A1 | 10/2021 | McNamara et al. |
| 2021/0356153 | A1 | 11/2021 | Nesler et al. |
| 2021/0358395 | A1 | 11/2021 | Taylor et al. |
| 2022/0203287 | A1 | 6/2022 | Wenger et al. |
| 2022/0203288 | A1 | 6/2022 | Wenger et al. |
| 2022/0205962 | A1 | 6/2022 | Vanderkoy |
| 2022/0207215 | A1 | 6/2022 | Liu et al. |
| 2022/0221184 | A1 | 7/2022 | Gupta et al. |
| 2022/0228756 | A1 | 7/2022 | Gupta et al. |
| 2022/0254483 | A1 | 8/2022 | Boisvert et al. |
| 2022/0277851 | A1 | 9/2022 | Wellig |
| 2022/0282886 | A1 | 9/2022 | Hriljac et al. |
| 2022/0293261 | A1 | 9/2022 | McBrady et al. |
| 2022/0305438 | A1 | 9/2022 | Wenger et al. |
| 2022/0305881 | A1 | 9/2022 | Neu et al. |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System-Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System-JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

(56) References Cited

OTHER PUBLICATIONS

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Alvarado et al., "A Methodology to Monitor Airborne PM10 Dust Particles Using a Small Unmanned Aerial Vehicle," Sensors, 2017, vol. 17 (25 pages).

\* cited by examiner

| Equipment | Baseline | 1 | 2 | 3 | 4 | 5 | 6 |
|---|---|---|---|---|---|---|---|
| Total number of people in place | 50 | 50 | 50 | 50 | 50 | 50 | 50 |
| Probability of someone being sick | 1.000% | 1.000% | 1.000% | 1.000% | 1.000% | 1.000% | 1.000% |
| Number Sick | 0.5 | 0.5 | 0.5 | 0.5 | 0.5 | 0.5 | 0.5 |
| Exposure time (hrs/day) | 1.5 | 1.5 | 1.5 | 1.5 | 1.5 | 1.5 | 1.5 |
| Mask | | | | | | | |

FIG. 14

| Equipment Setup | Baseline | Option 1 | Option 2 | Option 3 | Option 4 | Option 5 | Option 6 |
|---|---|---|---|---|---|---|---|
| Average Airflow (% of design) | 60% | 60% | 60% | 60% | 60% | 60% | 60% |
| Supply Airflow (CFM) | 900 | 900 | 900 | 900 | 900 | 900 | 900 |
| CFM/ft² | 0.692307692 | 0.69231 | 0.69230769 | 0.69230769 | 0.69230769 | 0.6923077 | 0.6923077 |
| Ventilation Rate (%OD Air) | 50% | 50% | 50% | 50% | 50% | 50% | 50% |
| Ventilation Airflow (CFM) | 450 | 450 | 450 | 450 | 450 | 450 | 450 |
| Percentage of ASHRAE 62.1 | 42% | 42% | 42% | 42% | 42% | 42% | 42% |
| Filter Rating | MERV 8 | MERV 11 | MERV 13 | MERV 13 | MERV 13 | MERV 13 | MERV 13 |
| UVC Kill Tunnel Effectiveness (0% = off) | 0% | 0% | 0% | 95% | 95% | 95% | 95% |
| UVC Troffer Percentage 100% = 1/64 ft² | 0% | 0% | 0% | 0% | 50% | 50% | 0% |
| MACH 10 Fan Filter | 0% | 0% | 0% | 0% | 0% | 100% | 0% |

| Equipment Setup | Baseline | Option 1 | Option 2 | Option 3 | Option 4 | Option 5 | Option 6 |
|---|---|---|---|---|---|---|---|
| Infection Risk Results | 12.58617999 | 6.40065 | 6.32055059 | 6.27070716 | 4.51124028 | 3.3147189 | 6.2707072 |
| Infection Risk | | | | | | | |
| Average | 13% | 0.06401 | 0.6320551 | 0.6270707 | 0.0451124 | .0331472 | 0.0627071 |
| Sigma | 0.32537571 | 0.01709 | 0.01686303 | 0.01672543 | 0.01199206 | 0.0088102 | 0.0167254 |
| 95% CI | 0.063773638 | 0.03349 | 0.03305154 | 0.03278185 | 0.02350444 | 0.0172682 | 0.0327818 |
| Ratio | | | | | | | |
| Average | 1 | 0.50737 | 0.50103855 | 0.49709622 | 0.35773745 | 0.2629146 | 0.4970962 |
| Sigma | | 0.00473 | 0.00457006 | 0.00473401 | 0.00712628 | 0.0078642 | 0.004734 |
| 95% CI | 0 | 0.00927 | 0.00895731 | 0.00927866 | 0.01396731 | 0.0154139 | 0.0092787 |
| Costs | | | | | | | |
| Ventilation | | $ - | $ - | $ (128.79) | $ (128.79) | $ (128.79) | $ (128.79) |
| Filter (Energy & Material) | 0 | 7.83731 | 25.5802347 | 25.5802347 | 25.5802347 | 25.580235 | 25.580235 |
| UVC Kill Tunnel | 0 | 0 | 0 | 194.2344 | 194.2344 | 194.2344 | 194.2344 |
| UVC Troffer | $0.00 | $0.00 | $0.00 | $0.00 | $164.70 | $164.70 | $0.00 |
| Mach 10 | $0.00 | $0.00 | $0.00 | $0.00 | $0.00 | $265.99 | $0.00 |
| Total | | $ 7.84 | $ 25.58 | $ 91.02 | $ 255.72 | $ 521.71 | $ 91.02 |

| Building | |
|---|---|
| US City | Chicago |
| Balance Point | 65 |
| Occupancy category (per ASHRAE 62.1) | Health Club Weight Room |
| Area (ft²) | 1300 |
| Ceiling Height (ft) | 10 |
| Volume | 13000 |

| Occupancy | |
|---|---|
| Total number of people in space | 25 |
| ASHRAE 62.1 default occupancy | 13 |
| Occupant Density (ft²/person) | 52 |
| Probability of someone being sick | 1% |
| Number sick | 0.25 |
| Occupied start time | 8:00 PM |
| Occupied end time | 5:00 PM |
| Occupied Days/Week | 5 |
| Exposure time (hrs/day) | 7 |

| Equipment Setup | |
|---|---|
| Supply Airflow | |
| Design Airflow Rate | 1500 |
| Average Airflow % of Design | 900 |
| Supply Airflow ACH | 4.2 |
| ASHRAE 62.1 | |
| Rp | 20.0 |
| Ra | 0.1 |
| Vent floor (CFM) | 78.0 |
| Cooling COP | 3 |
| Gas Heating efficiency | 0.9 |
| Supply fan mechanical efficiency | 0.7 |
| Supply fan electrical efficiency | 0.65 |

| Energy Costs | |
|---|---|
| Electricity ($/kwh) | $0.12 |
| Natural Gas ($/MMBTU) | $8 |

| Other Fixed Parameters | |
|---|---|
| Wells Riley | |
| Quanta Generation Rate | 122.5 |
| Pulmonary Vent Rate (m³/hr) | 3.00 |
| Ventilation Costs | |
| Heating Degree Day | 1492 |
| Cooling Degree Day | 439 |
| 1 ACH Cost | $103.35 |

| Filter Data | |
|---|---|
| Design | |
| Design Airflow (CFM) | 1500 |
| (m³/s) | 0.707921165 |
| Filter Area (ft²) | 4 |
| Face Velocity (fpm) | 375 |
| | |
| Number of filters | 1 |
| Filter life (month) | 3 |
| Franction of day occupied | 0.375 |
| Weeks | 52 |
| Days per week | 5 |
| Time (hours) | 2340 |

| Koch filter data | DP @ 375 fpm | Final DP (3X initial) | Average DP | 24" x 24" cost | Media Area | Filter Efficiency | |
|---|---|---|---|---|---|---|---|
| | | | | | | Average | Sigma |
| MERV 8 | 0.12 | 0.12 | 0.24 | 5.83 | 17 | 0.422 | 0.046162 |
| MERV 11 | 0.17 | 0.17 | 0.51 | 7.2 | 18.4 | 0.682 | 0.079691 |
| MERV 13 | 0.19 | 0.57 | 0.57 | 11.4 | 17.5 | 0.859 | 0.027885 |

| Koch filter data | Energy @ design airflow | Additional Energy | Additional Energy Cost @ design Airflow | Filter Cost | Additional Filter Cost |
|---|---|---|---|---|---|
| MERV 8 | 93.27755872 | 0 | $0.00 | 23.32 | 0 |
| MERV 11 | 132.1432096 | 38.86564988 | $10.91 | 28.8 | 5.48 |
| MERV 13 | 147.6894696 | 54.41190984 | $15.28 | 45.6 | 22.28 |

| Volume (ft³) | | | | Offset | 0 | | |
|---|---|---|---|---|---|---|---|
| 13000 | | | | | Ventilation Rate | Filter Rating | Filter Airflow | | Baseline P |
| | EPA Paper | | | | 450 | MERV 8 | 450 | | Average |
| | Mean | 3 | Mean | 1.65 | N Infector | Exposure | Supply Airflow | Avg Efficiency | Filter ACH | Troffer Weight | 0.150697 |
| | | | | | 0.5 | 1.5 | 900 | 0.4220 | 2.076923077 | 0 | Sigma |
| | Sigma | 0.12797619 | Sigma | 0.331632653 | | | Baseline ACH | Std Deviation | Troffer ACH | | 0.037729 |
| 31.8877551 | | | | | | | 2.076923077 | 0.0462 | 0 | | |
| | | | | | | | | UV Efficiency | Mach ACH | | |
| | | | | | | | | 0% | 0 | | |

2302, 2304, 2306, 2308

| Quanta (q) | Pulmonary Vent Rate | Deposition | Rand | N Infector | Exposure | Vent ACH | Eta_filter | K_filter | K_troffer | Baseline P |
|---|---|---|---|---|---|---|---|---|---|---|
| 139.140856 | 3.357911484 | 2.183658699 | 0.020133027 | 0.5 | 1.5 | 2.076923077 | 0.327321881 | 0.679822368 | 0 | 0.175253 |
| 135.883573 | 2.898491392 | 1.516071081 | 0.033009982 | 0.5 | 1.5 | 2.076923077 | 0.337141452 | 0.700216863 | 0 | 0.170481 |
| 188.119008 | 3.146455354 | 1.314493457 | 0.467916744 | 0.5 | 1.5 | 2.076923077 | 0.418283627 | 0.868742917 | 0 | 0.246537 |
| 86.3717653 | 2.904806362 | 1.458102286 | 0.471961743 | 0.5 | 1.5 | 2.076923077 | 0.41875301 | 0.86971779 | 0 | 0.109568 |
| 121.897278 | 3.016659701 | 1.455171997 | 0.777453574 | 0.5 | 1.5 | 2.076923077 | 0.457250083 | 0.94967325 | 0 | 0.15394 |
| 141.49647 | 3.104025873 | 1.401511893 | 0.740665468 | 0.5 | 1.5 | 2.076923077 | 0.451792701 | 0.938338687 | 0 | 0.183395 |
| 114.598975 | 2.790854598 | 1.312411564 | 0.034432323 | 0.5 | 1.5 | 2.076923077 | 0.338017664 | 0.702036687 | 0 | 0.14723 |
| 106.8361 | 2.796364668 | 1.69272408 | 0.045807978 | 0.5 | 1.5 | 2.076923077 | 0.344128197 | 0.714727795 | 0 | 0.126924 |
| 134.649063 | 3.069905014 | 1.68917242 | 0.477372393 | 0.5 | 1.5 | 2.076923077 | 0.419380348 | 0.871020722 | 0 | 0.166078 |
| 116.797706 | 2.913102566 | 1.813707988 | 0.893425553 | 0.5 | 1.5 | 2.076923077 | 0.479469193 | 0.995820632 | 0 | 0.13226 |
| 105.168985 | 3.102018482 | 1.143382466 | 0.136533521 | 0.5 | 1.5 | 2.076923077 | 0.371405513 | 0.77138068 | 0 | 0.153388 |

FIG. 23

| Area | Floor area | ft² | 1300 |
|---|---|---|---|
| Height | Ceiling height | ft | 10 |
| V | Space volume (ft³) | ft³ | 13000 |
| Lambda_vent | Additional ventilation | ACH | 1 |
| Cp_air | Specific heat of air | BTU/lb f | 0.24 |
| Rho_air | Density of air | lb/ft³ | 0.075 |
| Eta_heating | Heating efficiency | | 0.9 |
| Eta_cooling | Cooling efficiency | | 3 |
| alpha | | | 0.000024 |
| beta | | | 0.007031937 |
| Ecost | Cost of electricity | $/kwh | $0.12 |
| GasCost | Cost of natural gas | $/MMBtu | $8 |

| | CHICAGO O'HARE INTL ARPT | CHARLOTTE DOUGLAS INTL ARPT | HOUSTON BUSH INTERCONTINENTAL | PHOENIX SKY HARBOR INTL ARPT |
|---|---|---|---|---|
| HDD | 1492 | 727.85 | 292.1225 | 242.22 |
| CDD | 439 | 694.2275 | 1149.7775 | 1595.4075 |
| Hcost | $74.463168 | $36.33 | $14.58 | $12.09 |
| Ccost | $28.89 | $45.69 | $75.68 | $105.01 |
| Total Cost | $103.3509308 | $82.03 | $90.26 | $117.10 |

| Date (MM/DD/YYYY) | Time (HH:MM) | ETA (W/m²) | ETRN (W/m²) | GHI (W/m²) | GHI Source | GHI uncert (%) | DNI (W/m²) | DNI Source | DNI uncert (%) | DHI (W/m²) | DHI Source | DHI uncert (%) |
|---|---|---|---|---|---|---|---|---|---|---|---|---|
| 1/1/1986 | 1:00 | 0 | 0 | 0 | | 0 | 0 | | 0 | 0 | | 0 |
| 1/1/1986 | 2:00 | 0 | 0 | 0 | 1 | 0 | 0 | 1 | 0 | 0 | 1 | 0 |
| 1/1/1986 | 3:00 | 0 | 0 | 0 | 1 | 0 | 0 | 1 | 0 | 0 | 1 | 0 |
| 1/1/1986 | 4:00 | 0 | 0 | 0 | 1 | 0 | 0 | 1 | 0 | 0 | 1 | 0 |
| 1/1/1986 | 5:00 | 0 | 0 | 0 | 1 | 0 | 0 | 1 | 0 | 0 | 1 | 0 |
| 1/1/1986 | 6:00 | 0 | 0 | 0 | 1 | 0 | 0 | 1 | 0 | 0 | 1 | 0 |
| 1/1/1986 | 7:00 | 0 | 0 | 0 | 1 | 0 | 0 | 1 | 0 | 0 | 1 | 0 |
| 1/1/1986 | 8:00 | 43 | 908 | 12 | 1 | 13 | 22 | 1 | 13 | 10 | 1 | 13 |
| 1/1/1986 | 9:00 | 236 | 1415 | 115 | 1 | 13 | 397 | 1 | 9 | 47 | 1 | 13 |
| 1/1/1986 | 10:00 | 410 | 1415 | 244 | 1 | 9 | 587 | 1 | 13 | 71 | 1 | 13 |
| 1/1/1986 | 11:00 | 531 | 1415 | 341 | 1 | 9 | 688 | 1 | 9 | 80 | 1 | 13 |
| 1/1/1986 | 12:00 | 591 | 1415 | 364 | 1 | 9 | 521 | 1 | 13 | 144 | 1 | 13 |
| 1/1/1986 | 13:00 | 586 | 1415 | 231 | 1 | 9 | 151 | 1 | 13 | 168 | 1 | 13 |
| 1/1/1986 | 14:00 | 516 | 1415 | 180 | 1 | 9 | 54 | 1 | 13 | 161 | 1 | 13 |

BUILDING SYSTEM WITH AN IN-ZONE PLUME CONTROL SYSTEM

CROSS-REFERENCE TO RELATED PATENT APPLICATION

This application claims the benefit of and priority to U.S. Provisional 63/089,923 filed Oct. 9, 2020, the entire disclosure of which is incorporated by reference herein.

BACKGROUND

The present disclosure relates generally to systems and methods for predicting and mitigating infection risk in a building. The present disclosure relates more particularly to infection control for building HVAC equipment.

Maintaining occupant comfort and disinfection in a building may involve operating building equipment (e.g., HVAC equipment) to change environmental conditions in the building, e.g., filtering air. In some systems, a building may filter air through an air handler system. However, if multiple users are sitting at tables (e.g., conference room tables, work desks, lecture hall desks, classroom desks) the close proximity of the users may cause one user to infect another user even if a central air system is filtering the air. Furthermore, the central air system of the building may draw exhaled air of one user across a second user, causing the second user to inhale the air. Even if the building is filtering the air due to the close proximity of the users at the desks, the users may infect each other with an infectious disease.

SUMMARY

One implementation of the present disclosure is a building system of a building including an in-zone plume control system located within a zone of the building, the in-zone plume control system including one or more return air inlets including openings to receive one or more air plumes generated by one or more users. The in-zone plume control system includes one or more exhaust outlets configured to exhaust the one or more air plumes, a filter, and a fan configured to draw the one or more air plumes in through the one or more return air inlets, through the filter, and out through the one or more exhaust outlets back into the zone, wherein the filter is configured to filter or disinfect the one or more air plumes to remove or deactivate particles from the one or more air plumes before returning the one or more air plumes to the zone.

In some embodiments, the filter is configured to filter the one or more air plumes to remove or deactivate infectious disease particles from the one or more air plumes.

In some embodiments, the in-zone plume control system further include one or more sensors configured to sense whether the one or more users are present in the building and a controller configured to activate the fan in response to a detection of the one or more users being present in the building.

In some embodiments, the in-zone plume control system is located within the zone and is separate from a central air system of the building.

In some embodiments, the in-zone plume control system is installed in at least one of a floor of the building, a ceiling of the building, or a wall of the building.

In some embodiments, the openings of the one or more return air inlets receive a first air plume of a first user. In some embodiments, the one or more exhaust outlets are configured to exhaust the first air plume of the first user in a direction away from a second user.

In some embodiments, the in-zone plume control system is a mobile in-zone plume control system structured to be carried by a user. In some embodiments, the in-zone plume control system includes a battery power system configured to power the fan.

In some embodiments, the mobile in-zone plume control system is a wearable device including one or more straps holding the in-zone plume control system under a chin of an occupant.

In some embodiments, the in-zone plume control system is structured to be installed in a piece of furniture of the building.

In some embodiments, the piece of furniture is one of a conference room table, a workspace desk, a classroom desk, or a lecture hall desk.

In some embodiments, the piece of furniture includes an upper surface and one or more legs suspending the upper surface from a floor of the building.

Another implementation of the present disclosure is an in-zone plume control system located within a zone of a building, the in-zone plume control system including one or more return air inlets including openings to receive one or more air plumes generated by one or more users. The in-zone plume control system includes one or more exhaust outlets configured to exhaust the one or more air plumes, a filter, and a fan configured to draw the one or more air plumes in through the one or more return air inlets, through the filter, and out through the one or more exhaust outlets back into the zone, wherein the filter is configured to filter or disinfect the one or more air plumes to remove or deactivate particles from the one or more air plumes before returning the one or more air plumes to the zone.

In some embodiments, the filter is configured to filter the one or more air plumes to remove or deactivate infectious disease particles from the one or more air plumes.

In some embodiments, the in-zone plume control system further includes one or more sensors configured to sense whether the one or more users are present in the building and a controller configured to activate the fan in response to a detection of the one or more users being present in the building.

In some embodiments, the in-zone plume control system is located within the zone and is separate from a central air system of the building.

In some embodiments, the openings of the one or more return air inlets receive a first air plume of a first user. In some embodiments, the one or more exhaust outlets are configured to exhaust the first air plume of the first user in a direction away from a second user.

In some embodiments, the in-zone plume control system is a mobile in-zone plume control system structured to be carried by a user. In some embodiments, the in-zone plume control system includes a battery power system configured to power the fan.

Another implementation of the present disclosure is a building system of a building space including in-zone air filtration systems located within the building space configured to draw in air of the building space and exhaust the air back into the building space and a building controller system including one or more controllers. The building controller system is configured to receive locations of one or more occupants in the building space, determine one or more in-zone air filtration systems of the in-zone air filtration systems to activate based on the locations of the one or more occupants and second locations of the in-zone air filtration systems, and activate the one or more in-zone air filtration systems.

In some embodiments, the in-zone air filtration systems are configured to exhaust the air back into the building space in a direction away from the one or more occupants of the building space.

In some embodiments, the building controller system is configured to activate the one or more in-zone air filtration systems to draw exhaled air away from a first occupant of the one or more occupants in a direction that avoids moving the exhaled air across a second occupant of the one or more occupants.

BRIEF DESCRIPTION OF THE DRAWINGS

FIG. 14 is a user interface for receiving user inputs regarding an occupancy of a building for a baseline scenario and other scenarios, according to some embodiments.

FIG. 15 is a user interface for receiving user inputs regarding an equipment setup of a building for a baseline scenario and other scenarios, according to some embodiments.

FIG. 16 is a user interface showing infection risk results and various incremental costs for a baseline scenario and other scenarios, according to some embodiments.

FIG. 17 is a user interface showing building, occupancy, equipment setup, and energy cost fields that can be populated by a user, according to some embodiments.

FIG. 18 is a user interface showing Wells-Riley and ventilation cost parameters, according to some embodiments.

FIG. 19 is a user interface showing filter data, according to some embodiments.

FIG. 21 is a table showing filter information for different rated filters, according to some embodiments.

FIG. 22 is a table showing filter information for different rated filters, according to some embodiments.

FIG. 23 is a table illustrating a random seed technique used to generate infection risk ratings, according to some embodiments.

FIG. 24 is a table showing different parameters that are used to calculate heating and cooling costs, according to some embodiments.

FIG. 25 is a table showing heating degree days, cooling degree days, heating cost, cooling cost, and total cost for various locations, according to some embodiments.

FIG. 26 is a table showing historical data for a location that is used to calculate the heating degree days and cooling degree days for the location, according to some embodiments.

DETAILED DESCRIPTION

Overview

Referring generally to the FIGURES, a building system with an in-zone plume control system is shown and described, according to various exemplary embodiment. Occupants of a building space can create plumes through exhaling air into their environment. The plumes can include aerosol particles which, in some cases, can include particles of diseases, e.g., *Mycobacterium tuberculosis*, influenza (e.g., COVID-19), Ebola virus, etc. The in-zone plume control system can, in some embodiments, prevent the spread of an infectious disease in the building space by controlling plumes in the zone (e.g., filtering the plumes, redirecting the plumes, etc.).

The in-zone plume control system can be a system separate from an airside system of a building, e.g., separate from an Air Handler Unit (AHU)/Variable Air Volume (VAV) based system. The in-zone plume control system can, in some embodiments, draw in plumes of the building space, filter or otherwise clean the plumes, and then expel air back into the building space or into another location. The in-zone plume control system can use a fan to create a suction to suck in the plumes through a return air grill, filter the plumes through a filter, and then expel the air through an exhaust grill.

In some embodiments, the in-zone plume control system can be integrated with (or located on) furniture of the building space. For example, the in-zone plume control device could be located in the center of a conference room table that draws plumes from all individuals at the conference room table into the center of the table and exhaled down through the table towards the floor. This can prevent the spread of an infectious disease among the individuals at the conference room table. In some embodiments, the in-zone plume control device can be located on a workstation desk, in couches, in lecture hall desks, in ceilings of a building space, in floors of a building space, in walls of a building space, etc.

In some embodiments, the in-zone plume control systems are spaced throughout a building space and are operated by a building controller based on the locations of occupants in the space. In some embodiments, the building controller can identify the locations of the occupants and activate certain in-zone plume control systems to suck in air plumes of the occupants in directions that avoid a plume of one occupant being moved towards another occupant. In this regard, the in-zone plume control systems can suck air in such that plumes are not moved across other occupants. The in-zone plume control systems can further discharge air away from other occupants.

Building and HVAC System

Figure 1:
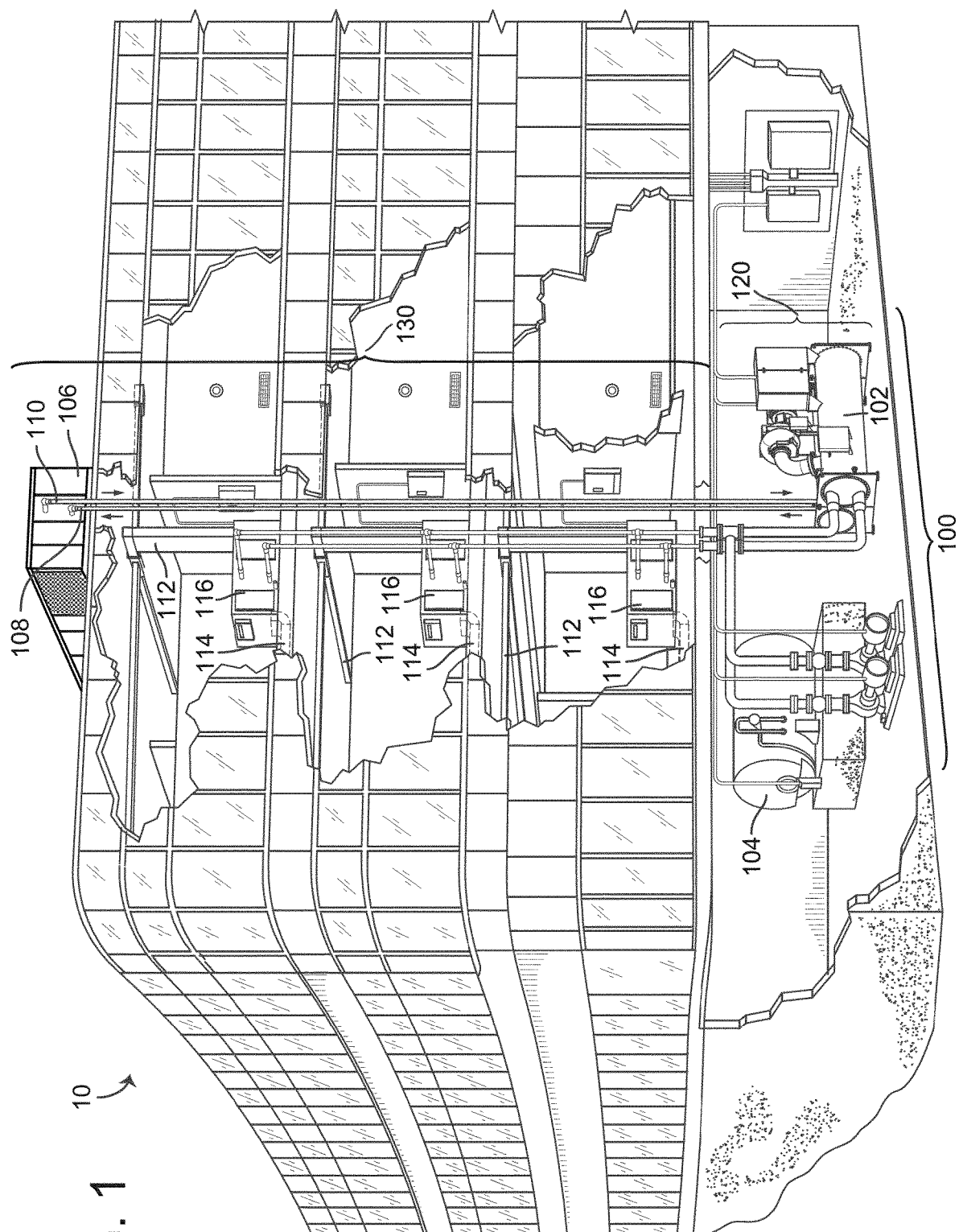
FIG. 1 is a drawing of a building equipped with a HVAC system, according to some embodiments.

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 2.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Airside System

Figure 2:
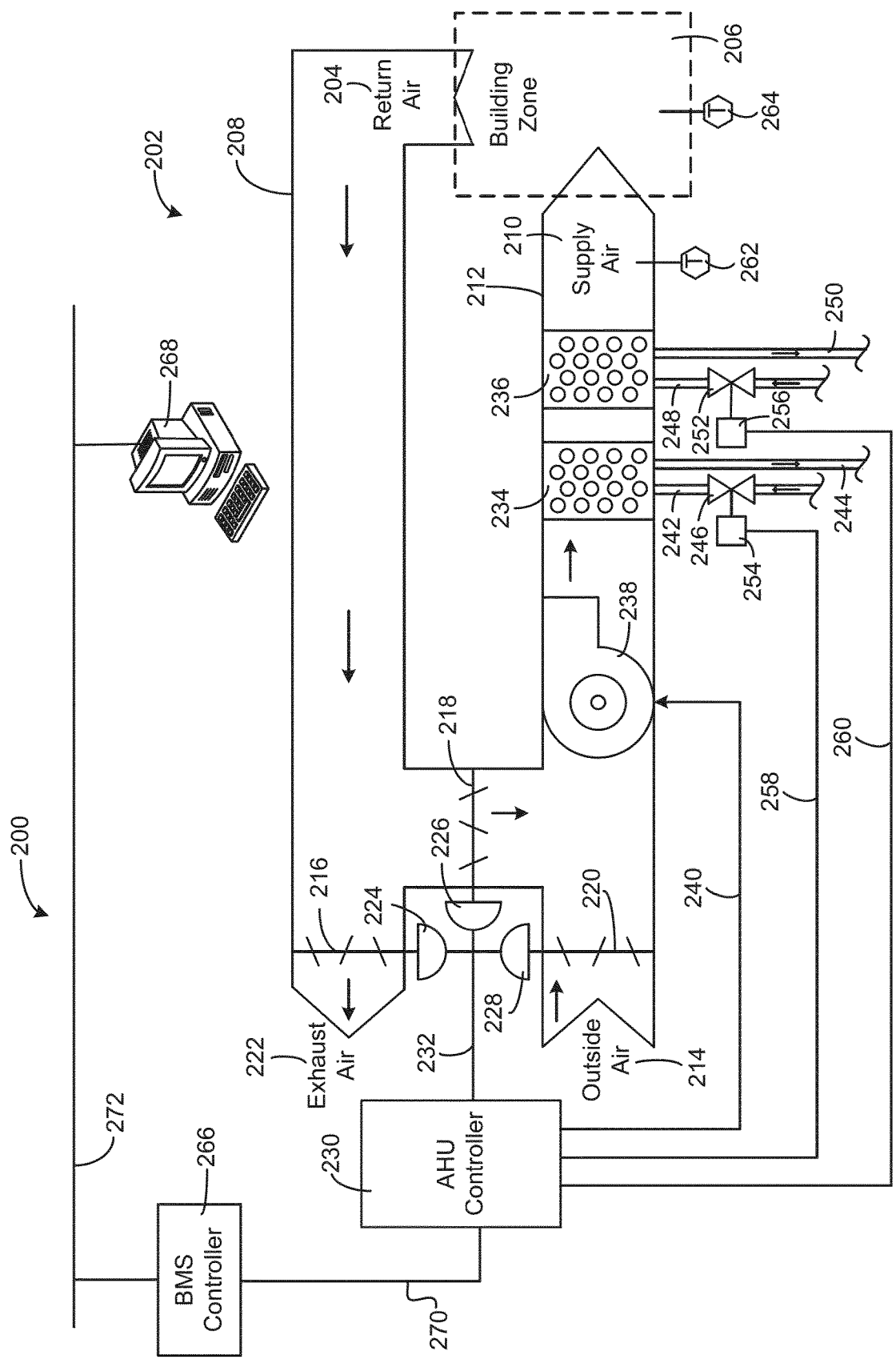
FIG. 2 is a block diagram of an airside system which can be implemented in the building of FIG. 1, according to some embodiments.

Referring now to FIG. 2, a block diagram of an airside system 200 is shown, according to some embodiments. In various embodiments, airside system 200 may supplement or replace airside system 130 in HVAC system 100 or can be implemented separate from HVAC system 100. When implemented in HVAC system 100, airside system 200 can include a subset of the HVAC devices in HVAC system 100 (e.g., AHU 106, VAV units 116, ducts 112-114, fans, dampers, etc.) and can be located in or around building 10. Airside system 200 may operate to heat, cool, humidify, dehumidify, filter, and/or disinfect an airflow provided to building 10 in some embodiments.

Airside system 200 is shown to include an economizer-type air handling unit (AHU) 202. Economizer-type AHUs vary the amount of outside air and return air used by the air handling unit for heating or cooling. For example, AHU 202 may receive return air 204 from building zone 206 via return air duct 208 and may deliver supply air 210 to building zone 206 via supply air duct 212. In some embodiments, AHU 202 is a rooftop unit located on the roof of building 10 (e.g., AHU 106 as shown in FIG. 1) or otherwise positioned to receive both return air 204 and outside air 214. AHU 202 can be configured to operate exhaust air damper 216, mixing damper 218, and outside air damper 220 to control an amount of outside air 214 and return air 204 that combine to form supply air 210. Any return air 204 that does not pass through mixing damper 218 can be exhausted from AHU 202 through exhaust damper 216 as exhaust air 222.

Each of dampers 216-220 can be operated by an actuator. For example, exhaust air damper 216 can be operated by actuator 224, mixing damper 218 can be operated by actuator 226, and outside air damper 220 can be operated by actuator 228. Actuators 224-228 may communicate with an AHU controller 230 via a communications link 232. Actuators 224-228 may receive control signals from AHU controller 230 and may provide feedback signals to AHU controller 230. Feedback signals can include, for example, an indication of a current actuator or damper position, an amount of torque or force exerted by the actuator, diagnostic information (e.g., results of diagnostic tests performed by actuators 224-228), status information, commissioning information, configuration settings, calibration data, and/or other types of information or data that can be collected, stored, or used by actuators 224-228. AHU controller 230 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 224-228.

Still referring to FIG. 2, AHU 202 is shown to include a cooling coil 234, a heating coil 236, and a fan 238 positioned within supply air duct 212. Fan 238 can be configured to force supply air 210 through cooling coil 234 and/or heating coil 236 and provide supply air 210 to building zone 206. AHU controller 230 may communicate with fan 238 via communications link 240 to control a flow rate of supply air 210. In some embodiments, AHU controller 230 controls an amount of heating or cooling applied to supply air 210 by modulating a speed of fan 238. In some embodiments, AHU 202 includes one or more air filters (e.g., filter 308) and/or one or more ultraviolet (UV) lights (e.g., UV lights 306) as described in greater detail with reference to FIG. 3. AHU controller 230 can be configured to control the UV lights and route the airflow through the air filters to disinfect the airflow as described in greater detail below.

Cooling coil 234 may receive a chilled fluid from central plant 200 via piping 242 and may return the chilled fluid to central plant 200 via piping 244. Valve 246 can be positioned along piping 242 or piping 244 to control a flow rate of the chilled fluid through cooling coil 234. In some embodiments, cooling coil 234 includes multiple stages of cooling coils that can be independently activated and deactivated (e.g., by AHU controller 230, by BMS controller 266, etc.) to modulate an amount of cooling applied to supply air 210.

Heating coil 236 may receive a heated fluid from central plant 200 via piping 248 and may return the heated fluid to central plant 200 via piping 250. Valve 252 can be positioned along piping 248 or piping 250 to control a flow rate of the heated fluid through heating coil 236. In some embodiments, heating coil 236 includes multiple stages of heating coils that can be independently activated and deactivated (e.g., by AHU controller 230, by BMS controller 266, etc.) to modulate an amount of heating applied to supply air 210.

Each of valves 246 and 252 can be controlled by an actuator. For example, valve 246 can be controlled by actuator 254 and valve 252 can be controlled by actuator 256. Actuators 254-256 may communicate with AHU controller 230 via communications links 258-260. Actuators 254-256 may receive control signals from AHU controller 230 and may provide feedback signals to controller 230. In some embodiments, AHU controller 230 receives a measurement of the supply air temperature from a temperature sensor 262 positioned in supply air duct 212 (e.g., downstream of cooling coil 334 and/or heating coil 236). AHU controller 230 may also receive a measurement of the temperature of building zone 206 from a temperature sensor 264 located in building zone 206.

In some embodiments, AHU controller 230 operates valves 246 and 252 via actuators 254-256 to modulate an amount of heating or cooling provided to supply air 210 (e.g., to achieve a setpoint temperature for supply air 210 or to maintain the temperature of supply air 210 within a setpoint temperature range). The positions of valves 246 and 252 affect the amount of heating or cooling provided to supply air 210 by cooling coil 234 or heating coil 236 and may correlate with the amount of energy consumed to achieve a desired supply air temperature. AHU controller 230 may control the temperature of supply air 210 and/or building zone 206 by activating or deactivating coils 234-236, adjusting a speed of fan 238, or a combination of both.

Still referring to FIG. 2, airside system 200 is shown to include a building management system (BMS) controller 266 and a client device 268. BMS controller 266 can include one or more computer systems (e.g., servers, supervisory controllers, subsystem controllers, etc.) that serve as system level controllers, application or data servers, head nodes, or master controllers for airside system 200, central plant 200, HVAC system 100, and/or other controllable systems that serve building 10. BMS controller 266 may communicate with multiple downstream building systems or subsystems (e.g., HVAC system 100, a security system, a lighting system, central plant 200, etc.) via a communications link 270 according to like or disparate protocols (e.g., LON, BACnet, etc.). In various embodiments, AHU controller 230 and BMS controller 266 can be separate (as shown in FIG. 2) or integrated. In an integrated implementation, AHU controller 230 can be a software module configured for execution by a processor of BMS controller 266.

In some embodiments, AHU controller 230 receives information from BMS controller 266 (e.g., commands, setpoints, operating boundaries, etc.) and provides information to BMS controller 266 (e.g., temperature measurements, valve or actuator positions, operating statuses, diagnostics, etc.). For example, AHU controller 230 may provide BMS controller 266 with temperature measurements from temperature sensors 262-264, equipment on/off states, equipment operating capacities, and/or any other information that can be used by BMS controller 266 to monitor or control a variable state or condition within building zone 206.

Client device 268 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 268 can be a computer workstation, a client terminal, a remote or local interface, or any other type of user interface device. Client device 268 can be a stationary terminal or a mobile device. For example, client device 268 can be a desktop computer, a computer server with a user interface, a laptop computer, a tablet, a smartphone, a PDA, or any other type of mobile or non-mobile device. Client device 268 may communicate with BMS controller 266 and/or AHU controller 230 via communications link 272.

HVAC System with Building Infection Control

Overview

Figure 3:
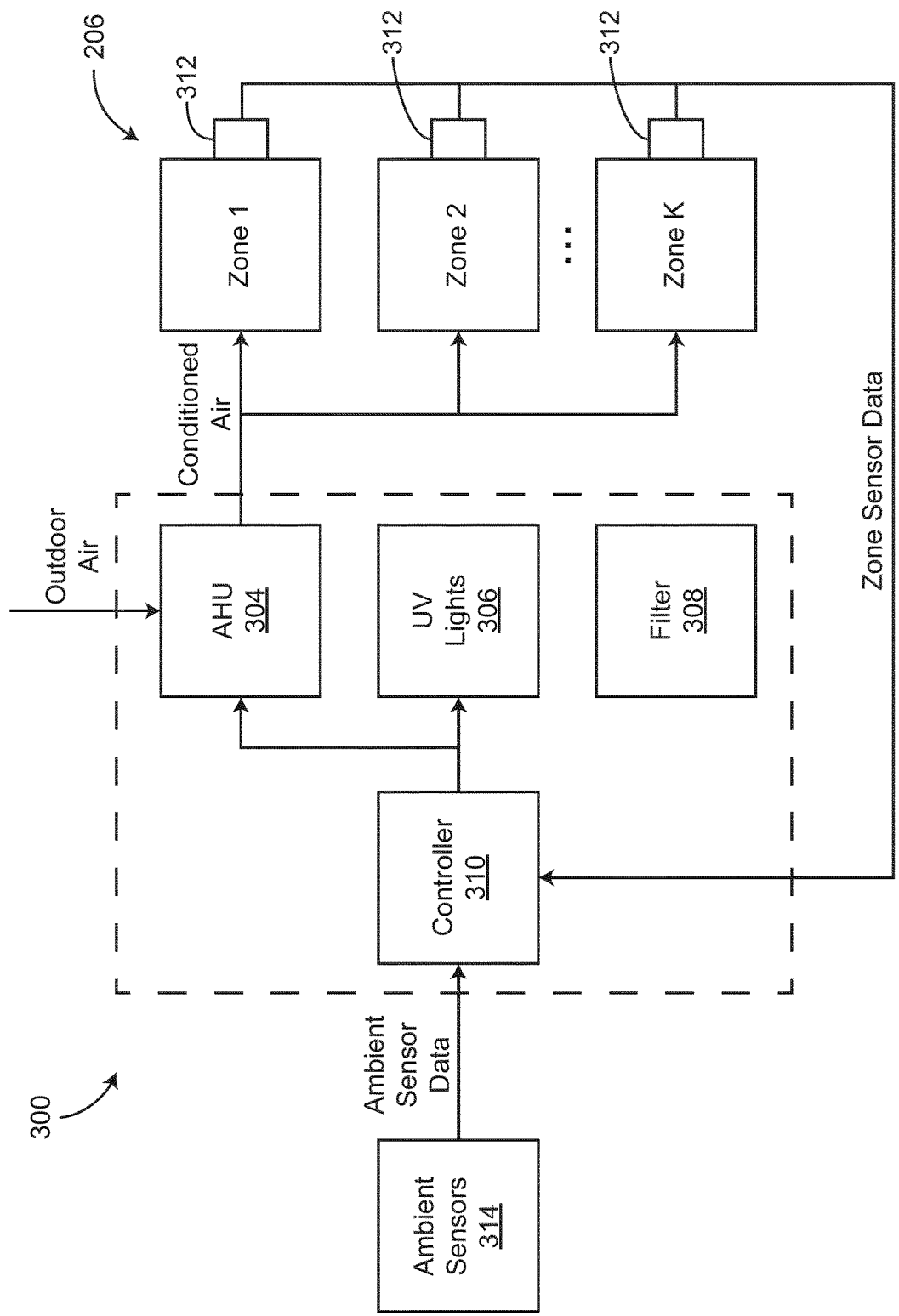
FIG. 3 is a block diagram of an HVAC system including a controller configured to operate an air-handling unit (AHU) of the HVAC system of FIG. 1, according to some embodiments.

Referring particularly to FIG. 3, a HVAC system 300 that is configured to provide disinfection for various zones of a building (e.g., building 10) is shown, according to some embodiments. HVAC system 300 can include an air handling unit (AHU) 304 (e.g., AHU controller 230, AHU 202, etc.) that can provide conditioned air (e.g., cooled air, supply air 210, etc.) to various building zones 206. The AHU 304 may draw air from the zones 206 in combination with drawing air from outside (e.g., outside air 214) to provide conditioned or clean air to zones 206. The HVAC system 300 includes a controller 310 (e.g., AHU controller 230) that is configured to determine a fraction x of outdoor air to recirculated air that the AHU 304 should use to provide a desired amount of disinfection to building zones 206. In some embodiments, controller 310 can generate control signals for various dampers of AHU 304 so that AHU 304 operates to provide the conditioned air to building zones 206 using the fraction x.

The HVAC system 300 can also include ultraviolet (UV) lights 306 that are configured to provide UV light to the conditioned air before it is provided to building zones 206. The UV lights 306 can provide disinfection as determined by controller 310 and/or based on user operating preferences. For example, the controller 310 can determine control signals for UV lights 306 in combination with the fraction x of outdoor air to provide a desired amount of disinfection and satisfy an infection probability constraint. Although UV lights 306 are referred to throughout the present disclosure, the systems and methods described herein can use any type of disinfection lighting using any frequency, wavelength, or luminosity of light effective for disinfection. It should be understood that UV lights 306 (and any references to UV lights 306 throughout the present disclosure) can be replaced with disinfection lighting of any type without departing from the teachings of the present disclosure.

The HVAC system 300 can also include one or more filters 308 or filtration devices (e.g., air purifiers). In some embodiments, the filters 308 are configured to filter the conditioned air or recirculated air before it is provided to building zones 206 to provide a certain amount of disinfection. In this way, controller 310 can perform an optimization in real-time or as a planning tool to determine control signals for AHU 304 (e.g., the fraction x) and control signals for UV lights 306 (e.g., on/off commands) to provide disinfection for building zones 206 and reduce a probability of infection of individuals that are occupying building zones 206. Controller 310 can also function as a design tool that is configured to determine suggestions for building managers regarding benefits of installing or using filters 308, and/or specific benefits that may arise from using or installing a particular type or size of filter. Controller 310 can thereby facilitate informed design decisions to maintain sterilization of air that is provided to building zones 206 and reduce a likelihood of infection or spreading of infectious matter.

Wells-Riley Airborne Transmission

The systems and methods described herein may use an infection probability constraint in various optimizations (e.g., in on-line or real-time optimizations or in off-line optimizations) to facilitate reducing infection probability among residents or occupants of spaces that the HVAC system serves. The infection probability constraint can be based on a steady-state Wells-Riley equation for a probability of airborne transmission of an infectious agent given by:

$$P := \frac{D}{S} = 1 - \exp\left(-\frac{Ipqt}{Q}\right)$$

where P is a probability that an individual becomes infected (e.g., in a zone, space, room, environment, etc.), D is a number of infected individuals (e.g., in the zone, space, room, environment, etc.), S is a total number of susceptible individuals (e.g., in the zone, space, room, environment, etc.), I is a number of infectious individuals (e.g., in the zone, space, room, environment, etc.), q is a disease quanta generation rate (e.g., with units of 1/sec), p is a volumetric breath rate of one individual (e.g., in $m^3$/sec), t is a total exposure time (e.g., in seconds), and Q is an outdoor ventilation rate (e.g., in $m^3$/sec). For example, Q may be a volumetric flow rate of fresh outdoor air that is provided to the building zones 206 by AHU 304.

When the Wells-Riley equation is implemented by controller 310 as described herein, controller 310 may use the Wells-Riley equation (or a dynamic version of the Wells-Riley equation) to determine an actual or current probability of infection P and operate the HVAC system 200 to maintain the actual probability of infection P below (or drive the actual probability of infection below) a constraint or maximum allowable value. The constraint value (e.g., $P_{max}$) may be a constant value, or may be adjustable by a user (e.g., a user-set value). For example, the user may set the constraint value of the probability of infection to a maximum desired probability of infection (e.g., either for on-line implementation of controller 310 to maintain the probability of infection below the maximum desired probability, or for an off-line implementation/simulation performed by controller 310 to determine various design parameters for HVAC system 200 such as filter size), or may select from various predetermined values (e.g., 3-5 different choices of the maximum desired probability of infection).

In some embodiments, the number of infectious individuals I can be determined by controller 310 based on data from the Centers for Disease and Control Prevention or a similar data source. The value of I may be typically set equal to 1 but may vary as a function of occupancy of building zones 206.

The disease quanta generation rate q may be a function of the infectious agent. For example, more infectious diseases may have a higher value of q, while less infectious diseases may have a lower value of q. For example, the value of q for COVID-19 may be 30-300 (e.g., 100).

The value of the volumetric breath rate p may be based on a type of building zone 206. For example, the volumetric breath rate p may be higher if the building zone 206 is a gym as opposed to an office setting. In general, an expected level of occupant activity may determine the value of the volumetric breath rate p.

A difference between D (the number of infected individuals) and I (the number of infectious individuals) is that D is a number of individuals who are infected (e.g., infected with a disease), while I is a number of people that are infected and are actively contagious (e.g., individuals that may spread the disease to other individuals or spread infectious particles when they exhale). The disease quanta generation rate indicates a number of infectious droplets that give a 63.2% chance of infecting an individual (e.g., 1−exp(−1)). For example, if an individual inhales k infectious particles, the probability that the individual becomes infected (P) is given by $$1 - \exp\left(-\frac{k}{k_0}\right)$$

where k is the number of infectious particles that the individual has inhaled, and $k_0$ is a quantum of particles for a particular disease (e.g., a predefined value for different diseases). The quanta generation rate q is the rate at which quanta are generated (e.g., $K/k_0$) where K is the rate of infectious particles exhaled by an infectious individual. It should be noted that values of the disease quanta generation rate q may be back-calculated from epidemiological data or may be tabulated for well-known diseases.

The Wells-Riley equation (shown above) is derived by assuming steady-state concentrations for infectious particles in the air. Assuming a well-mixed space:

$$V\frac{dN}{dt} = Iq - NQ$$

where V is a total air volume (e.g., in $m^3$), N is a quantum concentration in the air, I is the number of infectious individuals, q is the disease quanta generation rate, and Q is the outdoor ventilation rate. The term Iq is quanta production by infectious individuals (e.g., as the individuals breathe out or exhale), and the term NQ is the quanta removal rate due to ventilation (e.g., due to operation of AHU 304).

Assuming steady-state conditions, the steady state quantum concentration in the air is expressed as:

$$N_{ss} = \frac{Iq}{Q}$$

according to some embodiments.

Therefore, if an individual inhales at an average rate of p (e.g., in $m^3$/sec), over a period of length t the individual inhales a total volume pt or $N_{ss}ptk_0$ infectious particles.

Therefore, based on a probability model used to define the quanta, the infectious probability is given by:

$$P = 1 - \exp\left(-\frac{k}{k_0}\right) = 1 - \exp(-N_{ss}pt) = 1 - \exp\left(-\frac{Iqpt}{Q}\right)$$

where P is the probability that an individual becomes infected, k is the number of infectious particles that the individual has inhaled, and $k_0$ is the quantum of particles for the particular disease.

Carbon Dioxide for Infectious Particles Proxy

While the above equations may rely on in-air infectious quanta concentration, measuring in-air infectious quanta concentration may be difficult. However, carbon dioxide (CO2) is a readily-measureable parameter that can be a proxy species, measured by zone sensors 312. In some embodiments, a concentration of CO2 in the zones 206 may be directly related to a concentration of the infectious quanta.

A quantity $\phi$ that defines a ratio of an infected particle concentration in the building air to the infected particle concentration in the exhaled breath of an infectious individual is defined:

$$\phi := \frac{pN}{q}$$

where p is the volumetric breath rate for an individual, N is the quantum concentration in the air, and q is the disease quanta generation rate. Deriving the above equation with respect to time yields:

$$\frac{d\phi}{dt} = \frac{p}{q}\left(\frac{dN}{dt}\right) = \frac{Ip}{V} - \phi\left(\frac{Q}{V}\right)$$

where p is the volumetric breath rate for the individual, q is disease quanta generation rate, N is the quantum concentration in the air, t is time, I is the number of infectious individuals, V is the total air volume, $\phi$ is the ratio, and Q is the outdoor ventilation rate. Since it can be difficult to measure the ratio $\phi$ of the air, CO2 can be used as a proxy species.

Humans release CO2 when exhaling, which is ultimately transferred to the ambient via ventilation of an HVAC system. Therefore, the difference between CO2 particles and infectious particles is that all individuals (and not only the infectious population) release CO2 and that the outdoor air CO2 concentration is non-zero. However, it may be assumed that the ambient CO2 concentration is constant with respect to time, which implies that a new quantity C can be defined as the net indoor CO2 concentration (e.g., the indoor concentration minus the outdoor concentration). With this assumption, the following differential equation can be derived:

$$V\frac{dC}{dt} = Spc - QC$$

where V is the total air volume (e.g., in m³), C is the net indoor CO2 concentration, t is time, S is the total number of susceptible individuals (e.g., in building zone 206, or a modeled space, or all of building zones 206, or building 10), p is the volumetric breath rate for one individual, c is the net concentration of exhaled CO2, and Q is the outdoor ventilation rate. This equation assumes that the only way to remove infectious particles is with fresh air ventilation (e.g., by operating AHU 304 to draw outdoor air and use the outdoor air with recirculated air). A new quantity $\psi$ can be defined that gives the ratio of net CO2 concentration in the building air to net CO2 concentration in the exhaled air:

$$\psi = \frac{C}{c}$$

where $\psi$ is the ratio, C is the net indoor CO2 concentration, and c is the net concentration of exhaled CO2.

Deriving the ratio V with respect to time yields:

$$\frac{d\psi}{dt} = \frac{1}{c}\left(\frac{dC}{dt}\right) = \frac{Sp}{V} - \psi\left(\frac{Q}{V}\right)$$

according to some embodiments.

Combining the above equation with the quantity p, it can be derived that:

$$\frac{d}{dt}\log\left(\frac{\phi}{\psi}\right) = \frac{1}{\phi}\left(\frac{d\phi}{dt}\right) - \frac{1}{\psi}\left(\frac{d\psi}{dt}\right) = \frac{p}{V}\left(\frac{I}{\phi} - \frac{s}{\psi}\right)$$

according to some embodiments. Assuming that the initial condition satisfies:

$$\phi(0) = \frac{1}{S}\psi(0)$$

it can be determined that the right-hand side of the $$\frac{d}{dt}$$

log $$\left(\frac{\phi}{\psi}\right)$$

equation becomes zero. This implies that the term log $$\left(\frac{\phi}{\psi}\right)$$

and therefore $$\frac{\phi}{\psi}$$

is a constant. Therefore, $\phi/\psi$ is constant for all times t and not merely initial conditions when t=0.

The $$\frac{d}{dt}\log\left(\frac{\phi}{\psi}\right)$$

relationship only holds true when fresh outdoor air is used as the only disinfection mechanism. However, in many cases HVAC system 200 may include one or more filters 308, and UV lights 306 that can be operated to provide disinfection for building zones 206. If additional infection mitigation strategies are used, the ventilation rate may instead by an effective ventilation rate for infectious quanta that is different than that of the CO2. Additionally, the only way for the initial conditions $\phi(0)$ and $\psi(0)$ to be in proportion is for both to be zero. This assumption can be reasonable if HVAC system 200 operates over a prolonged time period (such as overnight, when the concentrations have sufficient time to reach equilibrium zero values). However, ventilation is often partially or completely disabled overnight and therefore the two quantities $\phi$ and $\psi$ are not related. However, CO2 concentration can be measured to determine common model parameters (e.g., for the overall system volume V) without being used to estimate current infectious particle concentrations. If fresh outdoor air ventilation is the only mechanism for disinfection of zones 206, and the HVAC system 200 is run so that the concentrations reach equilibrium, CO2 concentration can be measured and used to estimate current infectious particle concentrations.

Dynamic Extension and Infection Probability Constraints

Referring still to FIG. 3, it may be desirable to model the infectious quanta concentration N of building zones 206 as a dynamic parameter rather than assuming N is equal to the steady state $N_{SS}$ value. For example, if infectious individuals enter building zones 206, leave building zones 206, etc., the infectious quanta concentration N may change over time. This can also be due to the fact that the effective fresh air ventilation rate (which includes outdoor air intake as well as filtration or UV disinfection that affects the infectious agent concentration in the supply air that is provided by AHU 304 to zones 206) can vary as HVAC system 200 operates.

Therefore, assuming that the infectious quanta concentration $N(t)$ is a time-varying quantity, for a given time period $t \in [0, T]$, an individual breathes in:

$$k_{[0,T]} = \int_0^T p k_0 N(t) dt$$

where $k_{[0,T]}$ is the number of infectious particles that an individual inhales over the given time period [0, T], p is the volumetric breath rate of one individual, $k_0$ is the quantum of particles for a particular disease, and $N(t)$ is the time-varying quantum concentration of the infectious particle in the air.

Since $$P = 1 - \exp\left(-\frac{k}{k_0}\right),$$

the above equation can be rearranged and substitution yields:

$$-\log(1 - P_{[0,T]}) = \int_0^T pN(t)dt \approx \Delta \sum_t pN_t$$

according to some embodiments.

Assuming an upper boundary $P_{[0,T]}^{max}$ on acceptable or desirable infection probability, a constraint is defined as:

$$\frac{\Delta}{T} \sum_t N_t \leq -\frac{1}{pT}\log(1 - P_{[0,T]})$$

according to some embodiments. The constraint can define a fixed upper boundary on an average value of $N_t$ over the given time interval.

Control Formulation

Figure 4:
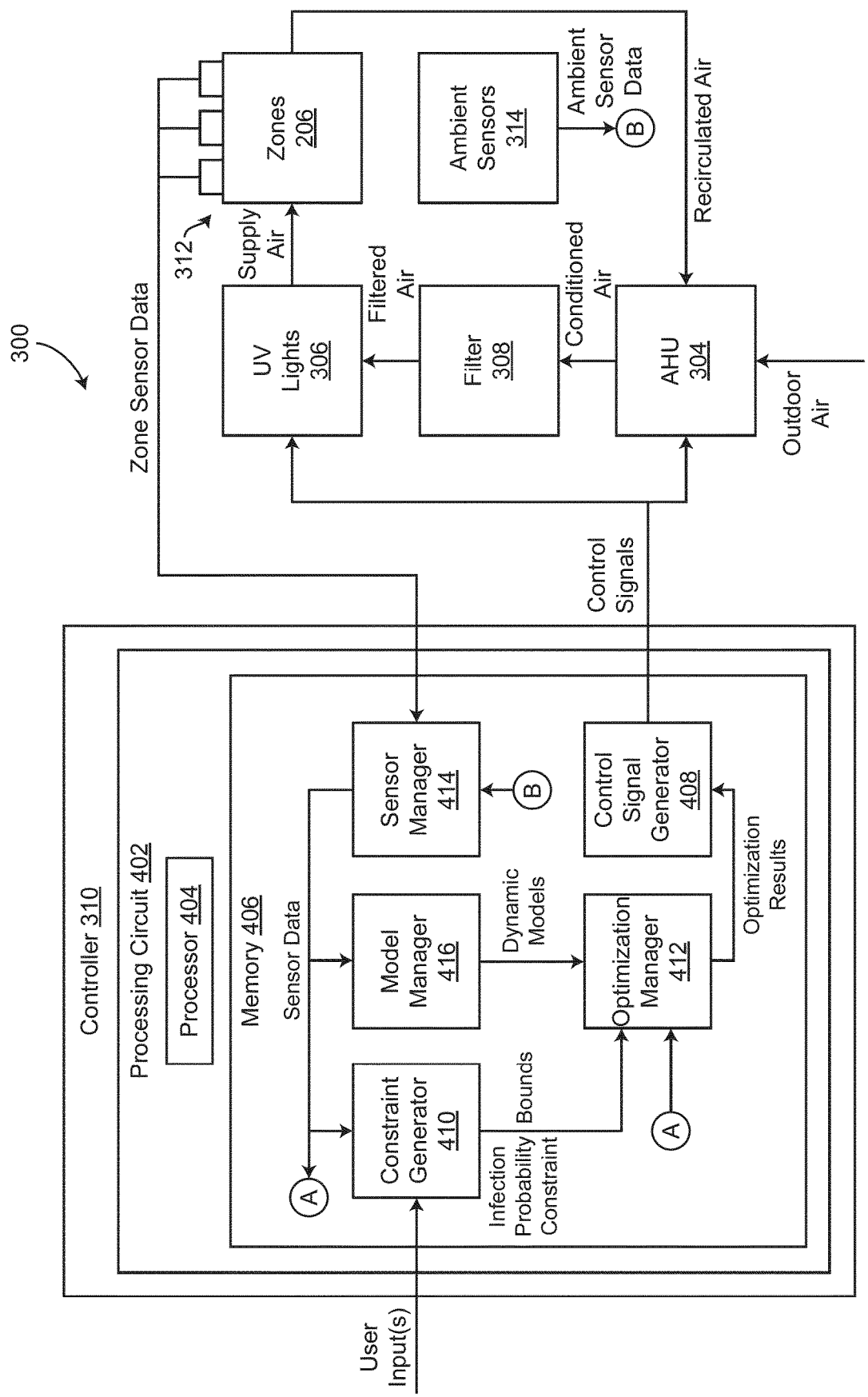
FIG. 4 is a block diagram illustrating the controller of FIG. 3 in greater detail, showing operations performed when the controller is used in an on-line mode or real-time implementation for making control decisions to minimize energy consumption of the HVAC system and provide sufficient disinfection, according to some embodiments.

Referring particularly to FIG. 4, controller 310 is shown in greater detail, according to some embodiments. Controller 310 is configured to generate control signals for any of UV lights 306, filter 308, and/or AHU 304. AHU 304 operates to draw outdoor air and/or recirculated air (e.g., from zones 206) to output conditioned (e.g., cooled) air. The conditioned air may be filtered by passing through filter 308 (e.g., which may include fans to draw the air through the filter 308) to output filtered air. The filtered air and/or the conditioned air can be disinfected through operation of UV lights 306. The AHU 304, filter 308, and UV lights 306 can operate in unison to provide supply air to zones 206.

Controller 310 includes a processing circuit 402 including a processor 404 and memory 406. Processing circuit 402 can be communicably connected with a communications interface of controller 310 such that processing circuit 402 and the various components thereof can send and receive data via the communications interface. Processor 404 can be implemented as a general purpose processor, an application specific integrated circuit (ASIC), one or more field programmable gate arrays (FPGAs), a group of processing components, or other suitable electronic processing components.

Memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 406 can be or include volatile memory or non-volatile memory. Memory 406 can include database components, object code components, script components, or any other type of information structure for supporting the various activities and information structures described in the present application. According to some embodiments, memory 406 is communicably connected to processor 404 via processing circuit 402 and includes computer code for executing (e.g., by processing circuit 402 and/or processor 404) one or more processes described herein.

In some embodiments, controller 310 is implemented within a single computer (e.g., one server, one housing, etc.). In various other embodiments controller 310 can be distributed across multiple servers or computers (e.g., that can exist in distributed locations).

Memory 406 can include a constraint generator 410, a model manager 416, a sensor manager 414, an optimization manager 412, and a control signal generator 408. Sensor manager 414 can be configured to obtain zone sensor data from zone sensors 312 and/or ambient sensor data from ambient sensors 314 (e.g., environmental conditions, outdoor temperature, outdoor humidity, etc.) and distribute required sensor data to the various components of memory 406 thereof. Constraint generator 410 is configured to generate one or more constraints for an optimization problem (e.g., an infection probability constraint) and provide the constraints to optimization manager 412. Model manager 416 can be configured to generate dynamic models (e.g., individual or zone-by-zone dynamic models, aggregate models, etc.) and provide the dynamic models to optimization manager 412. Optimization manager 412 can be configured to use the constraints provided by constraint generator 410 and the dynamic models provided by model manager 416 to formulate an optimization problem. Optimization manager 412 can also define an objective function for the optimization problem, and minimize or optimize the objective function subject to the one or more constraints and the dynamic models. The objective function may be a function that indicates an amount of energy consumption, energy consumption costs, carbon footprint, or any other optimization goals over a time interval or time horizon (e.g., a future time horizon) as a function of various control decisions. Optimization manager 412 can output optimizations results to control signal generator 408. Control signal generator 408 can generate control signals based on the optimization results and provide the control signals to any of AHU 304, filter 308, and/or UV lights 306.

Referring particularly to FIGS. 3 and 4, AHU 304 can be configured to serve multiple building zones 206. For example, AHU 304 can be configured to serve a collection of zones 206 that are numbered k=1, ..., K. Each zone 206 can have a temperature, referred to as temperature $T_k$ (the temperature of the kth zone 206), a humidity $\omega_k$ (the humidity of the kth zone 206), and an infectious quanta concentration $N_k$ (the infectious quanta concentration of the kth zone 206). Using this notation, the following dynamic models of individual zones 206 can be derived:

$$\rho c V_k \left(\frac{dT_k}{dt}\right) = \rho c f_k (T_0 - T_k) + Q_k(T_k)$$

$$\rho V_k \left(\frac{d\omega_k}{dt}\right) = \rho f(\omega_0 - T_0) + w_k$$

$$V_k \left(\frac{dN_k}{dt}\right) = f_k(N_0 - N_k) + I_k q$$

where $f_k$ is a volumetric flow of air into the kth zone, $\rho$ is a mass density of air (e.g., in kg per cubic meters), c is the heat capacity of air (e.g., in kJ/kg·K), $Q_k(\cdot)$ is heat load on the kth zone 206 (which may depend on the temperature $T_k$), $w_k$ is the moisture gain of the kth zone 206, and $I_k$ is the number of infectious individuals in the kth zone 206. $T_0$ is the temperature of the air provided to the kth zone (e.g., as discharged by a VAV box of AHU 304), $\omega_0$ is the humidity of the air provided to the kth zone 206, and $N_0$ is the infectious quanta concentration of the air provided to the kth zone 206.

The temperature $T_0$ of air output by the AHU 304, the humidity wo of air output by the AHU 304, and the infectious quanta concentration $N_0$ of air output by the AHU 304 is calculated using the equations:

$$T_0 = xT_a + (1-x)\frac{\Sigma_k f_k T_k}{\Sigma_k f_k} - \Delta T_c$$

$$\omega_0 = x\omega_a + (1-x)\frac{\Sigma_k f_k \omega_k}{\Sigma_k f_k} - \Delta \omega_c$$

$$N_0 = (1-\lambda)(1-x)\frac{\Sigma_k f_k N_k}{\Sigma_k f_k}$$

where x is the fresh-air intake fraction of AHU 304, $T_a$ is current ambient temperature, $\omega_a$ is current ambient humidity, $\Delta T_c$ is temperature reductions from the cooling coil of AHU 304, $\Delta \omega_c$ is humidity reduction from the cooling coil of AHU 304, and A is a fractional reduction of infectious quanta due to filtration (e.g., operation of filter 308) and/or UV treatment (e.g., operation of UV lights 306) at AHU 304 (but not due to ventilation which is accounted for in the factor 1−x, according to some embodiments.

In some embodiments, the dynamic models of the individual zones are stored by and used by model manager 416. Model manager 416 can store the individual dynamic models shown above and/or aggregated models (described in greater detail below) and populate the models. The populated models can then be provided by model manager 416 to optimization manager 412 for use in performing an optimization.

In some embodiments, model manager 416 is configured to receive sensor data from sensor manager 414. Sensor manager 414 may receive sensor data from zone sensors 312 and/or ambient sensors 313 and provide appropriate or required sensor data to the various managers, modules, generators, components, etc., of memory 406. For example, sensor manager 414 can obtain values of the current ambient temperature $T_a$, the current ambient humidity $\omega_a$, the temperature reduction $\Delta T_c$ resulting from the cooling coil of AHU 304, and/or the humidity reduction $\Delta w_c$ resulting from the cooling coil of AHU 304, and provide these values to model manager 416 for use in determining $T_0$, $\omega_0$, and $N_0$ or for populating the dynamic models of the individual zones 206.

In some embodiments, various parameters or values of the variables of the dynamic models of the individual zones 206 are predefined, predetermined, or stored values, or may be determined (e.g., using a function, an equation, a table, a look-up table, a graph, a chart, etc.) based on sensor data (e.g., current environmental conditions of the ambient or outdoor area, environmental conditions of the zones 206, etc.). For example, the mass density of air p may be a predetermined value or may be determined based on sensor data. In some embodiments, model manager 416 can use stored values, sensor data, etc., to fully populate the dynamic models of the individual zones 206 (except for control or adjustable variables of the dynamic models of the individual zones 206 that are determined by performing the optimization). Once the models are populated so that only the control variables remain undefined or undetermined, model manager 416 can provide the populated models to optimization manager 412.

The number of infectious individuals $I_k$ can be populated based on sensor data (e.g., based on biometric data of occupants or individuals of the building zones 206), or can be estimated based on sensor data. In some embodiments, model manager 416 can use an expected number of occupants and various database regarding a number of infected individuals in an area. For example, model manager 416 can query an online database regarding potential infection spread in the area (e.g., number of positive tests of a particular virus or contagious illness) and estimate if it is likely that an infectious individual is in the building zone 206.

In some embodiments, it can be difficult to obtain zone-by-zone values of the number of infectious individuals $I_k$ in the modeled space (e.g., the zones 206). In some embodiments, model manager 416 is configured to use an overall approximation of the model for $N_k$. Model manager 416 can store and use volume-averaged variables:

$$\overline{N} = \frac{\sum_k V_k N_k}{V}$$

$$\overline{f} = \sum_k f_k$$

$$\overline{V} = \sum_k V_k$$

$$\overline{I} = \sum_k I_k$$

according to some embodiments. Specifically, the equations shown above aggregate the variables $\overline{N}$, $\overline{I}$, $\overline{V}$, and $\overline{I}$ across multiple zones 206 by calculating a weighted average based on the volume of zones 206.

The K separate ordinary differential equation models (i.e., the dynamic models of the individual zones 206) can be added for $N_k$ to determine an aggregate quantum concentration model:

$$\overline{V}\frac{d\overline{N}}{dt} = \sum_k V_k \frac{dN_k}{dt}$$

$$= \sum_k (f_k(N_0 - N_k) + I_k q)$$

$$= \overline{I}q + \sum_k f_k\left((1-\lambda)(1-x)\frac{\sum_{k'} f_{k'} N_{k'}}{\sum_{k'} f_{k'}} - N_k\right)$$

$$= \overline{I}q + (1-\lambda)(1-x)\sum_{k'} f_{k'} N_{k'} - \sum_k f_k N_k$$

$$= \overline{I}q - (\lambda + x - \lambda x)\sum_k f_k N_k$$

$$\approx \overline{I}q - (\lambda + x - \lambda x)\overline{f}\overline{N}$$

according to some embodiments, assuming that $N_k \approx \overline{N}$ for each zone 206. The aggregate quantum concentration model is shown below:

$$\overline{V}\frac{d\overline{N}}{dt} = \overline{I}q - (\lambda + x - \lambda x)\sum_k f_k N_k \approx \overline{I}q - (\lambda + x - \lambda x)\overline{f}\overline{N}$$

according to some embodiments.

Defining aggregate temperature, humidity, heat load, and moisture gain parameters:

$$\overline{T} = \frac{\sum_k V_k T_k}{V}$$

$$\overline{\omega} = \frac{\sum_k V_k \omega_k}{V}$$

$$\overline{Q}(\cdot) = \sum_k Q_k(\cdot)$$

$$\overline{w} = \sum_k w_k$$

allows the k thermal models $$\rho c V_k \left(\frac{dT_k}{dt}\right)$$

to be added:

$$\rho c \overline{V} \frac{d\overline{T}}{dt} = \sum_k \rho c V_k \frac{dT_k}{dt}$$

$$= \sum_k (\rho c f_k (T_0 - T_k) + Q_k(T_k))$$

$$= \sum_k Q_k(T_k) + \sum_k \rho c f_k \left(xT_a + (1-x)\frac{\sum_{k'} f_{k'} T_{k'}}{\sum_{k'} f_{k'}} - T_k - \Delta T_c\right)$$

$$= \sum_k Q_k(T_k) + (1-x)\sum_{k'} \rho c f_{k'} T_{k'} + \sum_k \rho f_k(xT_a - T_k - \Delta T_c)$$

$$= \sum_k Q_k(T_k) + \rho c \sum_k f_k(x(T_a - T_k) - \Delta T_c)$$

$$\approx \overline{Q}(\overline{T}) + \rho c \overline{f}(x(T_a - \overline{T}) - \Delta T_c)$$

according to some embodiments (assuming that $T_k \approx \overline{T}$ for each zone 206). This yields the aggregate thermal model:

$$\rho c \overline{V} \frac{d\overline{T}}{dt} =$$

$$\sum_k Q_k(T_k) + \rho c \sum_k f_k(x(T_a - T_k) - \Delta T_c) \approx \overline{Q}(\overline{T}) + \rho c \overline{f}(x(T_a - \overline{T}) - \Delta T_c)$$

according to some embodiments.

The moisture model $$\rho V_k \left(\frac{d\omega_k}{dt}\right)$$

can similarly be aggregated to yield an aggregate moisture model:

$$\rho \overline{V} \frac{d\overline{\omega}}{dt} = \overline{w} + \rho \sum_k f_k(x(\omega_a - \omega_k) - \Delta \omega_c)$$

$$\approx \overline{w} + \rho \overline{f}(x(\omega_a - \overline{\omega}) - \Delta \omega_c)$$

to predict an evolution of volume-averaged humidity, according to some embodiments.

In some embodiments, model manager 416 stores and uses the aggregate quantum concentration model, the aggregate thermal model, and/or the aggregate moisture model described hereinabove. Model manager 416 can populate the various parameters of the aggregate models and provide the aggregate models to optimization manager 412 for use in the optimization.

Referring still to FIG. 4, memory 406 includes optimization manager 412. Optimization manager 412 can be configured to use the models provided by model manager 416 and various constraints provided by constraint generator 410 to construct an optimization problem for HVAC system 200 (e.g., to determine design outputs and/or to determine control parameters, setpoints, control decisions, etc., for UV lights 306 and/or AHU 304). Optimization manager 412 can construct an optimization problem that uses the individual or aggregated temperature, humidity, and/or quantum concentration models subject to constraints to minimize energy use. In some embodiments, decision variables of the optimization problem formulated and solved by optimization manager 412 are the flows $f_k$ (or the aggregate f if the optimization problem uses the aggregate models), the outdoor air fraction x and the infectious quanta removal fraction $\lambda$.

The infectious quanta removal fraction $\lambda$ is defined as:

$$\lambda = \lambda_{filter} + \lambda_{UV}$$

where $\lambda_{filter}$ is an infectious quanta removal fraction that results from using filter 308 (e.g., an amount or fraction of infectious quanta that is removed by filter 308), and $\lambda_{UV}$ is an infectious quanta removal fraction that results from using UV lights 306 (e.g., an amount or fraction of infectious quanta that is removed by operation of UV lights 306). In some embodiments, $\lambda_{filter}$ is a design-time constant (e.g., determined based on the chosen filter 308), whereas $\lambda_{UV}$ is an adjustable or controllable variable that can be determined by optimization manager 412 by performing the optimization of the optimization problem. In some embodiments, $\lambda_{UV}$ is a discrete variable. In some embodiments, $\lambda_{UV}$ is a continuous variable.

Instantaneous electricity or energy consumption of HVAC system 200 is modeled using the equation (e.g., an objective function that is minimized):

$$E = \eta_{coil}\bar{\rho}\bar{f}(c\Delta T_c + L\Delta\omega_c) + \eta_{fan}\bar{f}\Delta P + \eta_{UV}\lambda_{UV}$$

where L is a latent heat of water, $\Delta P$ is a duct pressure drop, $\eta_{coil}$ is an efficiency of the cooling coil of AHU 304, $\eta_{fan}$ is an efficiency of a fan of AHU 304, and $\eta_{UV}$ is an efficiency of the UV lights 306, according to some embodiments. In some embodiments, optimization manager 412 is configured to store and use the energy consumption model shown above for formulating and performing the optimization. In some embodiments, the term $\eta_{coil}\Sigma\bar{f}(c\Delta T_c + L\Delta\omega_c)$ is an amount of energy consumed by the cooling coil or heating coil of the AHU 304 (e.g., over an optimization time period or time horizon), the term $\eta_{fan}\bar{f}\Delta P$ is an amount of energy consumed by the fan of the AHU 304, and $\eta_{UV}\lambda_{UV}$ is the amount of energy consumed by the UV lights 306. In some embodiments, the duct pressure drop $\Delta P$ is affected by or related to a choice of a type of filter 308, where higher efficiency filters 308 (e.g., filters 308 that have a higher value of $\eta_{filter}$) generally resulting in a higher value of the duct pressure drop $\Delta P$ and therefore greater energy consumption. In some embodiments, a more complex model of the energy consumption is used by optimization manager 412 to formulate the optimization problem (e.g., a non-linear fan model and a time-varying or temperature-dependent coil efficiency model).

In some embodiments, the variables $\Delta T_c$ and $\Delta\omega_c$ for the cooling coil of the AHU 304 are implicit dependent decision variables. In some embodiments, a value of a supply temperature $T_{AHU}$ is selected for the AHU 304 and is used to determine the variables $\Delta T_c$ and $\Delta\omega_c$ based on inlet conditions to the AHU 304 (e.g., based on sensor data obtained by sensor manager 414). In such an implementation, model manager 416 or optimization manager 412 may determine that $T_0 = T_{AHU}$ and an equation for $\omega_0$.

Optimization manager 412 can use the models (e.g., the individual models, or the aggregated models) provided by model manager 416, and constraints provided by constraint generator 410 to construct the optimization problem. Optimization manager 412 may formulate an optimization problem to minimize energy consumption subject to constraints on the modeled parameters, $\omega$, and N and additional constraints:

$$\min_{f_t, x_t, \lambda_t} \sum_t E_t \quad \text{(Energy Cost)}$$

$$\text{s.t.} \quad \ldots \quad \text{(Dynamic Models for } T_t, \omega_t, \text{ and } N_t\text{)}$$

$$\ldots \quad \text{(Infection Probability Constraint)}$$

$$T_t^{min} \leq T_t \leq T_t^{max} \quad \text{(Temperature Bounds)}$$

$$\omega_t^{min} \leq \omega_t \leq \omega_t^{max} \quad \text{(Humidity Bounds)}$$

$$x_t f_t \geq F_t^{min} \quad \text{(Fresh-Air Ventilation Bound)}$$

$$f_t^{min} \leq f_t \leq f_t^{max} \quad \text{(VAV Flow Bounds)}$$

$$0 \leq x_t \leq 1 \quad \text{(Outdoor-Air Damper Bounds)}$$

where $\Sigma_t E_t$ is the summation of instantaneous electricity or energy consumption of the HVAC system 200 over an optimization time period, subject to the dynamic models for $T_t$, $\omega_t$, and $N_t$ (either zone-by-zone individual models, or aggregated models as described above), an infection probability constraint (described in greater detail below), temperature boundary constraints ($T_t^{min} \leq T_t \leq T_t^{max}$, maintaining $T_t$ between a minimum temperature boundary $T_t^{min}$ and a maximum temperature boundary $T_t^{max}$), humidity boundary constraints ($\omega_t^{min} \leq \omega_t \leq \omega_t^{max}$, maintaining the humidity $\omega_t$ between a minimum humidity boundary $\omega_t^{min}$ and a maximum humidity boundary $\omega_t^{max}$), a fresh air ventilation boundary ($x_t f_t \geq F_t^{min}$, maintaining the fresh air ventilation $x_t f_t$ above or equal to a minimum required amount $F_t^{min}$), a VAV flow boundary ($f_m^{min} \leq f_t \leq f_t^{max}$, maintaining the volumetric flow rate $f_t$ between a minimum boundary $f_t^{min}$ and a maximum boundary $f_t^{max}$) and an outdoor air damper bound/constraint ($0 \leq x_t \leq 1$ maintaining the outdoor air fraction $x_t$ between 0 and 1). In some embodiments, optimization manager 412 is configured to discretize the dynamic models (e.g., the individual dynamic models or the aggregate dynamic models) using matrix exponentials or approximately using collocation methods.

The boundaries on temperature ($T_t^{min} \leq T_t \leq T_t^{max}$) and humidity ($\omega_t^{min} \leq \omega_t \leq \omega_t^{max}$) can be determined by optimization manager 412 based on user inputs or derived from comfort requirements. The temperature and humidity bounds may be enforced by optimization manager 412 as soft constraints. The remaining bounds (e.g., the fresh-air ventilation bound, the VAV flow bounds, and the outdoor-air damper bounds) can be applied to input quantities (e.g., decision variables) by optimization manager 412 as hard constraints for the optimization. In some embodiments, the fresh-air ventilation bound is enforced by optimization manager 412 to meet the American Society of Heating, Refrigerating, and Air-Conditioning Engineers (ASHRAE) standards. In some embodiments, the fresh-air ventilation bound is replaced with a model and corresponding bounds for CO2 concentration.

In some embodiments, the various constraints generated by constraint generator 410 or other constraints imposed on the optimization problem can be implemented as soft constraints, hard constraints, or a combination thereof. Hard constraints may impose rigid boundaries (e.g., maximum value, minimum value) on one or more variables in the optimization problem such that any feasible solution to the optimization problem must maintain the hard constrained variables within the limits defined by the hard constraints. Conversely, soft constraints may be implemented as penalties that contribute to the value of the objective function (e.g., adding to the objective function if the optimization problem seeks to minimize the objective function or subtracting from the objective function if the optimization problem seeks to maximize the objective function). Soft constraints may be violated when solving the optimization problem, but doing so will incur a penalty that affects the value of the objective function. Accordingly, soft constraints may encourage optimization manager 412 to maintain the values of the soft constrained variables within the limits defined by the soft constraints whenever possible to avoid the penalties, but may allow optimization manager 412 to violate the soft constraints when necessary or when doing so would result in a more optimal solution.

In some embodiments, constraint generator 410 may impose soft constraints on the optimization problem by defining large penalty coefficients (relative to the scale of the other terms in the objective function) so that optimization manager 412 only violates the soft constraints when absolutely necessary. However, it is contemplated that the values of the penalty coefficients can be adjusted or tuned (e.g., by a person or automatically by constraint generator 410) to provide an optimal tradeoff between maintaining the soft constrained variables within limits and the resulting cost (e.g., energy cost, monetary cost) defined by the objective function. One approach which can be used by constraint generator 410 is to use penalties proportional to amount by which the soft constraint is violated (i.e., static penalty coefficients). For example, a penalty coefficient of 0.1 $/° C.-hr for a soft constrained temperature variable would add a cost of $0.10 to the objective function for every 1° C. that the temperature variable is outside the soft constraint limit for every hour of the optimization period. Another approach which can be used by constraint generator 410 is to use variable or progressive penalty coefficients that depend on the amount by which the soft constraint is violated. For example, a variable or progressive penalty coefficient could define a penalty cost of 0.1 $/° C.-hr for the first 1° C. by which a soft constrained temperature variable is outside the defined limit, but a relatively higher penalty cost of 1.0 $/° C.-hr for any violations of the soft constrained temperature limit outside the first 1° C.

Another approach which can be used by constraint generator 410 is to provide a "constraint violation budget" for one or more of the constrained variables. The constraint violation budget may define a total (e.g., cumulative) amount by which a constrained variable is allowed to violate a defined constraint limit within a given time period. For example a constraint violation budget for a constrained temperature variable may define 30° C.-hr (or any other value) as the cumulative amount by which the constrained temperature variable is allowed to violate the temperature limit within a given time period (e.g., a day, a week, a month, etc.). This would allow the temperature to violate the temperature constraint by 30° C. for a single hour, 1° C. for each of 30 separate hours, 0.1° C. for each of 300 separate hours, 10° C. for one hour and 1° C. for each of 20 separate hours, or any other distribution of the 30° C.-hr amount across the hours of the given time period, provided that the cumulative temperature constraint violation sums to 30° C.-hr or less. As long as the cumulative constraint violation amount is within (e.g., less than or equal to) the constraint violation budget, constraint generator 410 may not add a penalty to the objective function or subtract a penalty from the objective function. However, any further violations of the constraint that exceed the constraint violation budget may trigger a penalty. The penalty can be defined using static penalty coefficients or variable/progressive penalty coefficients as discussed above.

The infection probability constraint (described in greater detail below) is linear, according to some embodiments. In some embodiments, two sources of nonlinearity in the optimization problem are the dynamic models and a calculation of the coil humidity reduction $\Delta\omega_c$. In some embodiments, the optimization problem can be solved using nonlinear programming techniques provided sufficient bounds are applied to the input variables.

Infection Probability Constraint

Referring still to FIG. 4, memory 406 is shown to include a constraint generator 410. Constraint generator 410 can be configured to generate the infection probability constraint, and provide the infection probability constraint to optimization manager 412. In some embodiments, constraint generator 410 is configured to also generate the temperature bounds, the humidity bounds, the fresh-air ventilation bound, the VAV flow bounds, and the outdoor-air damper bounds and provide these bounds to optimization manager 412 for performing the optimization.

For the infection probability constraint, the dynamic extension of the Wells-Riley equation implies that there should be an average constraint over a time interval during which an individual is in the building. An individual $i$'s probability of infection $P_{i,[0,T]}$ over a time interval [0, T] is given by:

$$P_{i,[0,T]} = 1 - \exp\left(-p\Delta \sum_t \delta_{it} N_t\right), \delta_{it} = \begin{cases} 1 & \text{if } i \text{ present at time } t \\ 0 & \text{else} \end{cases}$$

according to some embodiments. Assuming that the individual's probability of infection $P_{i,[0,T]}$ is a known value, an upper bound $P^{max}$ can be chosen for $P_{i,[0,T]}$ and can be implemented as a linear constraint:

$$\sum_t \delta_{it} N_t \leq -\frac{1}{p\Delta} \log(1 - P^{max})$$

according to some embodiments. In some embodiments, the variable $\delta_{it}$ may be different for each individual in the building 10 but can be approximated as described herein.

The above linear constraint is an average constraint that gives optimization manager 412 (e.g., an optimizer) a maximum amount of flexibility since the average constraint may allow a higher concentration of infectious quanta during certain times of the day (e.g., when extra fresh-air ventilation is expensive due to outdoor ambient conditions) as long as the higher concentrations are balanced by lower concentrations of the infectious quanta during other times of the day. However, the $\delta_{it}$ sequence may be different for each individual in the building 10. For purposes of the example described herein it is assumed that generally each individual is present a total of 8 hours (e.g., if the building 10 is an office building). However, the estimated amount of time the individual is within the building can be adjusted or set to other values for other types of buildings. For example, when the systems and methods described herein are implemented in a restaurant or store, the amount of time the individual is assumed to be present in the building can be set to an average or estimated amount of time required to complete the corresponding activities (e.g., eating a meal, shopping, etc.). While an occupancy time of the building by each individual may be reasonably known, the times that the individual is present in the building may vary (e.g., the individual may be present from 7 AM to 3 PM, 9 AM to 5 PM, etc.). Therefore, to ensure that the constraint is satisfied for all possible $\delta_{tt}$ sequences, the constraint may be required to be satisfied when summing over 8 hours of the day that have a highest concentration.

This constraint is represented using linear constraints as:

$$M\eta + \sum_t \mu_t \leq -\frac{1}{p\Delta}\log(1 - P^{max})$$
$$\mu_t + \eta \geq N_t \; \forall \, t$$

where $\eta$ and $\mu_t$ are new auxiliary variables in the optimization problem, and M is a number of discrete timesteps corresponding to 8 hours (or any other amount of time that an individual is expected to occupy building 10 or one of building zones 206). This formulation may work since $\eta$ is set to an Mth highest value of $N_t$ and each of the $\mu_t$ satisfy $\mu_t = \max(N_t - \eta, 0)$. Advantageously, this implementation of the infection probability constraint can be generated by constraint generator 410 and provided to optimization manager 412 for use in the optimization problem when controller 310 is implemented to perform control decisions for HVAC system 200 (e.g., when controller 310 operates in an on-line mode).

An alternative implementation of the infection probability constraint is shown below that uses a pointwise constraint:

$$N_t \leq N_t^{max} = -\frac{1}{Mp\Delta}\log(1 - P^{max})$$

where $N_t$ is constrained to be less than or equal to $N_t^{max}$ for a maximum infection probability value $P^{max}$. In some embodiments, the pointwise constraint shown above is generated by constraint generator 410 for when optimization manager 412 is used in an off-line or design implementation. In some embodiments, the pointwise constraint shown above, if satisfied in all zones 206, ensures that any individual will meet the infection probability constraint. Such a constraint may sacrifice flexibility compared to the other implementation of the infection probability constraint described herein, but translates to a simple box constraint similar to the other bounds in the optimization problem, thereby facilitating a simpler optimization process.

In some embodiments, the maximum allowable or desirable infection probability $P^{max}$ is a predetermined value that is used by constraint generator 410 to generate the infection probability constraints described herein. In some embodiments, constraint generator 410 is configured to receive the maximum allowable or desirable infection probability $P^{max}$ from a user as a user input. In some embodiments, the maximum allowable or desirable infection probability $P^{max}$ is an adjustable parameter that can be set by a user or automatically generated based on the type of infection, time of year, type or use of the building, or any of a variety of other factors. For example, some buildings (e.g., hospitals) may be more sensitive to preventing disease spread than other types of buildings and may use lower values of $P^{max}$. Similarly, some types of diseases may be more serious or life-threatening than others and therefore the value of $P^{max}$ can be set to relatively lower values as the severity of the disease increases. In some embodiments, the value of $P^{max}$ can be adjusted by a user and the systems and methods described herein can run a plurality of simulations or optimizations for a variety of different values of $P^{max}$ to determine the impact on cost and disease spread. A user can select the desired value of $P^{max}$ in view of the estimated cost and impact on disease spread using the results of the simulations or optimizations.

Model Enhancements

Referring still to FIG. 4, optimization manager 412, constraint generator 410, and/or model manager 416 can implement various model enhancements in the optimization. In some embodiments, optimization manager 412 is configured to add a decision variable for auxiliary (e.g., controlled) heating (e.g., via baseboard heat or VAV reheat coils). In some embodiments, an effect of the auxiliary heating is included in the dynamic model of temperature similar to the disturbance heat load $Q_k(\cdot)$. Similar to the other decision variables, the auxiliary heating decision variable may be subject to bounds (e.g., with both set to zero during cooling season to disable auxiliary heating) that are generated by constraint generator 410 and used by optimization manager 412 in the optimization problem formulation and solving. In some embodiments, the auxiliary heating also results in optimization manager 412 including another term for associated energy consumption in the energy consumption equation (shown above) that is minimized.

In some embodiments, certain regions or areas may have variable electricity prices and/or peak demand charges. In some embodiments, the objective function (e.g., the energy consumption equation) can be augmented by optimization manager 412 to account for such cost structures. For example, the existing energy consumption $E_t$ that is minimized by optimization manager 412 may be multiplied by a corresponding electricity price $P_t$. A peak demand charge may require the use of an additional parameter $e_t$ that represents a base electric load of building 10 (e.g., for non-HVAC purposes). Optimization manager 412 can include such cost structures and may minimize overall cost associated with electricity consumption rather than merely minimizing electrical consumption. In some embodiments, optimization manager 412 accounts for revenue which can be generated by participating in incentive based demand response (IBDR) programs, frequency regulation (FR) programs, economic load demand response (ELDR) programs, or other sources of revenue when generating the objective function. In some embodiments, optimization manager 412 accounts for the time value of money by discounting future costs or future gains to their net present value. These and other factors which can be considered by optimization manager 412 are described in detail in U.S. Pat. No. 10,359, 748 granted Jul. 23, 2019, U.S. Patent Application Publication No. 2019/0347622 published Nov. 14, 2019, and U.S. Patent Application Publication No. 2018/0357577 published Dec. 13, 2018, each of which is incorporated by reference herein in its entirety.

In some embodiments, certain locations have time-varying electricity pricing, and therefore there exists a potential to significantly reduce cooling costs by using a solid mass of building 10 for thermal energy storage. In some embodiments, controller 310 can operate to pre-cool the solid mass of building 10 when electricity is cheap so that the solid mass can later provide passive cooling later in the day when electricity is less expensive. In some embodiments, optimization manager 412 and/or model manager 416 are configured to model this effect using a model augmentation by adding a new variable $T_k^m$ to represent the solid mass of the zone 206 evolving as:

$$\rho c_m V_k^m \frac{dT_k^m}{dt} = h_k^m (T_k - T_k^m)$$

with a corresponding term:

$$\rho c V_k \frac{dT_k}{dt} = \ldots + h_k^m (T_k^m - T_k)$$

added to the air temperature model (shown above). This quantity can also be aggregated by model manager 416 to an average value $T^m$ similar to T.

For some diseases, infectious particles may naturally become deactivated or otherwise removed from the air over time. To consider these effects, controller 310 can add a proportional decay term to the infectious quanta model (in addition to the other terms of the infectious quanta model discussed above). An example is shown in the following equation:

$$V \frac{dN}{dt} = \ldots - V \beta N$$

where β represents the natural decay rate (in $s^{-1}$) of the infectious species and the ellipsis represents the other terms of the infectious quanta model as discussed above. Because the natural decay subtracts from the total amount of infectious particles, the natural decay term is subtracted from the other terms in the infectious quanta model. For example, if a given infectious agent has a half-life $t_{1/2}$ of one hour (i.e., $t_{1/2}$=1 hr=3600 s), then the corresponding decay rate is given by:

$$\beta = \frac{\ln(2)}{t_{1/2}} \approx 1.925 \times 10^{-4} s^{-1}$$

This extra term can ensure that infectious particle concentrations do not accumulate indefinitely over extremely long periods of time.

Off-Line Optimization

Figure 5:
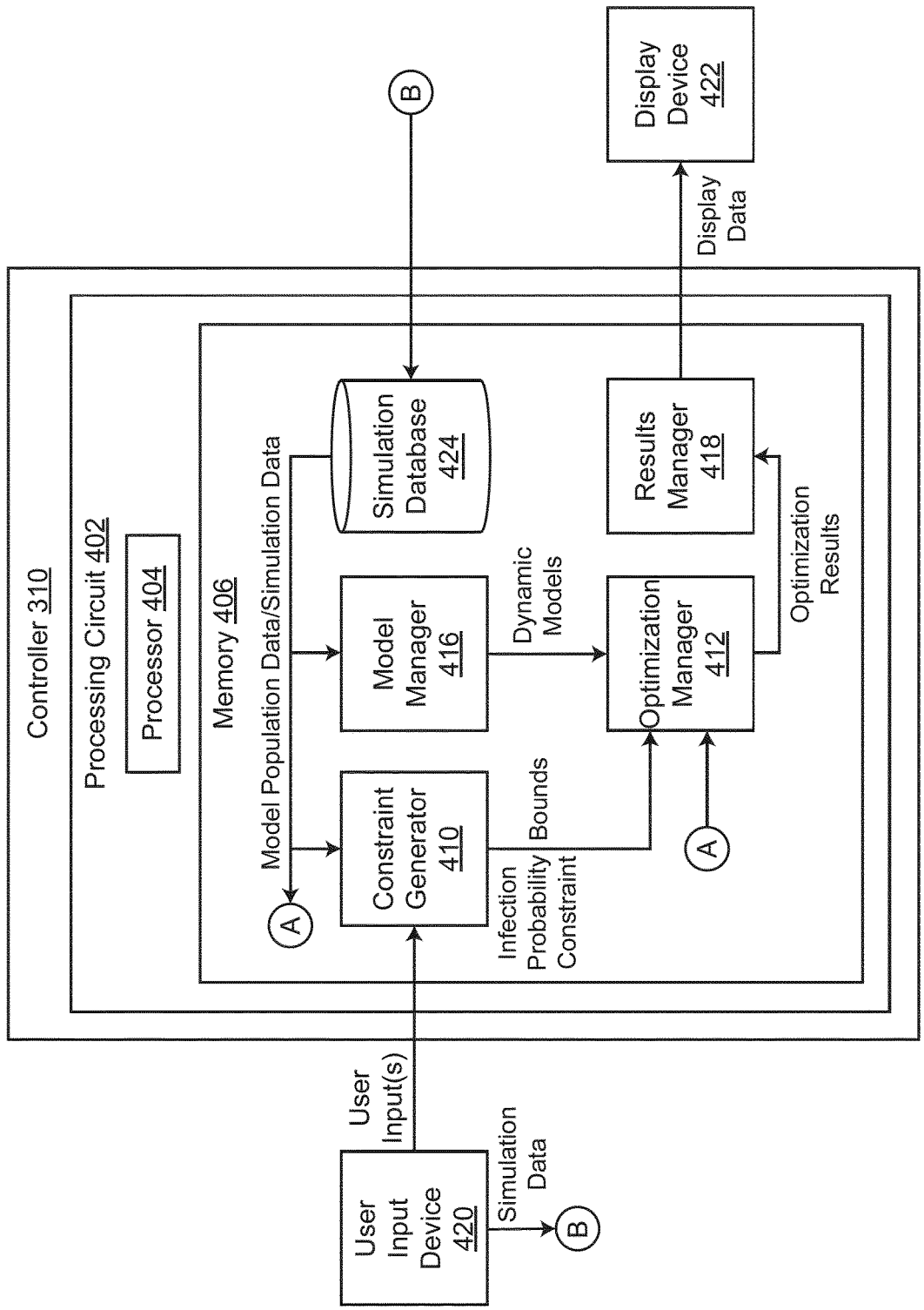
FIG. 5 is a block diagram illustrating the controller of FIG. 3 in greater detail, showing operations performed when the controller is used in an off-line or planning mode for making design suggestions to minimize energy consumption of the HVAC system and provide sufficient disinfection, according to some embodiments.

Referring particularly to FIG. 5, controller 310 can be configured for use as a design or planning tool for determining various design parameters of HVAC system 300 (e.g., for determining a size of filter 308, UV lights 306, etc.). In some embodiments, controller 310 implemented as a design tool, a planning tool, a recommendation tool, etc., (e.g., in an off-line mode) functions similarly to controller 310 implemented as a real-time control device (e.g., in an on-line mode). However, model manager 416, constraint generator 410, and optimization manager 412 may receive required sensor input data (i.e., model population data) from a simulation database 424. Simulation database 424 can store values of the various parameters of the constraints or boundaries, the dynamic models, or typical energy consumption costs or operational parameters for energy-consuming devices of the HVAC system 200. In some embodiments, simulation database 424 also stores predicted or historical values as obtained from sensors of HVAC system 200. For example, simulation database 424 can store typical ambient temperature, humidity, etc., conditions for use in performing the off-line simulation.

When controller 310 is configured for use as the design tool (shown in FIG. 5), controller 310 may receive user inputs from user input device 420. The user inputs may be initial inputs for various constraints (e.g., a maximum value of the probability of infection for the simulation) or various required input parameters. The user can also provide simulation data for simulation database 424 used to populate the models or constraints, etc. Controller 310 can output suggestions of whether to use a particular piece of equipment (e.g., whether or not to use or install UV lights 306), whether to use AHU 304 to draw outside air, etc., or other factors to minimize cost (e.g., to optimize the objective function, minimize energy consumption, minimize energy consumption monetary cost, etc.) and to meet disinfection goals (e.g., to provide a desired level of infection probability). In some embodiments, controller 310 may provide different recommendations or suggestions based on a location of building 10. In some embodiments, the recommendations notify the user regarding what equipment is needed to keep the infection probability of zones 206 within the threshold while not increasing energy cost or carbon footprint.

Compared to the on-line optimization (described in greater detail below), the optimization problem formulated by optimization manager 412 for the off-line implementation includes an additional constraint on the infectious quanta concentration (as described in greater detail above). In some embodiments, the infectious quanta concentration can be controlled or adjusted by (a) changing the airflow into each zone 206 (e.g., adjusting $f_i$), (b) changing the fresh-air intake fraction (e.g., adjusting x), or (c) destroying infectious particles in the AHU 304 via filtration or UV light (e.g., adjusting A).

It should be noted that the first and second control or adjustments (e.g., (a) and (b)) may also affect temperature and humidity of the zones 206 of building 10. However, the third control option (c) (e.g., adjusting the infectious quanta concentration through filtration and/or operation of UV lights) is independent of the temperature and humidity of the zones 206 of building 10 (e.g., does not affect the temperature or humidity of zones 206 of building 10). In some embodiments, optimization manager 412 may determine results that rely heavily or completely on maintaining the infectious quanta concentration below its corresponding threshold or bound through operation of filter 308 and/or UV lights 306. However, there may be sufficient flexibility in the temperature and humidity of building zone 206 so that optimization manager 412 can determine adjustments to (a), (b), and (c) simultaneously to achieve lowest or minimal operating costs (e.g., energy consumption). Additionally, since purchasing filters 308 and/or UV lights 306 may incur significant capital costs (e.g., to purchase such devices), controller 310 may perform the optimization as a simulation to determine if purchasing filters 308 and/or UV lights 306 is cost effective.

When controller 310 is configured as the design tool shown in FIG. 5, controller 310 may provide an estimate of a total cost (both capital costs and operating costs) to achieve a desired level of infection control (e.g., to maintain the infection probability below or at a desired amount). The purpose is to run a series of independent simulations, assuming different equipment configurations (e.g., as stored and provided by simulation database 424) and for different infection probability constraints given typical climate and occupancy data (e.g., as stored and provided by simulation database 424). In some embodiments, the different equipment configurations include scenarios when filters 308 and/or UV lights 306 are installed in the HVAC system 200, or when filters 308 and/or UV lights 306 are not installed in the HVAC system 200.

After performing the simulation for different equipment configuration scenarios and/or different infection probability constraints, controller 310 can perform a cost benefit analysis based on global design decisions (e.g., whether or not to install UV lights 306 and/or filters 308). The cost benefit analysis may be performed by results manager 418 and the cost benefit analysis results can be output as display data to a building manager via display device 422. These results may aid the building manager or a building designer in assessing potential options for infection control of building 10 (as shown in FIG. 8).

Figure 8:
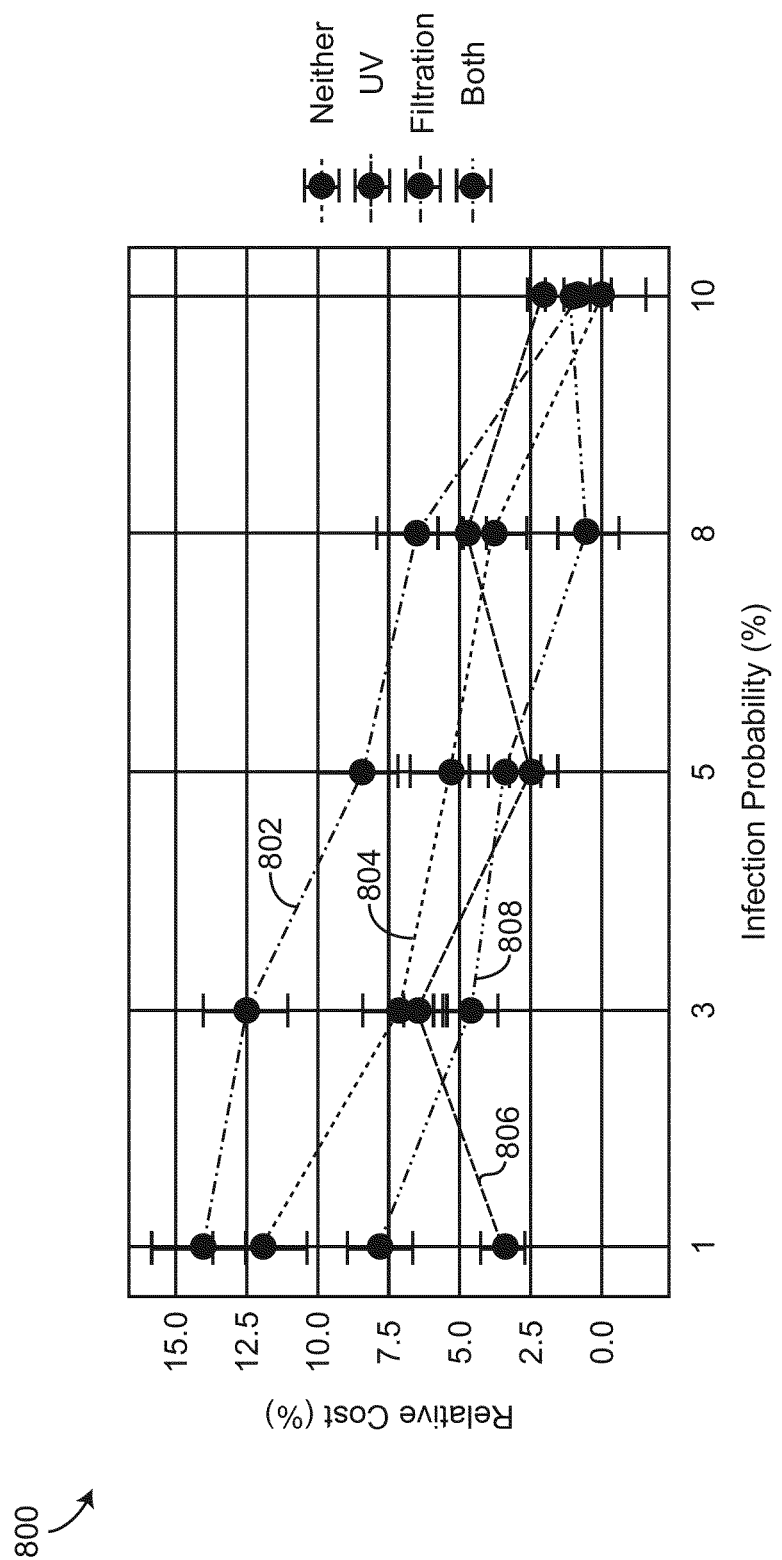
FIG. 8 is a graph of various design suggestions or information that can be provided by the controller of FIG. 3, according to some embodiments.

Referring particularly to FIGS. 5 and 8, graph 800 illustrates a potential output of results manager 418 that can be displayed by display device 422. Graph 800 illustrates relative cost (the Y-axis) with respect to infection probability (the X-axis) for a case when both filtration and UV lights are used for infection control (represented by series 808), a case when filtration is used for infection control without using UV lights (represented by series 802), a case when UV lights are used for infection control without using filtration (represented by series 806), and a case when neither UV lights and filtration are used for infection control (represented by series 804). In some embodiments, each of the cases illustrated by series 802-808 assume that fresh-air intake is used to control infection probability. Data associated with graph 800 can be output by results manager 418 so that graph 800 can be generated and displayed on display device 422.

In some embodiments, the off-line optimization performed by optimization manager 412 is faster or more computationally efficient than the on-line optimization performed by optimization manager 412. In some embodiments, the simulation is performed using conventional rule-based control rather than a model-predictive control scheme used for the on-line optimization. Additionally, the simulation may be performed over shorter time horizons than when the optimization is performed in the on-line mode to facilitate simulation of a wide variety of design conditions.

In some embodiments, optimization manager 412 is configured to use the aggregate dynamic models as generated, populated, and provided by model manager 416 for the off-line optimization (e.g., the design optimization). When optimization manager 412 uses the aggregate dynamic models, this implies that there are three decision variables of the optimization: $\bar{f}$, x, and $\lambda$. The variable $\lambda$ can include two positions at each timestep (e.g., corresponding to the UV lights 306 being on or the UV lights 306 being off). A reasonable grid size of $\bar{f}$ and x may be 100. Accordingly, this leads to 100×100×2=20,000 possible combinations of control decisions at each step, which is computationally manageable. Therefore, optimization manager 412 can select values of the variables $\bar{f}$, x, and $\lambda$ via a one-step restriction of the optimization problem by simply evaluating all possible sets of control inputs and selecting the set of control inputs that achieves a lowest cost.

If additional variables are used, such as an auxiliary heating variable, this may increase the dimensionality of the optimization problem. However, optimization manager 412 can select a coarser grid (e.g., 5 to 10 choices) for the additional variable.

In some embodiments, optimization manager 412 is configured to solve a number of one-step optimization problems (e.g., formulate different optimization problems for different sets of the control variables and solve the optimization problem over a single timestep) in a training period, and then train a function approximator (e.g., a neural network) to recreate a mapping. This can improve an efficiency of the optimization. In some embodiments, optimization manager 412 is configured to apply a direct policy optimization to the dynamic models in order to directly learn a control law using multiple parallel optimization problems.

In some embodiments, when controller 310 functions as the design tool shown in FIG. 5, there are two design variables. The first design variable is whether it is cost effective or desirable to purchase and install UV lights 306, and the second design variable is whether it is cost effective or desirable to purchase and install filters 308 (e.g., advanced filtration devices).

In some embodiments, optimization manager 412 is configured to perform a variety of simulations subject to different simulation variables for each simulation month. These simulation variables can be separated into a design decision category and a random parameter category. The design decision category includes variables whose values are chosen by system designers, according to some embodiments. The random parameters category includes variables whose values are generated by external (e.g., random) processes.

The design decision category can include a first variable of whether to activate UV lights 306. The first variable may have two values (e.g., a first value for when UV lights 306 are activated and a second value for when UV lights 306 are deactivated). The design decision category can include a second decision variable of which of a variety of high-efficiency filters to use, if any. The second variable may have any number of values that the building manager wishes to simulate (e.g., 5) and can be provided via user input device 420. The design decisions category can also include a third variable of what value should be used for the infection probability constraint (as provided by constraint generator 410 and used in the optimization problem by optimization manager 412). In some embodiments, various values of the third variable are also provided by the user input device 420. In some embodiments, various values of the third variable are predetermined or stored in simulation database 424 and provided to optimization manager 412 for use in the simulation. The third variable may have any number of values as desired by the user (e.g., 3 values).

The random parameters category can include an ambient weather and zone occupancy variable and a number of infected individuals that are present in building 10 variable. In some embodiments, the ambient weather and zone occupancy variable can have approximately 10 different values. In some embodiments, the number of infected individuals present can have approximately 5 different values.

In order to determine a lowest cost for a given month, optimization manager 412 can aggregate the variables in the random parameters category (e.g., average) and then perform an optimization to minimize the energy consumption or cost over feasible values of the variables of the design decisions category. In some embodiments, some of the design-decision scenarios are restricted by a choice of global design decisions. For example, for optimization manager 412 to calculate monthly operating costs assuming UV lights 306 are chosen to be installed but not filtration, optimization manager 412 may determine that a lowest cost scenario across all scenarios is with no filtration but with the UV lights 306 enabled or disabled. While this may be unusual (e.g., for the UV lights 306 to be disabled) even though the UV lights 306 are installed, various conditions (e.g., such as weather) may make this the most cost effective solution.

In some embodiments, simulation logic performed by optimization manager 412 may be performed in a Tensorflow (e.g., as operated by a laptop computer, or any other sufficiently computationally powerful processing device). In order to perform 1,500 simulation scenarios for each month, or 18,000 for an entire year, with a timestep of 15 minutes, this implies a total of approximately 52 million timesteps of scenarios for a given simulation year.

In some embodiments, optimization manager 412 requires various simulation data in order to perform the off-line simulation (e.g., to determine the design parameters). In some embodiments, the simulation data is stored in simulation database 424 and provided to any of constraint generator 410, model manager 416, and/or optimization manager 412 as required to perform their respective functions. The simulation data stored in simulation database 424 can include heat-transfer parameters for each zone 206, thermal and moisture loads for each zone 206, coil model parameters of the AHU 304, fan model parameters of the AHU 304, external temperature, humidity, and solar data, filtration efficiency, pressure drop, and cost versus types of the filter 308, disinfection fraction and energy consumption of the UV lights 306, installation costs for the UV lights 306 and the filter 308, typical breathing rate p, a number of infected individuals Ī in building zones 206, and disease quanta generation q values for various diseases. In some embodiments, the heat-transfer parameters for each zone 206 may be obtained by simulation database 424 from previous simulations or from user input device 420. In some embodiments, the thermal and moisture loads for each zone 206 are estimated based on an occupancy of the zones 206 and ASHRAE guidelines. After this simulation data is obtained in simulation database 424, controller 310 may perform the simulation (e.g., the off-line optimization) as described herein.

It should be understood that as used throughout this disclosure, the term "optimization" may signify a temporal optimization (e.g., across a time horizon) or a static optimization (e.g., at a particular moment in time, an instantaneous optimization). In some embodiments, optimization manager 412 is configured to either run multiple optimizations for different equipment selections, or is configured to treat equipment configurations as decision variables and perform a single optimization to determine optimal equipment configurations.

It should also be understood that the term "design" as used throughout this disclosure (e.g., "design data" and/or "design tool") may include equipment recommendations (e.g., recommendations to purchase particular equipment or a particular type of equipment such as a particular filter) and/or operational recommendations for HVAC system 200. In other words, "design data" as used herein may refer to any information, metrics, operational data, guidance, suggestion, etc., for selecting equipment, an operating strategy, or any other options to improve financial metrics or other control objectives (e.g., comfort and/or infection probability).

For example, controller 310 as described in detail herein with reference to FIG. 5 may be configured to provide recommendations of specific models to purchase. In some embodiments, controller 310 is configured to communicate with an equipment performance database to provide product-specific selections. For example, controller 310 can search the database for equipment that has particular specifications as determined or selected by the optimization. In some embodiments, controller 310 may also provide recommended or suggested control algorithms (e.g., model predictive control) as the design data. In some embodiments, controller 310 may provide a recommendation or suggestion of a general type of equipment or a general equipment configuration without specifying a particular model. In some embodiments, controller 310 may also recommend a specific filter or a specific filter rating. For example, optimization manager 412 can perform multiple optimizations with different filter ratings and select the filter ratings associated with an optimal result.

On-Line Optimization

Referring again to FIG. 4, controller 310 can be implemented as an on-line controller that is configured to determine optimal control for the equipment of building 10. Specifically, controller 310 may determine optimal operation for UV lights 306 and AHU 304 to minimize energy consumption after UV lights 306 and/or filter 308 are installed and HVAC system 200 is operational. When controller 310 is configured as an on-line controller, controller 310 may function similarly to controller 310 as configured for off-line optimization and described in greater detail above with reference to FIG. 5. However, controller 310 can determine optimal control decisions for the particular equipment configuration of building 10.

In some embodiments, optimization manager 412 is configured to perform model predictive control similar to the techniques described in U.S. patent application Ser. No. 15/473,496, filed Mar. 29, 2017, the entire disclosure of which is incorporated by reference herein.

While optimization manager 412 can construct and optimize the optimization problem described in greater detail above, and shown below, using MPC techniques, a major difference is that optimization manager 412 performs the optimization with an infectious quanta concentration model as described in greater detail above.

$$\min_{f_t, x_t, \lambda_t} \sum_t E_t \qquad \text{(Energy Cost)}$$

$$\text{s.t} \quad \ldots \qquad \text{(Dynamic Models for } T_t, \omega_t, \text{ and } N_t)$$

$$\ldots \qquad \text{(Infection Probabilty Constratint)}$$

$$T_t^{min} \leq T_t \leq T_t^{max} \qquad \text{(Temperature Bounds)}$$

$$\omega_t^{min} \leq \omega_t \leq \omega_t^{max} \qquad \text{(Humidity Bounds)}$$

$$x_t f_t \geq F_t^{min} \qquad \text{(Fresh-Air Ventilation Bound)}$$

$$f_t^{min} \leq f_t \leq f_t^{max} \qquad \text{(VAV Flow Bounds)}$$

$$0 \leq x_t \leq 1 \qquad \text{(Outdoor-Air Damper Bounds)}$$

Therefore, the resulting optimization problem has additional constraints on this new variable (the infectious quanta concentration) but also new flexibility by determined decisions for activating UV lights 306. In some embodiments, the optimization performed by optimization manager 412 can balance, in real time, a tradeoff between takin gin additional outdoor air (which generally incurs a cooling energy penalty) and activating the UV lights 306 (which requires electricity consumption). Additionally, the addition of infectious agent control can also provide additional room optimization of HVAC system 200 during a heating season (e.g., during winter). Without considering infectious quanta concentrations, solutions generally lead to a minimum outdoor airflow below a certain break-even temperature, below which heating is required throughout building 10. However, since the optimization problem formulated by optimization manager 412 can determine to increase outdoor air intake, this can provide an additional benefit of disinfection.

For purposes of real-time or on-line optimization, the HVAC system 200 can be modeled on a zone-by-zone basis due to zones 206 each having separate temperature controllers and VAV boxes. In some embodiments, zone-by-zone temperature measurements are obtained by controller 310 from zone sensors 312 (e.g., a collection of temperature, humidity, CO2, air quality, etc., sensors that are positioned at each of the multiple zones 206). In some embodiments, optimization manager 412 is configured to use zone-level temperature models but aggregate humidity and infectious quanta models for on-line optimization. Advantageously, this can reduce a necessary modeling effort and a number of decision variables in the optimization problem. In some embodiments, if the AHU 304 serves an excessive number of zones 206, the zone-level thermal modeling may be too computationally challenging so optimization manager 412 can use aggregate temperature models.

After optimization manager 412 has selected whether to use individual or aggregate models (or some combination thereof), optimization manager 412 can implement a constraint in the form:

$$\frac{dx}{dt} = f(x(t), u(t), p(t)) \text{ for all } t \in [0, T]$$

given a horizon t, where u(t) is a decision, control, or adjustable variable, and p(t) are time-varying parameters (the values of which are forecasted ahead of time). In some embodiments, optimization manager 412 is configured to implement such a constraint by discretizing the u(t) and p(t) signals into piecewise-constant values $u_n$ and $p_n$ where the discrete index n represents the time interval $t \in [n\Delta, (n+1)\Delta]$ for a fixed sample time $\Delta$. Optimization manager 412 may then transform the constraint to:

$$\frac{dx}{dt} = f(x(t), u_j, p_j) \text{ for all } t \in [n\Delta, (n+1)\Delta] \text{ and}$$
$$n \in \{0, \ldots, N-1\}$$

where N=T/$\Delta$ the total number of timesteps. In some embodiments, optimization manager 412 is configured to evaluate this constraint using advanced quadrature techniques. For example, optimization manager 412 may transform the constraint to:

$$x_{n+1} = F(x_n, u_n, p_n)$$

where x(t) is discretized to $x_n$ and F(·) represents a numerical quadrature routine. In some embodiments, if the models provided by model manager 416 are sufficiently simple, optimization manager 412 can derive an analytical expression for F(·) to perform this calculation directly.

In some embodiments, optimization manager 412 uses an approximate midpoint method to derive the analytical expression:

$$x_{n+1} = x_k + f\left(\frac{x_{n+1} + x_n}{2}, u_n, p_n\right)\Delta$$

where the ordinary differential equation f(·) is evaluated at a midpoint of the time interval.

In some embodiments, optimization manager 412 is configured to repeatedly solve the optimization problem at regular intervals (e.g., every hour) to revise an optimized sequence of inputs for control signal generator 408. However, since the optimization is nonlinear and nonconvex, it may be advantageous to decrease a frequency at which the optimization problem is solved to provide additional time to retry failed solutions.

In some embodiments, optimization manager 412 uses a daily advisory capacity. For example, optimization manager 412 may construct and solve the optimization problem once per day (e.g., in the morning) to determine optimal damper positions (e.g., of AHU 304), UV utilizations (e.g., operation of UV lights 306), and zone-level airflows. Using the results of this optimization, optimization manager 412 may be configured to pre-schedule time-varying upper and lower bounds on the various variables of the optimized solution, but with a range above and below so that optimization manager 412 can have sufficient flexibility to reject local disturbances. In some embodiments, regulatory control systems of HVAC system 200 are maintained but may saturate at new tighter bounds obtained from the optimization problem. However, optimization manager 412 may be configured to re-optimize during a middle of the day if ambient sensor data from ambient sensors 314 (e.g., ambient temperature, outdoor temperature, outdoor humidity, etc.) and/or weather forecasts and/or occupancy forecasts indicate that the optimization should be re-performed (e.g., if the weather forecasts are incorrect or change).

In some embodiments, optimization manager 412 is configured to reduce an amount of optimization by training a neural network based on results of multiple offline optimal solutions (e.g., determined by controller 310 when performing off-line optimizations). In some embodiments, the neural network is trained to learn a mapping between initial states and disturbance forecasts to optimal control decisions. The neural network can be used in the online implementation of controller 310 as a substitute for solving the optimization problem. One advantage of using a neural network is that the neural network evaluation is faster than performing an optimization problem, and the neural network is unlikely to suggest poor-quality local optima (provided such solutions are excluded from the training data). The neural network may, however, return nonsensical values for disturbance sequences. However, this downside may be mitigated by configuring controller 310 to use a hybrid trust-region strategy in which optimization manager 412 solves the optimization problem via direct optimization at a beginning of the day, and then for the remainder of the day, controller 310 uses neural-network suggestions if they are within a predefined trust region of the optimal solution. If a neural-network suggestion is outside of the predefined trust region, optimization manager 412 may use a previous optimal solution that is within the predefined trust region.

In some embodiments, the optimization problem is formulated by optimization manager 412 assuming the zone-level VAV flows $f_k$ are the decision variables. In some systems, however, a main interface between controller 310 and equipment of HVAC system 200 is temperature setpoints that are sent to zone-level thermostats. In some embodiments, optimization manager 412 and control signal generator 408 are configured to shift a predicted optimal temperature sequence backward by one time interval and then pass these values (e.g., results of the optimization) as the temperature setpoint. For example, if the forecasts over-estimate head loads in a particular zone 206, then a VAV damper for that zone will deliver less airflow to the zone 206, since less cooling is required to maintain a desired temperature.

When optimization manager 412 uses the constraint on infectious quanta concentration, controller 310 can now use the zone-level airflow to control two variables, while the local controllers are only aware of one. Therefore, in a hypothetical scenario, the reduced airflow may result in a violation of the constraint on infection probability. In some embodiments, optimization manager 412 and/or control signal generator 408 are configured to maintain a higher flow rate at the VAV even though the resulting temperature may be lower than predicted. To address this situation, optimization manager 412 may use the minimum and maximum bounds on the zone-level VAV dampers, specifically setting them to a more narrow range so that the VAV dampers are forced to deliver (at least approximately) an optimized level of air circulation. In some embodiments, to meet the infectious quanta concentration, the relevant bound is the lower flow limit (as any higher flow will still satisfy the constraint, albeit at higher energy cost). In some embodiments, a suitable strategy is to set the VAV minimum position at the level that delivers 75% to 90% of the optimized flow. In some embodiments, a VAV controller is free to dip slightly below the optimized level when optimization manager 412 over-estimates heat loads, while also having the full flexibility to increase flow as necessary when optimization manager 412 under-estimates heat loads. In the former case, optimization manager 412 may slightly violate the infectious quanta constraint (which could potentially be mitigated via rule-based logic to activate UV lights 306 if flow drops below planned levels), while in the latter case, the optimal solution still satisfies the constraint on infectious quanta. Thus, optimization manager 412 can achieve both control goals without significant disruption to the low-level regulatory controls already in place.

On-Line Optimization Process

Referring particularly to FIG. 6, a process 600 for performing an on-line optimization to minimize energy consumption and satisfy an infection probability constraint in a building is shown, according to some embodiments. Process 600 can be performed by controller 310 when controller 310 is configured to perform an on-line optimization. In some embodiments, process 600 is performed in real time for HVAC system 200 to determine optimal control of AHU 304 and/or UV lights 306. Process 600 can be performed for an HVAC system that includes UV lights 306 configured to provide disinfection for supply air that is provided to one or more zones 206 of a building 10, filter 308 that filters an air output of an AHU, and/or an AHU (e.g., AHU 304). Process 600 can also be performed for HVAC systems that do not include filter 308 and/or UV lights 306.

Process 600 includes determining a temperature model for each of multiple zones to predict a temperature of a corresponding zone based on one or more conditions or parameters of the corresponding zone (step 602), according to some embodiments. The temperature model can be generated or determined by model manager 416 for use in an optimization problem. In some embodiments, the temperature model is:

$$\rho c V_k\left(\frac{dT_k}{dt}\right) = \rho c f_k(T_0 - T_k) + Q_k(T_k)$$

where ρ is a mass density of air, c is a heat capacity of air, $V_k$ is a volume of the kth zone, $f_k$ is a volumetric flow of air into the kth zone, $T_0$ is the temperature of air output by the AHU, $T_k$ is the temperature of the kth zone, and $Q_k$ is the heat load on the kth zone. Step 602 can be performed by model manager 416 as described in greater detail above with reference to FIGS. 4-5.

Process 600 includes determining a humidity model for each of the multiple zones to predict a humidity of the corresponding zone based on one or more conditions or parameters of the corresponding zone (step 604), according to some embodiments. Step 604 can be similar to step 602 but for the humidity model instead of the temperature model. In some embodiments, the humidity model is:

$$\rho V_k\left(\frac{d\omega_k}{dt}\right) = \rho f(\omega_0 - T_0) + w_k$$

for a kth zone 206. In some embodiments, step 604 is performed by model manager 416 as described in greater detail above with reference to FIGS. 4-5.

Process 600 incudes determining an infectious quanta concentration model for each of the multiple zones to predict an infectious quanta of the corresponding zone based on one or more conditions or parameters of the corresponding zone (step 606), according to some embodiments. In some embodiments, the infectious quanta concentration model is similar to the humidity model of step 604 or the temperature model of step 602. The infectious quanta concentration model can be:

$$V_k\left(\frac{dN_k}{dt}\right) = f_k(N_0 - N_k) + I_k q$$

according to some embodiments. In some embodiments, step 606 is performed by model manager 416.

Process 600 includes determining an aggregated temperature model, an aggregated humidity model, an aggregated infectious quanta model, an aggregated thermal model, and an aggregated moisture model (step 608), according to some embodiments. In some embodiments, step 608 is optional. Step 608 can include generating or determining each of the aggregated models by determining a volume-average across zones 206. The aggregate infectious quanta model is:

$$\overline{V}\frac{d\overline{N}}{dt} = \overline{I}q - (\lambda + x - \lambda x)\sum_k f_k N_k \approx \overline{I}q - (\lambda + x - \lambda x)\overline{f}\,\overline{N}$$

according to some embodiments. The aggregated thermal model is:

$$\rho c\overline{V}\frac{d\overline{T}}{dt} = \sum_k Q_k(T_k) + \rho c\sum_k f_k(x(T_a - T_k) - \Delta T_c) \approx \overline{Q}(\overline{T}) + \rho c\overline{f}(x(T_a - \overline{T}) - \Delta T_c)$$

according to some embodiments. The aggregated moisture model is:

$$\rho V \frac{d\overline{\omega}}{dt} = \overline{w} + \rho \sum_k f_k(x(\omega_a - \omega_k) - \Delta\omega_c)$$

$$\approx \overline{w} + \rho \overline{f}(x(\omega_a - \overline{\omega}) - \Delta\omega_c)$$

according to some embodiments. In some embodiments, the aggregated thermal and moisture models are aggregate thermal models. Step 608 can be optional. Step 608 can be performed by model manager 416.

Process 600 includes populating any of the temperature model, the humidity model, the infectious quanta model, or the aggregated models using sensor data or stored values (step 610), according to some embodiments. In some embodiments, step 610 is performed by model manager 416. In some embodiments, step 610 is optional. Step 610 can be performed based on sensor data obtained from zone sensors 312.

Process 600 includes determining an objective function including a cost of operating an HVAC system that serves the zones (step 612), according to some embodiments. In some embodiments, step 612 is performed by optimization manager 412 using the dynamic models and/or the aggregated models provided by model manager 416. The objective function may be a summation of the energy consumption, energy cost, or other variable of interest over a given time period. The instantaneous energy consumption at a discrete time step is given by:

$$E = \eta_{coil}\rho \overline{f}(C\Delta T_c + L\Delta\omega_c) + \eta_{fan}\overline{f}\Delta + \eta_{UV}\lambda_{UV}$$

which can be summed or integrated over all time steps of the given time period as follows:

$$\int_0^T E(t)dt \approx \Delta \sum_t E_t$$

where $\Delta$ is the duration of a discrete time step, according to some embodiments.

Process 600 includes determining one or more constraints for the objective function including an infection probability constraint (step 614), according to some embodiments. In some embodiments, step 614 is performed by constraint generator 410. The one or more constraints can include the infection probability constraint, temperature bounds or constraints, humidity bounds or constraints, fresh-air ventilation bounds or constraints, VAV flow bounds or constraints, and/or outdoor-air damper bounds or constraints. The infection probability constraint is:

$$M\eta + \sum_t \mu_t \le -\frac{1}{p\Delta}\log(1 - P^{max})$$

$$\mu_t + \eta \ge N_t \; \forall \; t$$

or:

$$N_t \le N_t^{max} = -\frac{1}{Mp\Delta}\log(1 - P^{max})$$

according to some embodiments.

Process 600 includes performing an optimization to determine control decisions for HVAC equipment of the HVAC system, and ultraviolet lights of the HVAC system such that the one or more constraints are met and the cost is minimized (step 616), according to some embodiments. Step 616 can be performed by optimization manager 412 by minimizing the objective function subject to the one or more constraints (e.g., the temperature, humidity, etc., bounds and the infection probability constraint). Step 616 can also include constructing the optimization problem and constructing the optimization problem based on the objective function, the dynamic models (or the aggregated dynamic models), and the one or more constraints. The control decisions can include a fresh-air fraction x for an AHU of the HVAC system (e.g., AHU 304), whether to turn on or off the UV lights, etc.

Off-Line Optimization Process

Figure 7:
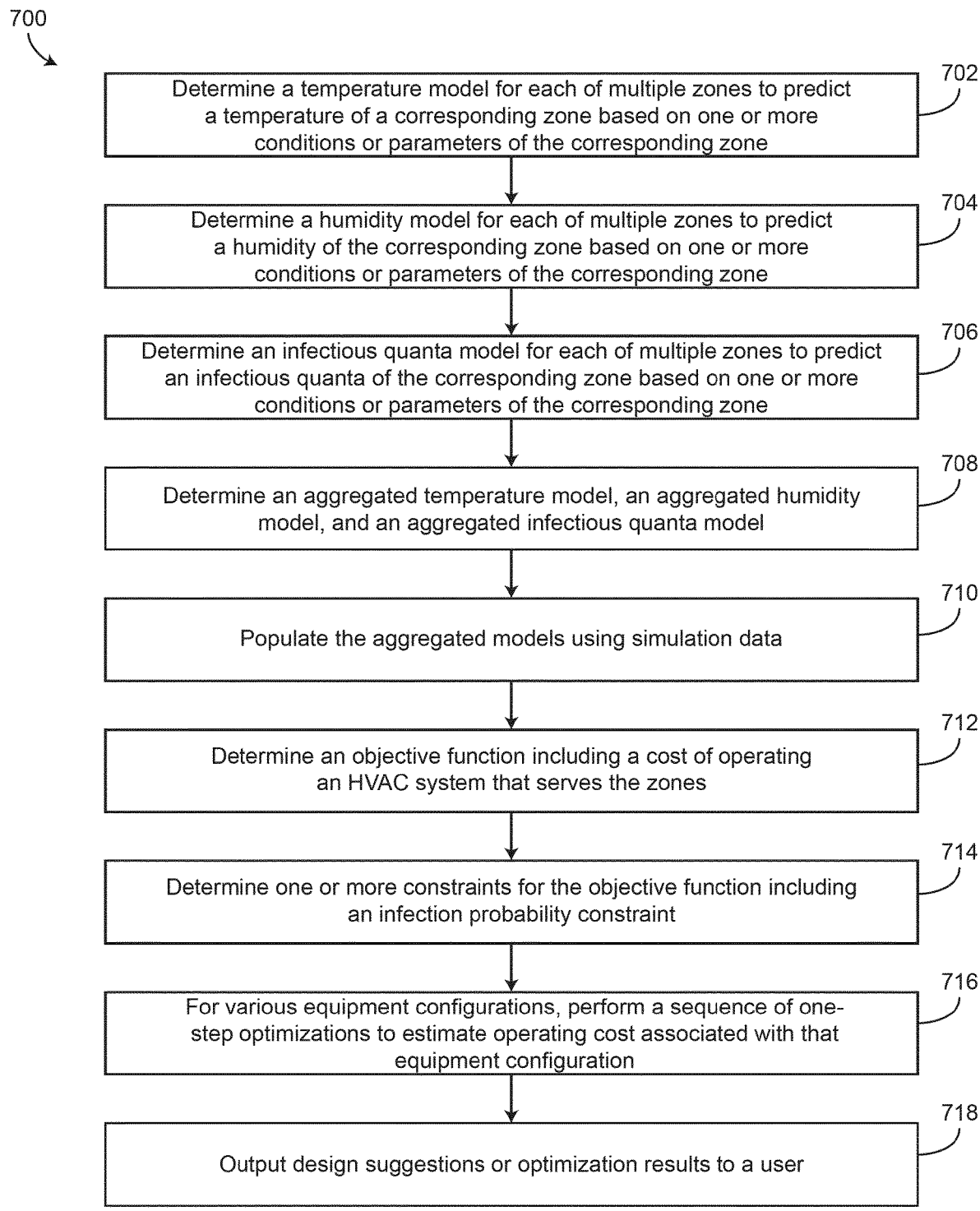
FIG. 7 is a flow diagram of a process which can be performed by the controller of FIG. 3 for determining design suggestions for an HVAC system to minimize energy consumption and provide sufficient disinfection, according to some embodiments.

Referring particularly to FIG. 7, a process for performing an off-line optimization to determine equipment configurations that minimize energy consumption or cost and satisfy an infection probability constraint is shown, according to some embodiments. Process 700 may share similarities with process 600 but can be performed in an off-line mode (e.g., without determining control decisions or based on real-time sensor data) to determine or assess various design decisions and provide design information to a building manager. Process 700 can be performed by controller 310 when configured for the off-line mode (as shown in FIG. 5).

Process 700 includes steps 702-708 that can be the same as steps 602-608 of process 600. However, while step 608 may be optional in process 600 so that the optimization can be performed using a combination of individual dynamic models and aggregate dynamic models, step 708 may be non-optional in process 700. In some embodiments, using the aggregate dynamic models reduces a computational complexity of the optimization for process 700. Process 700 can be performed for a wide variety of design parameters (e.g., different equipment configurations) whereas process 600 can be performed for a single equipment configuration (e.g., the equipment configuration that process 600 is used to optimize). Therefore, it can be advantageous to use aggregate models in process 700 to reduce a complexity of the optimization problem.

Process 700 includes populating the aggregated models using simulation data (step 710). In some embodiments, step 710 is performed by model manager 416 using outputs from simulation database 424 (e.g., using values of various parameters of the aggregate models that are stored in simulation database 424). In some embodiments, step 710 is performed using known, assumed, or predetermined values to populate the aggregated models.

Process 700 includes determining an objective function including a cost of operating an HVAC system that serves the zones (step 712), and determining one or more constraints for the objective function including an infection probability constraint (step 714), according to some embodiments. In some embodiments, step 712 and step 714 are similar to or the same as steps 612 and 614 of process 600.

Process 700 includes performing a sequence of one-step optimizations for various equipment configurations to estimate an operating cost associated with that equipment configuration (step 716), according to some embodiments. In some embodiments, step 716 is performed by optimization manager 412. Optimization manager 412 can construct different optimization problems for different equipment configurations using the aggregate temperature model, the aggregated humidity model, the aggregated infectious quanta model, the one or more constraints, and the objective function. In some embodiments, optimization manager 412 is configured to solve the optimization problems for the different equipment configurations over a single time step. The results of the optimizations problems can be output to results manager 418 for displaying to a user.

Process 700 includes outputting design suggestions or optimizations results to a user (step 718), according to some embodiments. In some embodiments, step 718 includes outputting costs associated with different equipment configurations (e.g., equipment configurations that include UV lights for disinfection and/or filters for disinfection) to a user (e.g., via a display device) so that the user (e.g., a building manager) can determine if they wish to purchase additional disinfection equipment (e.g., UV lights and/or filters). For example, step 718 can include operating a display to provide graph 800 (or a similar graph) to a user.

Figure 6:
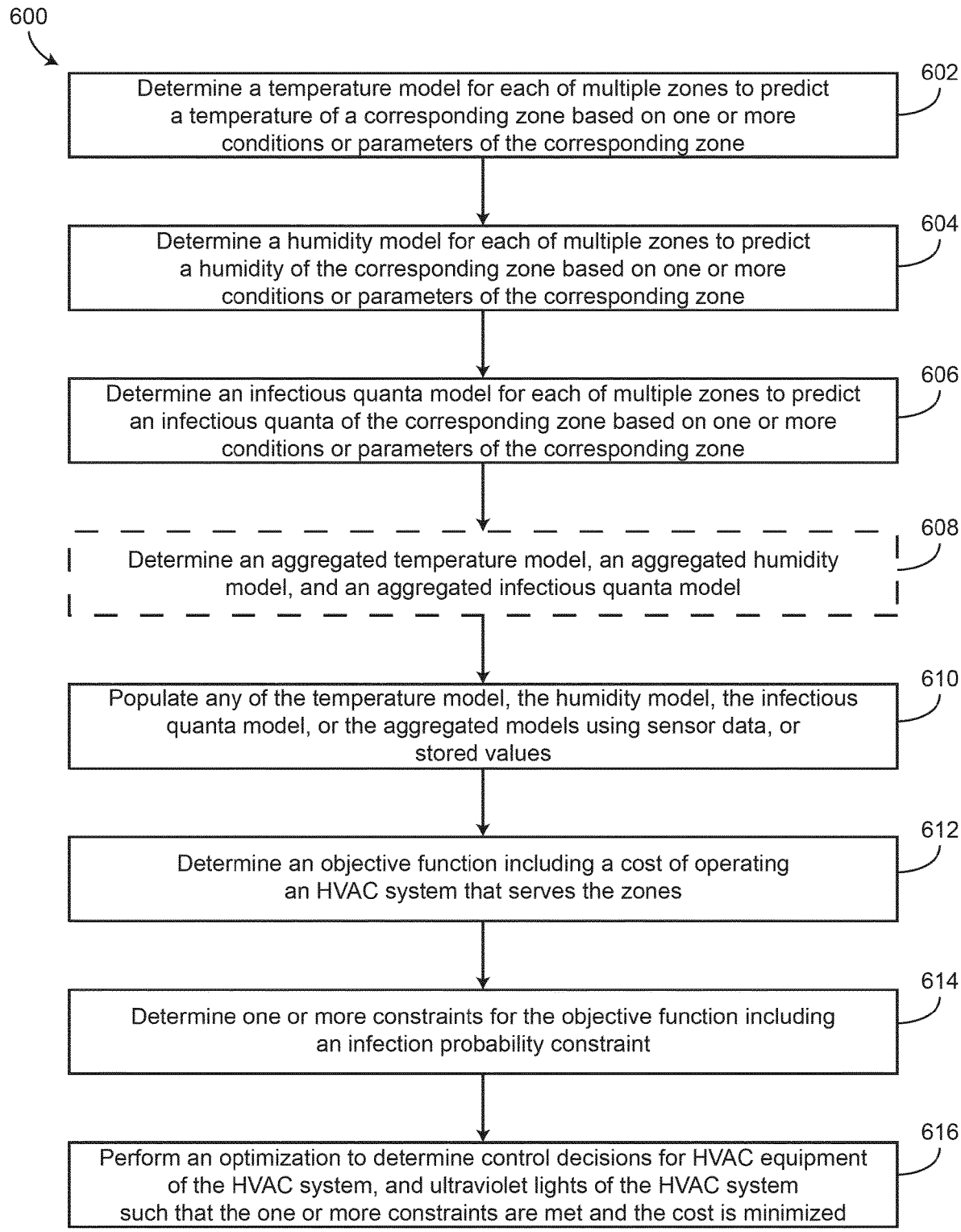
FIG. 6 is a flow diagram of a process which can be performed by the controller of FIG. 3 for determining control decisions for an HVAC system to minimize energy consumption and provide sufficient disinfection, according to some embodiments.

Although process 700 is described primarily as an "off-line" process, it should be understood that process 700 is not limited to off-line implementations only. In some embodiments, process 700 can be used when controller 310 operates in an on-line mode (as described with reference to FIGS. 4 and 6). In some embodiments, the results generated by performing process 700 and/or the results generated when operating controller 310 in the off-line mode (e.g., recommended equipment configurations, recommended operating parameters, etc.) can be used to perform on-line control of HVAC equipment or perform other automated actions. For example, controller 310 can use the recommended equipment configurations to automatically enable, disable, or alter the operation of HVAC equipment in accordance with the recommended equipment configurations (e.g., enabling the set of HVAC equipment associated with the lowest cost equipment configuration identified by the simulations/optimizations). Similarly, controller 310 can use the recommended operating parameters to generate and provide control signals to the HVAC equipment (e.g., operating the HVAC equipment in accordance with the recommended operating parameters).

In general, the controller 310 can use the optimization/simulation results generated when operating controller 310 in the off-line mode to generate design data including one or more recommended design parameters (e.g., whether to include or use UV lights 306 for disinfection, whether to include or use filter 308 for disinfection, whether to use fresh/outdoor air for disinfection, a recommended type or rating of UV lights 306 or filter 308, etc.) as well as operational data including one or more recommended operational parameters (e.g., the fraction of fresh/outdoor air that should exist in the supply air provided to the building zone, operating decisions for UV lights 306, an amount of airflow to send to each building zone, etc.). The design data may include a recommended equipment configuration that specifies which HVAC equipment to use in the HVAC system to optimize the energy consumption, energy cost, carbon footprint, or other variable of interest while ensuring that a desired level of disinfection is provided.

Controller 310 can perform or initiate one or more automated actions using the design data and/or the operational data. In some embodiments, the automated actions include automated control actions such as generating and providing control signals to UV lights 306, AHU 304, one or more VAV units, or other types of airside HVAC equipment that operate to provide airflow to one or more building zones. In some embodiments, the automated action include initiating a process to purchase or install the recommended set of HVAC equipment defined by the design data (e.g., providing information about the recommended set of HVAC equipment to a user, automatically scheduling equipment upgrades, etc.). In some embodiments, the automated actions include providing the design data and/or the operational data to a user interface device (e.g., display device 422) and/or obtaining user input provided via the user interface device. The user input may indicate a desired level of disinfection and/or a request to automatically update the results of the optimizations/simulations based on user-selected values that define the desired infection probability or level of disinfection. Controller 310 can be configured to provide any of a variety of user interfaces (examples of which are discussed below) to allow a user to interact with the results of the optimizations/simulations and adjust the operation or design of the HVAC system based on the results.

User Interfaces

Figure 9:
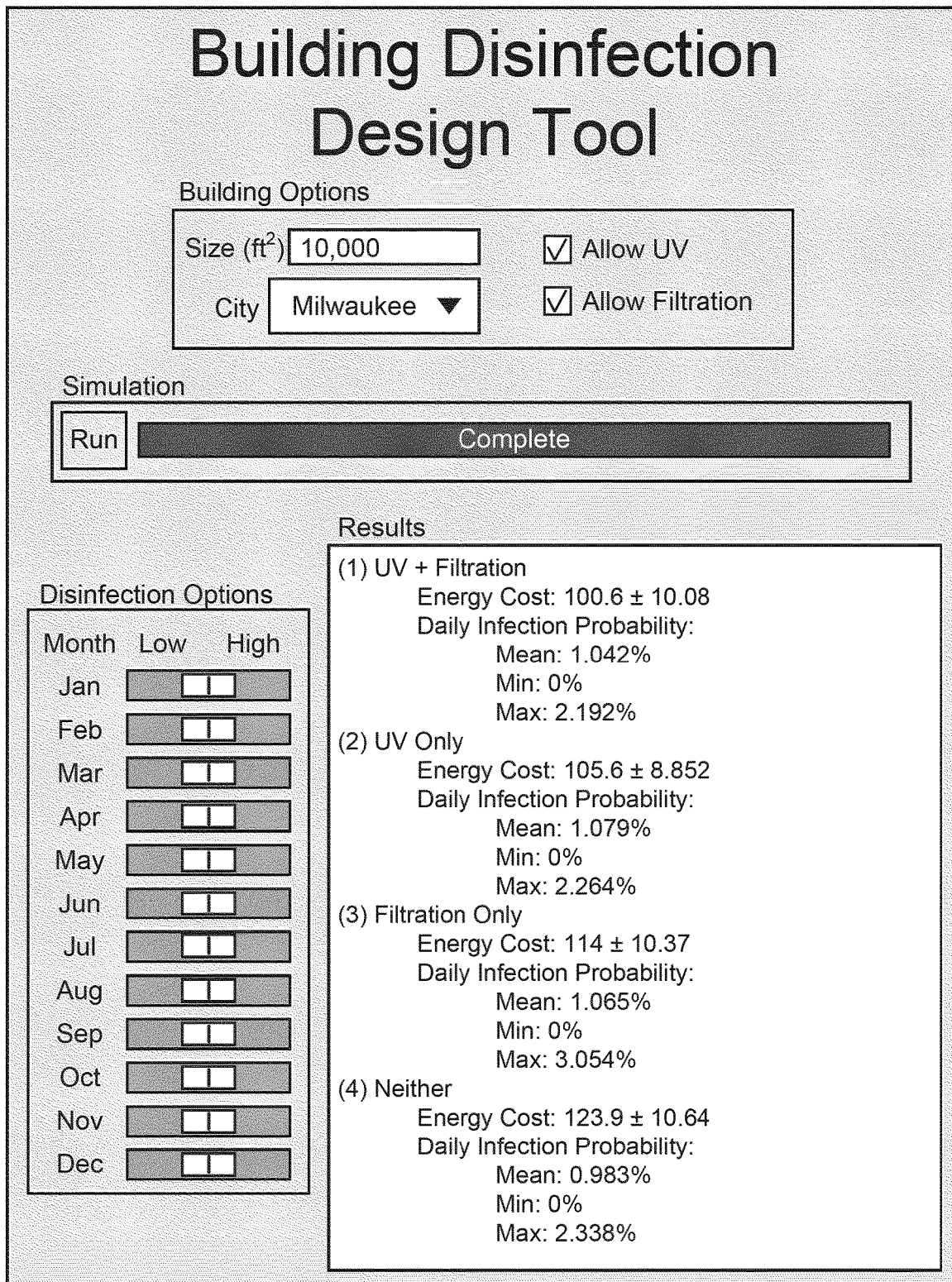
FIG. 9 is a drawing of a user interface that can be used to specify building options and disinfection options and provide simulation results, according to some embodiments.

Referring now to FIGS. 5 and 9, in some embodiments, user input device 420 is configured to provide a user interface 900 to a user. An example of a user interface 900 that can be generated and presented via user input device 420 is shown in FIG. 9. User interface 900 may allow a user to provide one or more user inputs that define which equipment are available in the building or should be considered for design purposes (e.g., filtration, UV, etc.) as well as the desired infection probability (e.g., low, medium, high, percentages, etc.). The inputs provided via user interface 900 can be used by controller 310 to set up the optimization problem or problems to be solved by optimization manager 412. For example, constraint generator 410 can use the inputs received via user interface 900 to generate the various bounds, boundaries, constraints, infection probability constraint, etc., that are used by optimization manager 412 to perform the optimization. After completing all of the simulation scenarios, the results can be presented to the user via the "Results" portion of user interface 900 that allows the user to explore various tradeoffs.

As an example, the "Building Options" portion of user interface 900 allows the user to specify desired building and climate parameters such as the square footage of the building, the city in which the building is located, etc. The user may also specify whether UV disinfection and/or advanced filtration should be considered in the simulation scenarios (e.g., by selecting or deselecting the UV and filtration options). The "Disinfection Options" portion of user interface 900 allows the user to specify the desired level of disinfection or infection probability. For example, the user can move the sliders within the Disinfection Options portion of user interface 900 to define the desired level of disinfection for each month (e.g., low, high, an intermediate level, etc.). Alternatively, user interface 900 may allow the user to define the desired level of disinfection by inputting infection probability percentages, via a drop-down menu, by selecting or deselecting checkboxes, or any other user interface element.

After specifying the desired parameters and clicking the "Run" button, optimization manager 412 may perform one or more simulations (e.g., by solving one or more optimization problems) using the specified parameters. Once the simulations have completed, results may be displayed in the "Results" portion of user interface 900. The results may indicate the energy cost, energy consumption, carbon footprint, or any other metric which optimization manager 412 seeks to optimize for each of the design scenarios selected by the user (e.g., UV+Filtration, UV Only, Filtration Only, Neither). The results may also indicate the daily infection probability for each of the design scenarios (e.g., mean infection probability, minimum infection probability, maximum infection probability). In some embodiments, an initial simulation or simulations are run using default settings for the disinfection options. In some embodiments, the results include equipment recommendations (e.g., use UV+Filtration, use UV Only, use Filtration Only, use Neither). The results of each simulation can be sorted to present the most optimal results first and the least optimal results last. For example, user interface 900 is shown presenting the simulation result with the least energy consumption first and the most energy consumption last. In other embodiments, the results can be sorted by other criteria such as infection probability or any other factor.

The user can adjust desired disinfection options on a monthly basis (e.g., by adjusting the sliders within the Disinfection Options portion of user interface 900), at which point the results may be re-calculated by averaging over the appropriate subset of simulation instances, which can be performed in real time because the simulations need not repeated. Advantageously, this allows the user to adjust the disinfection options and easily see the impact on energy cost, energy consumption, carbon footprint, etc., as well as the impact on infection probability for each of the design scenarios. Additional display options beyond what is shown in FIG. 9 may be present in various embodiments, for example to selectively disable UV and/or filtration in certain months or to consider worst-case instances for each month rather than mean values. In addition, various other graphical displays could be added to provide more detailed results. User interface 900 may initially present optimization results and/or equipment recommendations based on default settings, but then the user is free to refine those settings and immediately see updates to cost estimates and suggested equipment.

Although a specific embodiment of user interface 900 is shown in FIG. 9, it should be understood that this example is merely one possible user interface that can be used in combination with the systems and methods described herein. In general, controller 310 can operate user input device 420 to provide a user interface that includes various sliders, input fields, etc., to receive a variety of user inputs from the user via user input device 420. In some embodiments, user input device 420 is configured to receive a desired level of disinfection, a desired level of infection probability, etc., from the user and provide the desired level of disinfection, or desired level of infection probability to constraint generator 410 as the user input(s). In some embodiments, the user interface includes a knob or a slider that allows the user to adjust between a level of energy savings and a level of infection control. For example, the user may adjust the knob or slider on the user input device 420 to adjust the infection probability constraint (e.g., to adjust thresholds or boundaries associated with the infection probability constraint). In some embodiments, the user In some embodiments, an infection spread probability is treated by constraint generator 410 as a constraint, or as a value that is used by constraint generator 410 to determine the infection probability constraint. If a user desires to provide a higher level of disinfection (e.g., a lower level of infection spread probability) and therefore an increased energy consumption or energy consumption cost, the user may adjust the knob or slider on the user interface of user input device 420 to indicate a desired trade-off between energy consumption and infection probability. Likewise, if the user desired to provide a lower level of disinfection (e.g., a higher level of infection spread probability) and therefore a lower energy consumption or energy consumption cost, the user may adjust the knob or slider on the user interface of the user input device 420 to indicate such a desired tradeoff between energy consumption or energy consumption cost and disinfection control.

In some embodiments, user input device 420 is configured to provide analytics, data, display data, building data, operational data, diagnostics data, energy consumption data, simulation results, estimated energy consumption, or estimated energy consumption cost to the user via the user interface of user input device 420. For example, results manager 418 may operate the user input device 420 and/or the display device 422 to provide an estimated energy consumption or energy consumption cost to the user (e.g., results of the optimization of optimization manager 412 when operating in either the on-line or off-line mode/configuration). In some embodiments, user input device 420 and display device 422 are a same device (e.g., a touchscreen display device, etc.) that are configured to provide the user interface, while in other embodiments, user input device 420 and display device 422 are separate devices that are configured to each provide their own respective user interfaces.

For example, controller 310 can perform the off-line or planning or design tool functionality as described in greater detail above in real-time (e.g., as the user adjusts the knob or slider) to determine an estimated energy consumption or energy consumption cost given a particular position of the knob or slider (e.g., given a particular desired level of infection or disinfection control as indicated by the position of the knob or slider). In some embodiments, controller 310 is configured to operate the user input device 420 and/or the display device 422 to provide or display the estimated energy consumption or estimated energy consumption cost as the user adjusts the knob or slider. In this way, the user can be informed regarding an estimation of costs or energy consumption associated with a specific level of disinfection control (e.g., with a particular infection probability constraint). Advantageously, providing the estimation of costs or energy consumption associated with the specific level of disinfection control to the user in real-time or near real-time facilitates the user selecting a level of disinfection control that provides sufficient or desired disinfection control in addition to desired energy consumption or energy consumption costs.

Pareto Optimization

Figure 10:
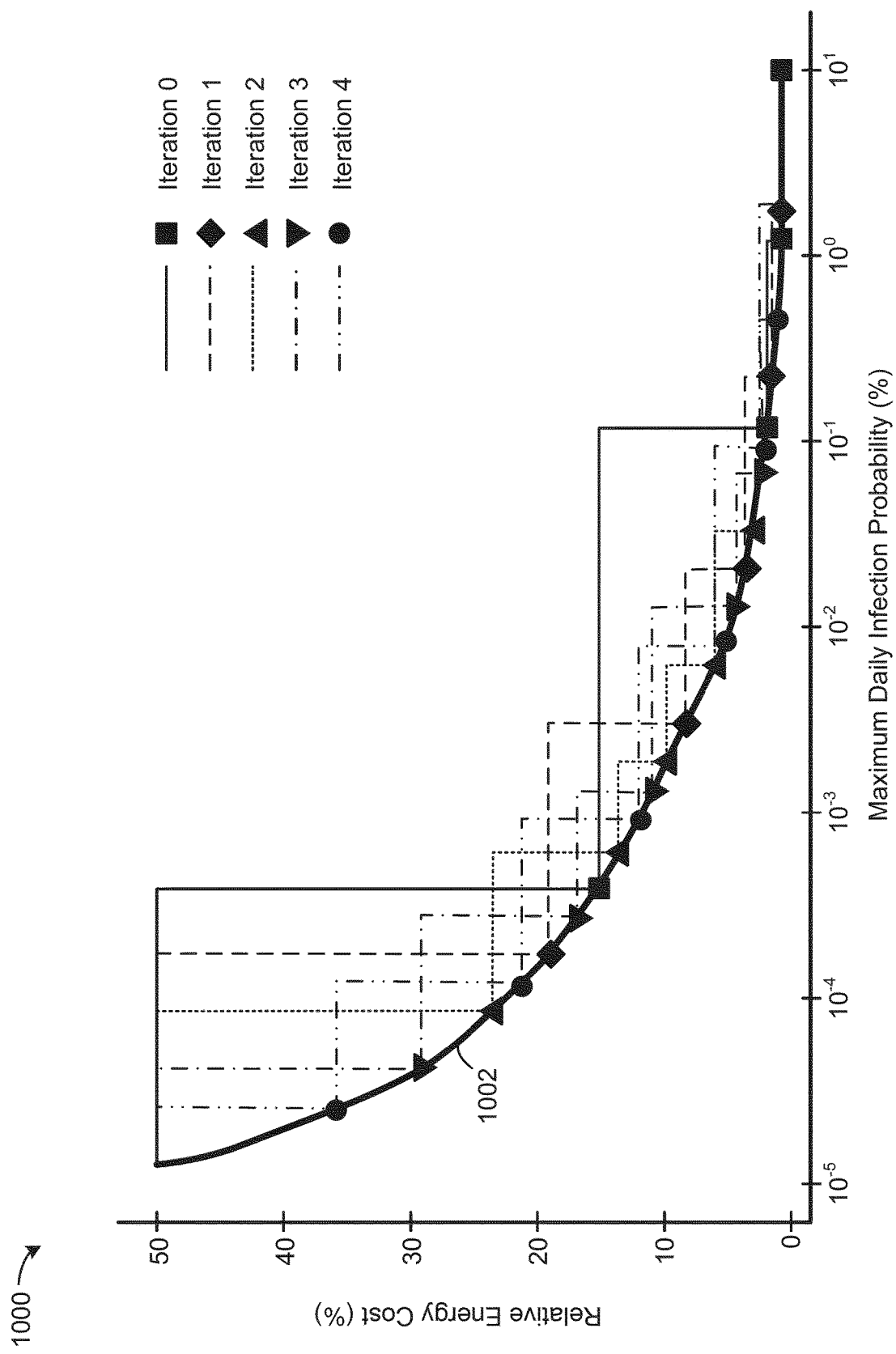
FIG. 10 is a graph illustrating a technique which can be used by the controller of FIG. 3 to estimate a Pareto front of a tradeoff curve for relative energy cost vs. infection probability, according to some embodiments.

Referring now to FIG. 10, a graph 1000 illustrating a Pareto search technique which can be used by controller 310 is shown, according to an exemplary embodiment. In some cases, users may want a more detailed tradeoff analysis than merely comparing a set of optimization results for a set of selected infection probabilities. For such cases, controller 310 may use a more detailed Pareto search that iteratively determines points on a Pareto front 1002 for an energy cost vs. infection probability tradeoff curve. By running additional simulations, this tradeoff curve can be plotted as accurately as possible so that users can fully evaluate the entire continuum of infection probabilities, (e.g., to look for natural breakpoints where additional disinfection probability begins to get more expensive).

To determine the points on the Pareto front 1002, controller 310 may start with a small number of infection probabilities already simulated for a given month and plot them against monthly energy cost. Then, additional candidate infection probabilities can be selected (e.g., as the points furthest from already completed simulations). After simulating instances with the new infection probabilities, these points are added to the plot, and the process repeats to the desired accuracy. Many criteria for selecting new points are possible, but one possible strategy is to choose the midpoint of successive points with the largest area (i.e., of the rectangle whose opposite corners are given by the two existing points) between them. This strategy prioritizes regions where the curve is changing rapidly and leads to efficient convergence.

As an example, consider the case in graph 1000. The goal is to obtain an approximation of the true Pareto front 1002, which is illustrated in FIG. 10 for ease of explanation, but may not be truly known. The instances of the optimization run for the small number of infection probabilities result in the points marked with squares in graph 1000 for Iteration 0. This gives a very coarse approximation of the true front. Controller 310 may then select new points in each iteration, run those simulations, and add those points to graph 1000. For example, the points marked with diamond shapes in graph 1000 show the points selected for Iteration 1 the points marked with triangles in graph 1000 show the points selected for Iteration 2, the points marked with inverted triangles in graph 1000 show the points selected for Iteration 3, and the points marked with circles in graph 1000 show the points selected for Iteration 4. By the end of Iteration 4, the empirical Pareto front is a good approximation of the true front 1002, and of course additional iterations can be performed to further improve accuracy. The empirical Pareto front generated using this technique can be used by controller 310 to solve a Pareto optimization problem to determine an optimal tradeoff between the costs and benefits of selecting different infection probability values in the infection probability constraint.

In some embodiments, determining the infection probability constraint (e.g., to provide an optimal level of disinfection control, or an optimal level of infection probability spread) and the resulting energy consumption or energy consumption costs required for HVAC system 200 to operate to achieve the infection probability constraint is a Pareto optimization problem. For example, at a certain point, additional disinfection control may require undesirably high energy consumption or energy consumption costs. In some embodiments, controller 310 may solve a Pareto optimization problem given various inputs for the system to determine one or more inflection points along a curve between cost (e.g., energy consumption or energy consumption cost) and a benefit (e.g., disinfection control, infection probability, disinfection, etc.) or to determine an optimal tradeoff between the cost and the benefit.

In some embodiments, controller 310 is configured to operate display device 422 and/or user input device 420 to provide an infection probability constraint associated with the optimal tradeoff between the cost and the benefit. In some embodiments, controller 310 can operate according to various modes that can be selected by the user via the user interface of user input device 420. For example, the user may opt for a first mode where controller 310 solves the Pareto optimization problem to determine the infection probability constraint associated with the optimal tradeoff point between the cost (e.g., the energy consumption or energy consumption cost) and the benefit (e.g., the disinfection control, a provided level of disinfection, an infection probability, etc.). In the first mode, the controller 310 can automatically determine the infection probability constraint based on the results of the Pareto optimization problem. In some embodiments, controller 310 still operates display device 422 to provide estimated, actual, or current energy consumption or energy consumption costs and infection probability constraints.

In a second mode, controller 310 can provide the user the ability to manually adjust the tradeoff between the cost and the benefit (e.g., by adjusting the slider or knob as described in greater detail above). In some embodiments, the user may select the desired tradeoff between infection control and energy consumption or energy consumption costs based on the provided estimations of energy consumption or energy consumption costs.

In a third mode, controller 310 can provide the user additional manual abilities to adjust the infection probability constraint directly. In this way, the user may specifically select various boundaries (e.g., linear boundaries if the infection probability constraint is implemented as a linear constraint as described in greater detail above) for the infection probability constraint. In some embodiments, the user may select between the various modes (e.g., the first mode, the second mode, and/or the third mode).

It should be understood that while the Pareto optimization as described herein is described with reference to only two variables (e.g., energy consumption or energy consumption cost and disinfection control), the Pareto optimization may also account for various comfort parameters or variables (e.g., temperature and/or humidity of zones 206, either individually or aggregated). In some embodiments, controller 310 may also operate display device 422 to provide various comfort parameters that result from a particular position of the knob or slider that is provided on the user interface of user input device 420. In some embodiments, additional knobs, sliders, input fields, etc., are also provided on the user interface of user input device 420 to receive various inputs or adjustments for desired comfort parameters (e.g., temperature and/or humidity). In some embodiments, controller 310 (e.g., results manager 418) is configured to use the dynamic models for temperature or humidity as described above to determine estimations of the various comfort parameters as the user adjusts the knobs or sliders (e.g., the knobs or sliders associated with disinfection control and/or energy consumption or energy cost consumption). Similarly, controller 310 can solve the Pareto optimization problem as a multi-variable optimization problem to determine an inflection point or a Pareto efficiency on a surface (e.g., a 3d graph or a multi-variable optimization) which provides an optimal tradeoff between cost (e.g., the energy consumption, the energy consumption cost, etc.), comfort (e.g., temperature and/or humidity), and disinfection control (e.g., the infection probability constraint).

Infection Control Tool

Overview

Referring now to FIGS. 11-20, a user tool according to the various techniques as described herein is shown and described. The user tool can receive user inputs regarding actual or hypothetical settings, equipment upgrades, etc., and can provide a calculation or estimation of an infection probability, operating costs, or energy consumption for the different hypothetical settings, equipment upgrades, etc. In some embodiments, the calculations or estimations are determined in real-time and provided to the user in response to receiving an updated user input. In this way, the user can perform a trial and error approach to determine appropriate or desired settings or equipment upgrades to achieve a desired infection probability, operating and/or purchase costs, and energy consumption. In some embodiments, the user tool described herein with reference to FIGS. 11-20 is usable with building 10.

As air is circulated in building 10, pathogens may be exhaled by infectious individuals, which can be spread across large air volumes of building 10. These pathogens may infect healthy individuals that are within building 10. To decrease or manage the spread of such pathogens and control an infection probability, HVAC systems (e.g., HVAC system 200) can be retrofitted with filtration (e.g., high-efficiency filtration) and/or UV lamps (e.g., in-duct UV lamps, recirculating devices that include UV lamps, etc.). Both filtration and UV lamps may lead to significant reduction in infectious particle concentration of recirculated air, thereby reducing an infection rate or an infection probability in building 10. In some embodiments, a similar effect can be achieved by venting a higher fraction of air to ambient (e.g., external or outside the building 10), and increasing fresh-air intake to compensate for the vented air. However, each of these approaches (UV lamps, filtration, and fresh-air intake) may incur additional capital and/or operating costs (e.g., through purchase costs, additional energy consumption, etc.). A most effective use of these three approaches may be dependent on climate or user preferences. In some embodiments, an effectiveness of these approaches can also depend on other non-HVAC related decisions (such as a requirement for users to wear masks while in building 10 and/or reduced occupancy limits).

The user tool described herein can use the techniques described in greater detail above with reference to FIGS. 3-10 to provide real-time calculations of various decision parameters such as infection probability, cost, and/or energy consumption given different inputs provided by the user. The user tool described herein can assess various possibilities for building infection control using the Wells-Riley infection equation, and HVAC energy calculations to determine resulting infection probability, operating costs, or energy consumption for different disinfection strategies. For a given building and climate, the user tool can provide a real-time or near real-time estimate of whether the installation of advanced filtration capacity, UV lamps, etc., are necessary to control the spread of infection or if increased ventilation is sufficient. The user tool can also provide an estimate of a maximum number of occupants for which runaway spread of the disease can be prevented.

User Tool

Figure 11:
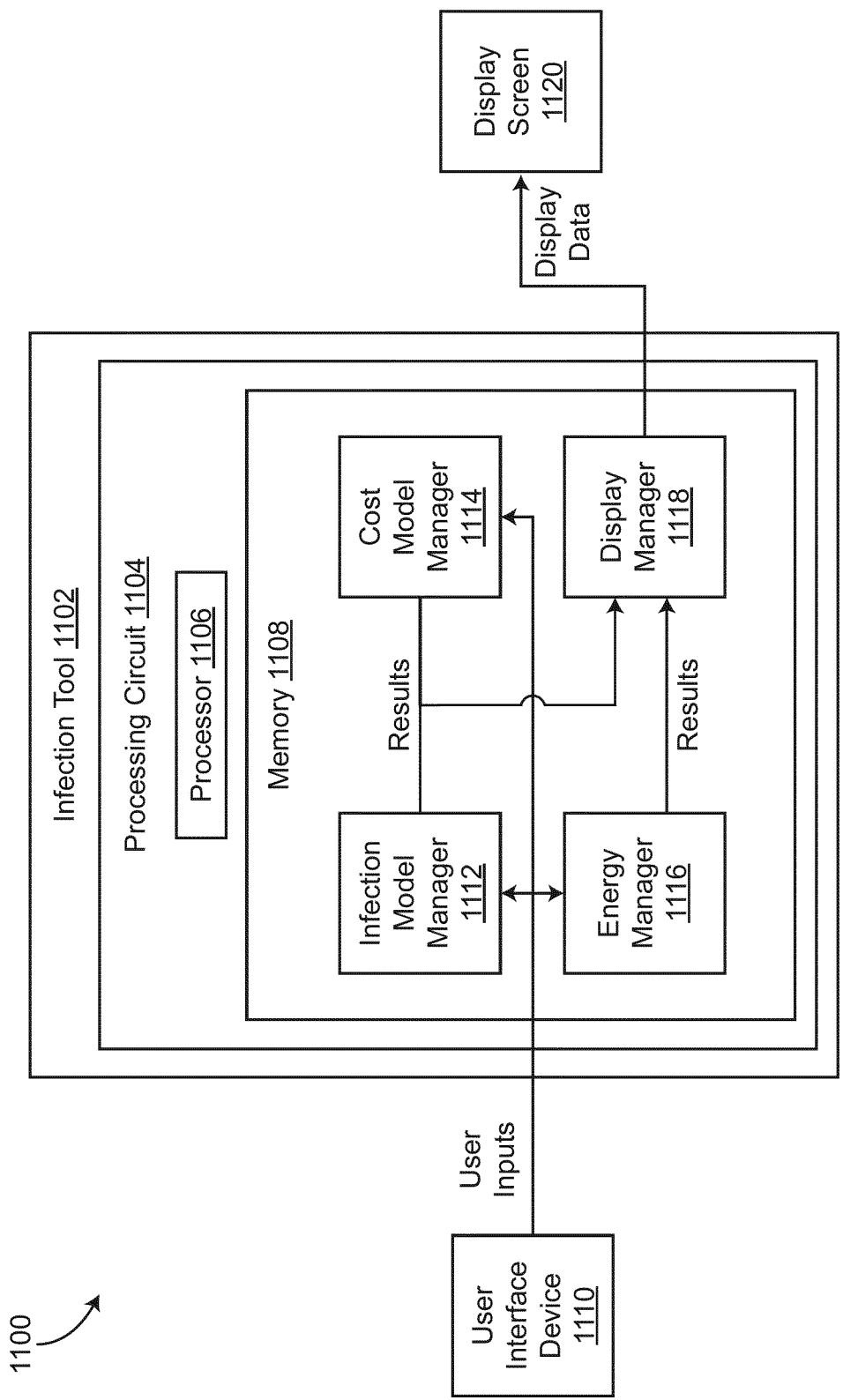
FIG. 11 is a block diagram of an infection control system including an infection control tool, according to some embodiments.

Referring particularly to FIG. 11, an infection control system 1100 is shown, according to some embodiments. In some embodiments, infection control system 1100 includes an infection control tool 1102 (e.g., the user tool), a user interface device 1110 and a display screen 1120. In some embodiments, the user interface device 1110 and the display screen 1120 are different components of the same device. For example, the user interface device 1110 may include the display screen 1120 and may facilitate both inputs from the user and outputs to the user (e.g., calculated results for different options or scenarios).

Infection control tool 1102 includes a processing circuit 1104 including a processor 1106 and memory 1108. Processing circuit 1104 can be communicably connected with a communications interface of infection control tool 1102 such that processing circuit 1104 and the various components thereof can send and receive data via the communications interface. Processor 1106 can be implemented as a general purpose processor, an application specific integrated circuit (ASIC), one or more field programmable gate arrays (FPGAs), a group of processing components, or other suitable electronic processing components.

Memory 1108 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1108 can be or include volatile memory or non-volatile memory. Memory 1108 can include database components, object code components, script components, or any other type of information structure for supporting the various activities and information structures described in the present application. According to some embodiments, memory 1108 is communicably connected to processor 1106 via processing circuit 1104 and includes computer code for executing (e.g., by processing circuit 1104 and/or processor 1106) one or more processes described herein.

In some embodiments, infection control tool 1102 is implemented within a single computer (e.g., one server, one housing, etc.). In various other embodiments infection control tool 1102 can be distributed across multiple servers or computers (e.g., that can exist in distributed locations).

In some embodiments, infection control tool 1102 is configured to use two different models. Specifically, infection control tool 1102 can use an infection model for the spread of the infection inside the building (e.g., building 10) and another model for estimating or predicting costs incurred by a given disinfection strategy. In some embodiments, the infection model is used and implemented by infection model manager 1112. In some embodiments, the model for estimating or predicting costs is used and implemented by cost model manager 1114.

In some embodiments, the infection model and/or the model for estimating costs include one or more sub-models. In some embodiments, modeling a spread of infection may require a model for a concentration of infectious particles in air of the building 10 and a model for a probability that an individual becomes sick after being exposed to a given concentration of infectious particles. In some embodiments, operating costs include additional heating and cooling due to increased ventilation, higher fan power consumption due to increased airflow, and more expensive filters that require periodic replacement or maintenance.

Infection model manager 1112 is configured to use a modified version of the Wells-Riley equation, shown below:

$$P = 1 - \exp\left(-\frac{(1-\mu)Iqpt}{\lambda f + kV}\right)$$

with:

$$\mu = 1 - (1-\mu_{infectious})(1-\mu_{susceptible})$$

$$\lambda = 1 - (1-\lambda_{OZ})(1-\lambda_{filter})(1-\lambda_{UV})$$

$$k = k_{deposition} + k_{deactivation}$$

according to some embodiments.

The previous equations are derived from a dose-based infection probability model and a simple dynamic model for infectious particle concentration based on a mass balance, according to some embodiments. For the dose-based model, a variable d is defined as a total dose of infectious particles received by an individual (e.g., a number of particles inhaled over the relevant period), according to some embodiments. After exposure to a given dose, the probability of infection is assumed to be given by:

$$P = 1 - \exp\left(-\frac{d}{d_0}\right)$$

where $d_0$ is a disease-dependent scaling factor referred to as the "quantum" of infectious particles, according to some embodiments. An individual inhaling air with a volumetric concentration of n particles/m³ at a rate of p m³/hr over a period of t hours thus receives a dose of:

$$d=(1-\mu_{susceptible})npt$$

in which $\mu_{susceptible}$ gives the fractional reduction in infectious particles actually inhaled due to wearing a mask, according to some embodiments. A direct measurement of particle numbers can be challenging to obtain, so the model may be derived using a normalized dose $D=d/d_0$ (expressed in quanta, i.e., multiples of $d_0$) and a corresponding normalized concentration $N$ $n/d_0$ (expressed in quanta/m³), according to some embodiments.

With this normalization, it can be determined:

$$P=1-\exp(-(1-\mu_{susceptible})Npt)$$

as the probability of infection, according to some embodiments.

In some embodiments, for the dynamic model, a uniform concentration n (in particles/m³) of airborne infectious particles is assumed, yielding:

$$V\frac{dn}{dt} = f(n_0 - n) + \dot{r}_{gen} - kVn$$

where $n_0$ is an infectious particle concentration in the supply air, $\dot{r}_{gen}$ is an internal rate of generation for infectious particles, and the remaining quantities are as before. The three terms on the right-hand side of the equation shown above represent a net inflow of infectious particles due to air circulation (assuming constant system volume), the internal generation of infectious particles in the space by infectious individuals, and the destruction of infectious particles due to deposition and deactivation, according to some embodiments. As with the dose model, infection model manager 1112 may use quantum-normalized values, which can be obtained by dividing both the $\dot{r}_{gen}$ and n values by the quantum $d_0$ to find:

$$V\frac{dN}{dt} = f(N_0 - N) + \dot{R}_{gen} - kVN$$

where $\dot{R}_{gen} = \dot{r}_{gen}/d_0$.

To calculate $N_0$, it is noted that the supply air stream is a mixture of $\lambda_{OA}$ outdoor air (with an infectious particle concentration of $N_{OA}$) and $1-\lambda_{OA}$ recirculated air (which is assumed to have the same infectious particle concentration N as the space), according to some embodiments. This mixed air stream is then passed through filters (e.g., filter 308), which reduces its infectious particle concentration by a factor of $1-\lambda_{filter}$ and then through UV irradiation (e.g., UV lights 306), which further reduces concentration by $1-\lambda_{UV}$, according to some embodiments. Thus, the supply air infectious particle concentration can be given by:

$$N_0 = (\lambda_{OA}N_{OA} + (1-\lambda_{OA})N)(1-\lambda_{filter})(1-\lambda_{UV})$$

in which it is generally assumed that $N_{OA}=0$ (i.e., that there are no infectious particles in the outdoor air), according to some embodiments.

For the generation term, $\dot{R}_{gen}$, it is noted that there is a given infectious particle concentration $N_{gen}$ in the exhaled breath of infectious individuals, according to some embodiments. Thus, with I infectious individuals, each exhaling at a rate of p m³/hr, it can be determined that:

$$\dot{R}_{gen} \approx Ip(1-\mu_{infectious})N_{gen}$$

according to some embodiments.

In some embodiments, $\mu_{infectious}$ gives fractional reduction in infectious particles that actually become airborne as a result of the infectious individual wearing a mask. However, during intermittent respiratory events like coughing or sneezing, the rate of infectious particle release can be significantly higher. Thus, this term can be defined as:

$$\dot{R}_{gen} := I(1-\mu_{infectious})q$$

where q is a disease-dependent constant expressed in quanta/hr (e.g., in normalized units).

Combining $$P = 1 - \exp(-(1-\mu_{susceptible})Npt),\ V\frac{dN}{dt} = f(N_0 - N) + \dot{R}_{gen} - kVN,$$

and $\dot{R}_{gen} = (1-\mu_{infectious})q$ yields the final ODE model which can be used by:

$$V\frac{dN}{dt} = (1-\mu_{infectious})Iq - (\lambda f + kV)N$$

where:

$$\lambda = 1 - (1-\lambda_{OA})(1-\lambda_{filter})(1-\lambda_{UV})$$

assuming $N_{OA}=0$, according to some embodiments.

At the steady-state concentration $N_{ss}$, $dN/dt=0$, which implies that:

$$N_{ss} = \frac{(1-\mu_{infectious})Iq}{\lambda f + kV}$$

according to some embodiments.

Thus, assuming that susceptible individuals are subject to this average concentration over their exposure period, $N_{ss}$ can be substituted from $$N_{ss} = \frac{(1-\mu_{infectious})Iq}{\lambda f + kV}$$

as N in $P=1-\exp(-(1-\mu_{susceptible})Npt)$ to find:

$$P = 1 - \exp\left(-\frac{(1-\mu)Iqpt}{\lambda f + kV}\right)$$

according to some embodiments.

The resulting spread of the infection to susceptible individuals can be summarized via a reproductive number as:

$$R_{mean} = SP/I$$

according to some embodiments. Infection model manager 1112 also uses the above equation to determine the reproductive number.

The variables in the above equations are defined below:
P is an infection probability for an individual given an exposure time, breathing rate, and indoor conditions;

I is a number of infectious (e.g., actively contagious) individuals in a space (e.g., building 10);

S is a number of susceptible individuals in the space, y is a fractional reduction in infectious particle transmission due to the individuals in the space wearing masks;

$\mu_{infectious}$ is a fractional reduction in airborne infectious particle generation due to masks being worn by infectious individuals in the space;

$\mu_{susceptible}$ is a fractional reduction in inhaled infectious particles due to masks being worn by susceptible individuals;

q is an infectious quanta generation rate (e.g., in quanta/hour) for an infectious individual;

p is an inhalation rate for individuals in the space (e.g., in m³/hour);

t is a total exposure time (e.g., in hours) for an individual;

λ is an effective fractional disinfection for recirculated air;

$\lambda_{OA}$ is an intake fraction for fresh outdoor air, assumed to be free of any infectious particles;

$\lambda_{filter}$ is a fractional entrapment of infectious particles in the recirculating air due to filtration;

$\lambda_{UV}$ is a fractional deactivation of infectious particles in the recirculating air due to UV irradiation or operation of the UV lamps;

f is a total recirculating airflow (e.g., in m³/hour);

k is an effective decay rate for airborne infectious particles (e.g., in hr⁻¹);

$k_{deposition}$ is a deposition rate for airborne infectious particles onto surfaces (e.g., in hr⁻¹);

$k_{deactivation}$ is a natural deactivation rate for airborne infectious particles (e.g., in hr⁻¹); and $R_{mean}$ is the mean reproductive number for infection transmission (a unitless value) given the average number of susceptible individuals that have become infected by each infectious individual.

In some embodiments, the infection probability P, the fractional reduction μ, the fractional reduction $\mu_{infectious}$, the fractional reduction $\mu_{susceptible}$, the effective fractional disinfection A, the intake fraction $\lambda_{OA}$, the fractional entrapment $\lambda_{filter}$, and the fractional deactivation $\lambda_{UV}$ are normalized values (e.g., having values between 0 and 1).

The goal of infection control system 1100 is to maintain the infection probability P (as estimated by infection model manager 1112) sufficiently low (e.g., at a user-desired level) so that the reproductive number R is maintained below a value of 1. This can be accomplished (e.g., by infection control tool 1102, controller 310) using the following approaches (or any combination thereof):

Masks: requiring occupants of the building 10 to wear masks (increasing y);

Ventilation: increasing the intake of fresh air (increasing $\lambda_{OA}$);

Advanced Filtration: using a higher-efficiency filter (increasing $\lambda_{filter}$);

UV Disinfection: installing UV disinfection lamps (increasing $\lambda_{UV}$);

Airflow: increasing recirculation rates so that air is cleaned (e.g., via ventilation, filtration, and UV disinfection) more frequently (increasing f); and Occupancy Control: reducing the number of individuals allowed in the space (decreasing S).

Filtration or UV lights (e.g., disinfection devices) can be applied, generally, in two different ways or according to two different form factors. For example, filtration or disinfection devices can be positioned centrally in the HVAC system (e.g., within an air-handler or a rooftop unit), as described in greater detail above with reference to FIGS. 1-10. The filtration or UV lights can also be implemented as a separate device that is positioned in the building 10 or within a room or space of the building 10. These devices may be free to operate, completely independently, of the HVAC system. In some embodiments, such devices are permanently installed within the space. In some embodiments, such devices are portable and may be installed or removed in the spaces. For example, a MACH 10 is an example of a permanently installed fan filter unit that operates in the zone, independently of any HVAC system, to provide filtration. Similarly, an UVC troffer is an example of a permanently mounted or installed UV disinfection tunnel that is mounted in the zone. Additionally, a portable air filter unit can be used.

Using the equations shown above, infection model manager 1112 can quantify an effect that these seven approaches have on infection transmission. In some embodiments, infection model manager 1112 receives user inputs from user interface device 1110 to determine the infection probability P and/or the reproductive number R. In some embodiments, the user inputs obtained from user interface device 1110 include any of:

whether occupants are required to wear masks;

an increased ventilation;

whether advanced filtration is used, or which filter is selected;

whether UV disinfection is used;

increased recirculation rates so that the air is cleaned more frequently;

occupancy control data (e.g., a reduced capacity);

an average airflow (e.g., percent of the design airflow of the equipment);

a supply airflow (e.g., in CFM);

a ventilation rate (e.g., a percent of outdoor air);

a filter rating of a selected filter;

a UVC kill tunnel effectiveness (e.g., between 0% and 100% or between 0 and 1);

a UVC troffer percentage;

a MACH 10 fan filter percentage;

occupancy data such as:
  a total number of occupants in the space (e.g., in building 10 or in a room or space of building 10);
  a probability of an individual becoming sick;
  a number of sick individuals in the building 10 (e.g., assumed to be 0.5 by default);
  an exposure time (e.g., an expected number of hours per day that an individual is expected to be within the building 10);
  an occupancy start time of the building 10;
  an occupancy end time of the building 10; and
  a number of days per week that building 10 is occupied;

building location data such as:
  what city in which the building 10 is located;
  a balance point at the location of building 10;
  an occupancy category of the space or of building 10 (e.g., per ASHRAE 62.1);
  space size information (e.g., area and/or ceiling height);

equipment data such as:
  a design airflow rate;
  a cooling coefficient of performance (COP);
  a gas heating efficiency;
  a supply fan mechanical efficiency;
  a supply fan electrical efficiency; and energy cost data such as:
  electricity costs (e.g., in $/kWh); and
  natural gas costs (e.g., in $/MMBTU).

In some embodiments, infection model manager 1112 is configured to use the user inputs to estimate or predict the effect of the various inputs on infection transmission. These effects can then be weighted against the extra costs that are incurred.

In some embodiments, the mask effectiveness y is provided to infection model manager 1112 as a user input (e.g., provided by the user through user interface device 1110). In some embodiments, if occupants are not required to wear a mask, or if none of the occupants are wearing masks, then $\mu=\mu_{infectious}=\mu_{susceptible}=0$. When two different populations (e.g., infectious individuals and susceptible individuals) are wearing a same type of mask, it is expected that $\mu_{infectious} > \mu_{susceptible}$ (e.g., that the mask is more effective in preventing infectious particles from being exhaled by the infectious population than in preventing particles from being inhaled by the susceptible individuals). This may occur because infectious particles can tend to be exhaled in agglomerates of smaller particles, which therefore have a larger effective size, which can be trapped by the masks. However, once these agglomerates become airborne, the agglomerates may split into smaller individual particles that can pass through cloth masks. In some embodiments, infection model manager 1112 assumes that the quanta generation rate q is between 60 quanta/hour and 185 quanta/hour. In some embodiments, the quanta generation rate q is a predetermined or predefined value, a user input value, or a value that is obtained based on data from a health organization. In some embodiments, the inhalation rate is assumed to be 0.67 m³/hour, which falls between suggested values for sedentary and light-intensity activity in adults. In some embodiments, infection model manager 1112 is configured to adjust the inhalation rate based on building-specific age distributions (e.g., a school for children versus a nursing home for elderly), or based on an expected activity in building 10.

In some embodiments, the exposure time t is an adjustable parameter with a default value of 7 hours. The exposure time t represents a period over which the infection probability P is calculated. For the purposes of calculating the reproductive number R, the exposure time t may be equal to a latent infectious period of each infectious individual (e.g., an amount of time that the infectious individuals are actively contagious and present in the building 10 or the occupied space). For example, standard influenza individuals are infectious for 1 day prior to onset of symptoms and for 5 to 7 days after symptoms develop. Therefore, assuming that infectious individuals may stay home once symptoms develop, the appropriate latent period may be 6 hours to 8 hours for the standard influenza, corresponding to an amount of time that the individual remains in building 10 during their asymptomatic period. For COVID-19, a total contagious period may last 10 to 14 days. In some embodiments, infection model manager 1112 assumes that a latent period of 1 day for COVID-19, as would be suitable for influenza, but may adjust the latent period based on additional information indicating an amount of time that individuals with COVID-19 are infectious.

For the airflow f, infection model manager 1112 can use an adjustable fraction of a design airflow of the installed system. Design flows for specific systems are expressed in cubic feet per meter (cfm), with general guidelines in cfm per square foot, according to some embodiments. These design values give a maximum possible value for f, with the default value generally between 40% and 50% of the upper limit, according to some embodiments.

In some embodiments, the fractional disinfection $\lambda$ includes three components for outdoor-air ventilation, advanced filtration, and UV irradiation. For the outdoor-air term, $\lambda_{OA}$ is simply the fraction of recirculated air that is drawn in from outside (and thus a corresponding amount of the return air is exhausted). A minimum value of the outdoor-air term $\lambda_{OA}$ is determined as a function of the total flow f and minimum ventilation requirements per ASHRAE Standard 62.1, according to some embodiments. In some embodiments, a maximum value of the outdoor-air term $\lambda_{OA}$ is 1. For filtration, $\lambda_{filter}$ is determined by infection model manager 1112 based on the filter type, with values ranging from approximately 0.4 (e.g., for a MERV-7 filter) to 0.999 (e.g., for a HEPA filter), according to some embodiments. Manufacturer data may provide particle-size-dependent filtration efficiencies, from which a weighted average is calculated by infection model manager 1112 using the size distribution for the relevant infectious particles, according to some embodiments. Finally, for UV irradiation, $\lambda_{UV}$ is an adjustable value, since UV intensity can be adjusted based on duct size and average velocity to deliver a lethal dose, according to some embodiments.

For the deposition rate $k_{deposition}$, infection model manager 1112 uses a range of 1.0 hr$^{-1}$ to 2.7 hr$^{-1}$ with a mean of 1.7 hr$^{-1}$, according to some embodiments. These are weighted values for influenza based on typical size distributions for human expired aerosols, according to some embodiments. These values can be updated when more information for COVID-19 becomes available, according to some embodiments. In some embodiments, for $k_{deactivation}$, infection model manager 1112 currently uses a default value of 0 hr$^{-1}$ so that the calculations are robust to the case of long lifetimes. COVID-19 may have half-lives ranging from 1.1 hr to over 15 hrs, which correspond to $k_{deactivation}$ of 0.63 hr$^{-1}$ and 0.058 hr$^{-1}$ respectively.

The volume of the space, V, is calculated (e.g., by infection model manager 1112) from a specified floor area (e.g., square footage) and height (e.g., ceiling height), according to some embodiments. In some embodiments, the floor are and/or the height are input by the user via user interface device 1110. A maximum value for the total number of susceptible individuals, S, is calculated by infection model manager 1112 based on the floor area using standard occupant densities based on a building type from ASHRAE Standard 62.1, according to some embodiments. In some embodiments, the maximum value can be reduced by infection model manager 1112 based on an imposition of tighter occupancy limits (e.g., provided as a user input). In some embodiments, the number of infectious individuals I is assumed to be 1 by infection model manager 1112, to yield the highest value of the reproductive number R.

In some embodiments, infection model manager 1112 is configured to use the above equations based on user inputs in real-time or near real-time to determine the probability of infection. In some embodiments, infection model manager 1112 is configured to determine multiple different probabilities of infection for different options (e.g., different sets of user inputs). Infection model manager 1112 outputs the probability of infection (or the multiple probabilities of infection) to display manager 1118, so that the probabilities of infection can be displayed on display screen 1120 for the different options.

Referring still to FIG. 11, infection control tool 1102 includes cost model manager 1114 and energy manager 1116 that are configured to estimate cost (e.g., monetary cost) and/or energy consumption based on user inputs provided by user interface device 1110. Similarly to infection model manager 1112, cost model manager 1114 and energy manager 1116 can determine costs and energy consumption for multiple different options (e.g., different sets of user inputs).

To assess a cost of a particular disinfection strategy, cost model manager 1114 and/or energy manager 1116 may consider energy costs associated with heating, cooling, running fans, in addition to a replacement cost of chosen filters. In some embodiments, all values are calculated by cost model manager 1114 and energy manager 1116 on an annualized basis.

In order to estimate heating and cooling costs, cost model manager 1114 and/or energy manager 1116 may use heating degree days and cooling degree days. Heating degree days and cooling degree days are calculated (e.g., by cost model manager 1114 or energy manager 1116) as:

$$D_{heating} = \delta \sum_t \max(\overline{T} - T_{OA}(t), 0)$$

$$D_{cooling} = \delta \sum_t \max(T_{OA}(t) - \overline{T}, 0)$$

where $T_{OA}(t)$ is an outdoor air temperature at time t, $\overline{T}$ is a chosen balance temperature (generally 65° F.), and $\delta$ is a discretization frequency for the ambient temperature data (1 hr in the case of hourly typical meteorological year data).

In some embodiments, energy manager 1116 is configured to calculate incremental energy cost that results from various infection measures taken or proposed to be taken. In some embodiments, energy manager 1116 is configured to estimate additional energy costs resulting from additional ventilation. Energy manager 1116 may calculate heating energy using the equation:

$$E_{heating} = \lambda_{ventilation} V \rho_{air} C_{p,air} HDD \left(\frac{1}{\eta_{heating}}\right) \alpha$$

where $E_{heating}$ is energy required for heating (e.g., in MJ, assuming fuel is natural gas), $\Sigma_{air}$ is the density of air (e.g., 1.2 kg/m³), $C_{p,air}$ is specific heat capacity of air (e.g., in 1000 J/(kg-K)), HDD is heating degree days during times of building operation (e.g., K-days, or $D_{heating}$), $E_{heating}$ is conversion efficiency of heating equipment used, and a is a unit conversion factor (e.g., 24 hours/day×10⁻⁶ MJ/J).

In some embodiments, an amount of energy required for cooling on an annual basis is calculated similarly using the equation:

$$E_{cooling} = \lambda_{ventilation} V \rho_{air} C_{p,air} CDD \left(\frac{1}{\eta_{cooling}}\right) \beta$$

where $E_{cooling}$ is the electricity required for cooling (e.g., in kWh), $\eta_{cooling}$ is electric efficiency of the cooling equipment, CDD are cooling degree days during times of building operation (e.g., K-days or $D_{cooling}$), and β is a units conversion factor (e.g., 24 hours/day×0.277 kWh/MJ×10⁻⁶ MJ/J).

For fan energy, energy manager 1116 can use a model:

$$E_{fan} = \frac{1}{\eta_{fan}} (\Delta P_0 + \Delta P_{filter}) \delta \sum_t \alpha_{fan}(t)$$

where $\eta_{fan}$ is an overall fan efficiency (e.g., assumed to be equal to 0.5), $\Delta P_0$ is a base fan pressure drop equal to XXXXX Pa, $\Delta P_{filter}$ is an additional pressure drop due to the filter (e.g., filter 308, which varies by type of filter), and $\alpha_{fan}(t)$ is a fractional fan airflow as a function of time. The value of $\alpha_{fan}(t)$ is given as:

$$\alpha_{fan}(t) = \begin{cases} 1 & \text{if occupied at time } t \\ 0.5 & \text{else} \end{cases}$$

according to some embodiments.

In some embodiments, it is assumed that the fan airflow is equal to f when the building (e.g., building 10) is occupied and equal to half of f when unoccupied. It should be noted that the filter pressure drop $\Delta P_{filter}$ may vary over a life of the filter, but since the relationship is a linear function of time, infection control tool 1102 can use the average value and assume it is constant. In order to determine a resulting cost, $E_{fan}$ is multiplied by the fan energy cost $O_{fan}$, which is just the mean electricity price. In some embodiments, the resulting cost is determined by cost model manager 1114.

Energy consumption associated with UV irradiation is calculated as:

$$E_{UV} = \epsilon_{UV} \lambda_{UV} \delta \sum_t \alpha_{UV}(t)$$

according to some embodiments. In some embodiments, $E_{UV}$ is a scale factor to convert from the disinfection fraction $\lambda_{UV}$ to the required energy consumption, which is taken as XXXXX kW. Similar to the fan case, $\alpha_{UV}(t)$ is the fractional use of the UV lamps as a function of time, taken as:

$$\alpha_{UV}(t) = \begin{cases} 1 & \text{if occupied at time } t \\ 0 & \text{else} \end{cases}$$

according to some embodiments. The above values of $\alpha_{UV}(t)$ indicate that the UV lamps are only operated during occupied hours, according to some embodiments. The associated energy cost is calculated as the product of $E_{UV}$ and its energy price $\phi_{UV}$, which is equal to the electricity price.

Finally, cost associated with filters is calculated using a mean lifetime $\Sigma_{filter}$ that is roughly constant across filter types, according to some embodiments. Thus, over the course of a year:

$$M_{filter} = \frac{t_{year}}{\tau_{filter}}$$

according to some embodiments. In some embodiments, filters must be purchased, each at a unit cost of $\phi_{filter}$ that varies significantly with filter type and is taken from manufacturer's data.

In some embodiments, the overall annual operating cost is determined by cost model manager 1114 using:

Annual Cost=Cost$_{annual}$=$\phi_{heating}E_{heating}$+
$\phi_{cooling}E_{cooling}$+$\phi_{fan}E_{fan}$+$\phi_{UV}E_{UV}$+$\phi_{filter}M_{filter}$ with the various terms calculated by cost model manager 1114 and/or energy manager 1116 as described herein.

Similarly, energy manager 1116 can calculate an annual energy usage:

$$\text{Annual Energy} = E_{annual} = E_{heating} + E_{cooling} + E_{fan} + E_{UV}$$

according to some embodiments.

Referring still to FIG. 11, memory 1108 includes display manager 1118, according to some embodiments. In some embodiments, display manager 1118 is configured to receive or obtain results of infection model manager 1112, cost model manager 1114, and energy manager 1116 and generate display data or control signals for display screen 1120. In some embodiments, the results include an infection probability P (e.g., as determined by infection model manager 1112), an annual cost (e.g., as determined by cost model manager 1114), and estimated energy consumption (e.g., as determined by energy manager 1116). In some embodiments, display manager 1118 is configured to receive the results from infection model manager 1112, cost model manager 1114, and energy manager 1116 for multiple options of infection control (e.g., different sets of user inputs provided via user interface device 1110), and operate display screen 1120 to display the results for the different options. In this way, a user can compare different potential approaches (e.g., from a cost, energy, and/or infection probability perspective) to determine a best solution.

In some embodiments, infection control tool 1102 receives the user inputs for different potential options to control infection spread, calculates the infection probability, annual cost, annual energy consumption, etc., for each of the different options, and operates display screen 1120 to display the results of infection model manager 1112, cost model manager 1114, and energy manager 1116. When a user adjusts one or more user inputs for one or more of the different options, infection control tool 1102 can automatically re-perform its functionality to determine updated results (e.g., updated values of the infection probability, the energy consumption, and/or the cost), and may operate display screen 1120 to provide the updated results to the user. In this way, a user can adjust different settings of the various options to determine a desired solution for infection control.

In some embodiments, cost model manager 1114 is configured to estimate an incremental cost that is incurred by an infection control strategy relative to a baseline cost (e.g., an annual cost, assuming no steps are taken to address infection control). In some embodiments, cost model manager 1114 is configured to provide the incremental cost for each of the options to display manager 1118.

User Interfaces

Referring now to FIGS. 12-19, various user interfaces or display data is shown, according to some embodiments. In some embodiments, the display data (e.g., the graphs, tables, charts, etc.) shown in FIGS. 12-19 can be provided on display screen 1120 (e.g., by display manager 1118).

Figure 12:
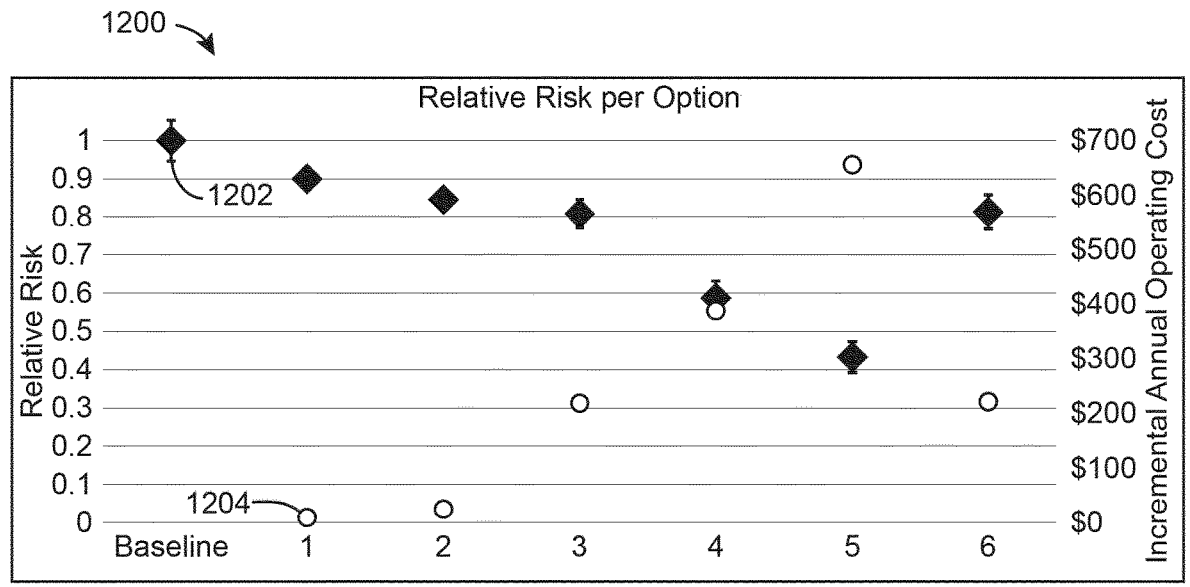
FIG. 12 is a graph showing relative risk and incremental operating costs for a baseline scenario, and six other scenarios for infection control, according to some embodiments.

Referring particularly to FIG. 12, a graph 1200 illustrating relative risk and incremental annual operating cost for different options is shown, according to some embodiments. In some embodiments, graph 1200 is provided to a user on display screen 1120 (e.g., by infection control tool 1102). Graph 1200 includes a series 1202 that illustrates relative risk for a baseline scenario, and six other scenarios (e.g., as input by the user via user interface device 1110), according to some embodiments. Graph 1200 also includes a series 1204 that illustrates incremental annual operating cost for the baseline scenario and the six other scenarios. In some embodiments, the relative risk a ratio between an infection probability P for the baseline and an infection probability P for each of the different options (e.g., options 1-6, as illustrated on the X-axis of graph 1200). In some embodiments, each data point of the series 1204 includes a value and error bars illustrating uncertainty in the value. The error bars can be determined by infection model manager 1112. In some embodiments, the error bars illustrate Series 1204 illustrates the incremental cost incurred for each of the different options to affect infection control, according to some embodiments. In some embodiments, the incremental cost is determined by cost model manager 1114 using the techniques described above for each of the different options (e.g., options 1-6).

Figure 13:
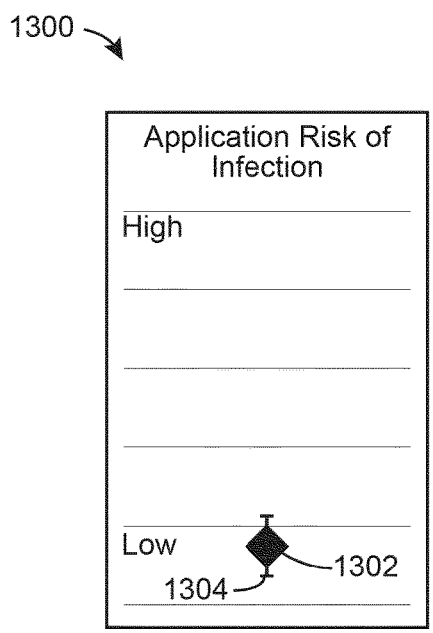
FIG. 13 is a graph of an application risk of infection for a baseline scenario of a building, according to some embodiments.

Referring now to FIG. 13, a graph 1300 shows an application risk of infection, according to some embodiments. Graph 1300 can be displayed on display screen 1120. Graph 1300 includes a data point 1302 illustrating an average or mean infection probability for the baseline scenario, according to some embodiments. For example, infection model manager 1112 can determine an infection probability for building 10, assuming that no precautions are taken to address the spread of infection. Data point 1302 also includes error bars 1304, according to some embodiments. In some embodiments, error bars 1304 illustrate an uncertainty, standard deviation, or σ value associated with the infection probability for the baseline scenario. In some embodiments, the error bars 1304 are calculated by infection model manager 1112 (e.g., an uncertainty associated with the infection probability for the baseline scenario).

Graph 1300 can include an axis illustrating a range from a high risk of infection to a low risk of infection. This can provide the user with information so that the user knows if additional precautions should be taken to control infection spread.

Referring particularly to FIG. 14, a user interface 1400 is shown, through which a user can input various data for infection control tool 1102 to perform its respective functionality, according to some embodiments. User interface 1400 can be provided on display screen 1120 and/or user interface device 1110 (which may be a same device, or different components of a same device). User interface 1400 illustrates information that can be provided to and received from the user regarding occupancy, according to some embodiments. Specifically, the user may input a total number of people that are present in the space (e.g., in building 10). In some embodiments, the probability of an individual being sick is 1% by default (as shown) but may be updated or adjusted by the user. In some embodiments, a number of sick people (as shown in FIG. 14) is a value that is calculated by infection model manager 1112 based on the number of people in the space and a probability of an individual being sick (e.g., by multiplying these two values).

In some embodiments, the user may also input an exposure time (e.g., an amount of time that each individual is expected to occupy the building). In some embodiments, the exposure time (e.g., exposure time t) can be adjusted by the user based on an expected occupancy time of the building occupants, or based on a type of space or building. For example, at a workout facility or a gym, an occupant may be expected to spend, on average, an hour in the building 10. However, if the building 10 is an office, the occupant may be expected to spend, on average, 8 hours at the office, daily. Likewise, if building 10 is a law firm, the occupant may be expected to spend, on average, 12 hours at the law firm, daily.

In some embodiments, the user may also input an indication of whether or not masks are required in the building 10 via user interface 1400. In some embodiments, when a user updates one or more of the inputs of user interface 1400 as described herein with reference to FIG. 14, infection control tool 1102 may automatically update any of the calculated values of user interface 1400 (e.g., the number of sick individuals), or any of the other user interfaces described herein (e.g., user interface 1500 as described with reference to FIG. 15 below).

Referring still to FIG. 14, user interface is shown to include a different set of occupancy data (both input data and calculated data) for six different options. The user may adjust any of the total number of people in the space, the probability of an occupant being sick, an exposure time, or whether masks are required, in any combination for each of the six different options. In this way, the user may adjust and view the effect of the adjustments for the different options.

Referring now to FIG. 15, a user interface 1500 is shown that can be displayed to the user (e.g., via display screen 1120) and through which a user may input various information for the baseline scenario and/or any of the six different options. In some embodiments, user interface 1500 is displayed on display screen 1120 simultaneously with user interface 1400. For example, the baseline and the six different options of user interface 1400 may be the same baseline and six different options of user interface 1500.

User interface 1500 includes fields for an average airflow (e.g., a % of a design airflow) for the building 10, a supply airflow (e.g., in CFM), a CFM per square foot of the building 10, a ventilation rate (e.g., a % of outdoor air), a ventilation airflow (e.g., in CFM), a percentage of ASHRAE 62.1, a filter rating, a UVC kill tunnel effectiveness, a UVC troffer percentage, and a MACH 10 fan filter, for each of the baseline and the six different options. In some embodiments, the average airflow, the supply airflow, the ventilation rate, the filter rating, the UVC kill tunnel effectiveness, the UVC troffer percentage, and the MACH 10 fan filter fields, are all input fields that are configured to receive a user input (e.g., be populated by a user) for any of the baseline and/or the six different options. In some embodiments, the supply airflow is used as an input for pressure drop calculations that do not use a design airflow. In some embodiments, the ventilation rate (e.g., the % of outdoor air) is an absolute percentage of outdoor air that is used. In some embodiments, the CFM per square foot of the building 10, the ventilation airflow, and the percentage of ASHRAE 62.1 fields are calculated fields based on user inputs. In some embodiments, the CFM per square foot of the building 10 is equal to the supply airflow in CFM (input by the user) divided by a square footage or footprint of the space of building 10.

In some embodiments, the percentage of ASHRAE 62.1 is an output field that displays a calculated percentage of currently considered airflow relative to ASHRAE 62.1 standard. In some embodiments, a user may adjust the ventilation rate (the % of outdoor air) to increase the percentage of ASHRAE 62.1 (e.g., to drive the percentage of ASHRAE 62.1 to 100% so that the ASHRAE standard is satisfied). In some embodiments, the percentage of ASHRAE 62.1 is a ratio between the ventilation airflow and a ventilation airflow set by ASHRAE 62.1 standard based on the occupancy of building 10 (e.g., as input via user interface 1400).

The filter rating, the UVC kill tunnel effectiveness, the UVC troffer percentage, and the MACH 10 fan filter fields indicate different approaches that can be implemented to control infection spread, according to some embodiments. However, such approaches are not exhaustive and are shown for illustrative purposes. The user may select a different filter rating for each of the six options. In some embodiments, infection model manager 1112 is configured to use or include a filter database that includes various parameters of different rated filters. In some embodiments, infection model manager 1112 can use the different filter ratings for the six different options to determine the infection probability for each of the six options (e.g., as illustrated in graph 1200).

Referring now to FIG. 16, a user interface 1600 is shown, according to some embodiments. In some embodiments, user interface 1600 is displayed on display screen 1120. In some embodiments, user interface 1600 is not displayed on display screen 1120 but may be displayed in response to receiving a user request to view user interface 1600. In some embodiments, user interface 1600 is not displayed to a user, but is shown and described herein for illustrative purposes to describe the functionality of infection control tool 1102.

Referring still to FIG. 16, user interface 1600 is shown to include fields for infection risk results, an average infection risk, an uncertainty of an infection risk (e.g., a standard deviation), a 95% confidence interval of the infection risk, an average ratio, an uncertainty of the ratio (sigma), a 95% confidence interval of the ratio, and various cost fields, according to some embodiments. In some embodiments, the cost fields include fields for ventilation costs, filter costs, UVC kill tunnel costs, UVC troffer costs, MACH 10 costs, and total costs. Each of the fields described herein are included for the baseline, and each of the six different options.

In some embodiments, the infection risk results are determined by dividing the average infection risk (shown in FIG. 16) by the probability of an individual being sick (shown in user interface 1400 of FIG. 14). The infection risk results can be determined (for each of the baseline and six different options, by infection model manager 1112).

In some embodiments, the average infection risk is the infection probability P as determined by infection model manager 1112. In some embodiments, infection model manager 1112 is configured to determine an average of multiple infection probabilities P that are obtained using a random seed generation technique, and an expected average quanta (e.g., 122.5 for COVID-19) and an expected uncertainty of the average quanta (e.g., 31.88 for COVID-19). In some embodiments, the expected average quanta and the expected uncertainty of the average quanta are values that are predetermined or stored in infection model manager 1112 (e.g., based on research for a particular disease).

Infection model manager 1112 can use a random seed generator to estimate a normalized distribution for the quanta (e.g., multiple values of the quanta for COVID-19 or any other disease, the multiple values having an average of the expected average quanta, and an uncertainty of the expected uncertainty of the quanta). Infection model manager 1112 may similarly use the random seed technique to generate multiple pulmonary vent rates (e.g., the inhalation rate p), and multiple deposition rates (e.g., the deposition rate for infectious particles onto surfaces, $k_{deposition}$), each of which form a normal distribution, with a mean or average at an expected value and a distribution (e.g., a standard deviation) at an expected uncertainty. For example, an expected average pulmonary vent rate (e.g., the inhalation rate p) may be 3 cubic meters per hour, with an expected uncertainty or standard deviation of 0.13 cubic meters per hour. Likewise, the deposition rate $k_{deposition}$ may have an expected average value of 1.65 $hr^{-1}$, with an expected uncertainty of 0.33 $hr^{-1}$.

Infection model manager 1112 can use the multiple values of the quanta q, the multiple pulmonary vent rates (e.g., p), and the multiple deposition rates $k_{deposition}$ to determine multiple values of the infection probability P. These multiple values of the infection probability P can then be averaged by infection model manager 1112 to determine the average infection risk (shown in user interface 1600 of FIG. 16). The multiple values of the infection probability P can also be used by infection model manager 1112 to determine the standard deviation of the average infection risk. In some embodiments, infection model manager 1112 also uses the standard deviation of the average infection risk to determine a 95% confidence interval for the average infection risk.

Infection model manager 1112 can also determine a ratio between the baseline average infection risk (e.g., the infection probability P for the baseline conditions, determined using the random seed technique described herein) and the infection risk for each of the different options. In some embodiments, infection model manager 1112 determines the ratio for each of the six options, in addition to an uncertainty (or standard deviation) for each of the ratios of the six options, and a 95% confidence interval of the ratios for each of the six options. In some embodiments, the 95% confidence intervals for the ratios of the six different options are the error bars for series 1202 as shown in graph 1200 of FIG. 12.

Cost model manager 1114 can be configured to determine incremental costs for ventilation, filtration, UVC kill tunnel, UVC troffer, and MACH 10, as shown in FIG. 16. In some embodiments, these fields show incremental cost (e.g., additional cost incurred) for using ventilation, filtration, UVC kill tunnel, UVC troffer, or MACH 10 relative to baseline costs for each of the six different options. In some embodiments, cost model manager 1114 is also configured to determine a total cost (e.g., a total additional cost incurred) for each of the six different options (e.g., by summing the additional costs incurred from ventilation, filtration, the UVC kill tunnel, the UVC troffer, or the MACH 10). In some embodiments, the total cost (shown at the bottom row of user interface 1600) is plotted as series 1204 on graph 1200.

Referring particularly to FIG. 17, another user interface 1700 to allow a user to input various building, occupancy, equipment setup, and energy cost data is shown, according to some embodiments. User interface 1700 can be displayed by display screen 1120. In some embodiments, the user may input a city in which building 10 is located, a balance point, an occupancy category of building 10 (per ASHRAE 62.1), an area (e.g., square footage or footprint) of building 10, and a ceiling height of building 10. In some embodiments, infection control tool 1102 can use the provided building data to determine a volume of the building 10 (as shown). In some embodiments, user interface 1700 allows a user to input an occupancy start time of day, an occupancy end time of day, and a number of days per week that building 10 is occupied. In some embodiments, user interface 1700 also allows a user to input a design airflow rate of equipment of building 10, a cooling coefficient of performance, a gas heating efficiency, a supply fan mechanical efficiency, and a supply fan electrical efficiency. In some embodiments, user interface 1700 also allows a user to input various energy costs, such as electricity energy costs, and natural gas energy costs. Infection control tool 1102 can calculate the volume of building 10, ASHRAE 62.1 default occupancy, occupant density, supply airflow, and various ASHRAE 62.1 variables (such as Rp, Ra, and vent floor), as shown on user interface 1700.

Referring particularly to FIG. 18, a user interface 1800 is shown. User interface 1800 can similarly be displayed on display screen 1120. User interface 1800 includes various Wells-Riley variables, such as the quanta generation rate for a particular disease (e.g., the expected average value of q used in the random seed technique, which may be 122.5 for COVID-19), an average pulmonary vent rate (e.g., the expected average value of p used in the random seed technique, which may be 3.00 or adjusted based on expected occupant activity), and various ventilation costs.

Referring particularly to FIG. 19, a user interface 1900 is shown that can be similarly displayed on display screen 1120. User interface 1900 includes various design data that is provided by a user. The design data may include a design airflow (e.g., in CFM or cubic meters per second), a filter area, and/or a face velocity. In some embodiments, user interface 1900 also includes a number of filters, an expected filter life, a fraction of a day that building 10 is occupied, a number of weeks that building 10 is expected to be occupied, a number of days per week that building 10 will be occupied, and a total amount of time that building 10 will be occupied.

Referring particularly to FIGS. 21 and 22, user interface 2100 and 2200 are shown, according to some embodiments. In some embodiments, user interfaces 2100 and 2200 show filter data for various rated filters (e.g., MERV 8, MERV 11, and MERV 13). In some embodiments, infection model manager 1112 is configured to store various filter data for different rated filters, so that the filter data can be retrieved when the user inputs or selects a filter rating. In some embodiments, the filter efficiency (e.g., the average and/or the sigma) are provided as user inputs for the different rated filters.

Referring now to FIG. 23, table 2300 shows the random seed technique that is used to generate the infection probability, according to some embodiments. Specifically, table 2300 includes an expected mean value for the quanta generation (e.g., 122.5, assuming COVID-19), and an expected uncertainty (e.g., sigma) for the quanta generation (e.g., 31.88 . . . ). Table 2300 also includes a mean or expected value of the pulmonary vent rate (e.g., 3 cubic meters per hour), and an expected uncertainty (e.g., sigma) for the pulmonary vent rate (e.g., 0.1279 as shown). Similarly, table 2300 includes an expected or average value of $k_{deposition}$ (e.g., 1.65) and an expected uncertainty or standard deviation of $k_{deposition}$ (e.g., 0.3316). In some embodiments, a random seed technique is used to generate quanta data sets 2302, pulmonary vent rate data sets 2304, and $k_{deposition}$ data sets 2306. These sets 2302-2306 (shown in FIG. 23) can then be used to calculate or estimate an infection probability set 2308. In some embodiments, the infection probability set 2308 is calculated by infection model manager 1112 using the sets 2302-2306 that are generated by infection model manager 1112 using the random seed technique. Infection model manager 1112 can then use the infection probability set 2308 to determine an average infection probability (e.g., by averaging the infection probability set 2308).

FIG. 23 shows infection probability calculations using the random seed technique for a baseline scenario. Infection model manager 1112 can use similar techniques to calculate infection probability for each of the different scenarios and can determine a ratio between the average infection probability for the baseline scenario and the average infection probability of each of the other scenarios.

Referring particularly to FIG. 24, a table 2400 shows various parameters and their values that are used by energy manager 1116 and/or cost model manager 1114 to estimate ventilation or heating/cooling costs. The parameters shown in table 2400 include area (e.g., floor area), height (e.g., ceiling height), V (e.g., space volume), $\lambda_{vent}$ (e.g., additional ventilation), $C_{p,air}$ (specific heat of air), $\rho_{air}$ (density of air), $\eta_{heating}$ (heating efficiency) and $\eta_{cooling}$ (cooling efficiency), α, β, cost of electricity, and cost of gas. These parameters are used by cost model manager 1114 to determine heating and cooling cost.

Referring particularly to FIG. 25, table 2500 is shown to illustrate heating degree days, cooling degree days, heating cost, cooling cost, and total cost. In some embodiments, the heating cost and the cooling cost can be determined by cost model manager 1114 as described in greater detail above. In some embodiments, the heating degree days and the cooling degree days are stored in a database (e.g., for different locations) and are selected by infection control tool 1102 in response to the user providing an input that indicates a location of building 10. In some embodiments, the heating degree days and the cooling degree days for different locations are determined by infection model manager 1112 based on historical data (e.g., dry bulb and wet bulb temperatures over time). Examples of such historical data are shown in table 2600 of FIG. 26.

It should be understood that while the user interfaces described herein use a single baseline and six different options, any number of options may be used. For example, the user interfaces may include input/output fields for inputting or outputting any of the data described herein for more or less than six different options. Six options are shown for illustrative purposes only, but the systems and methods described herein should not be understood to be limited to only six options.

Process

Figure 20:
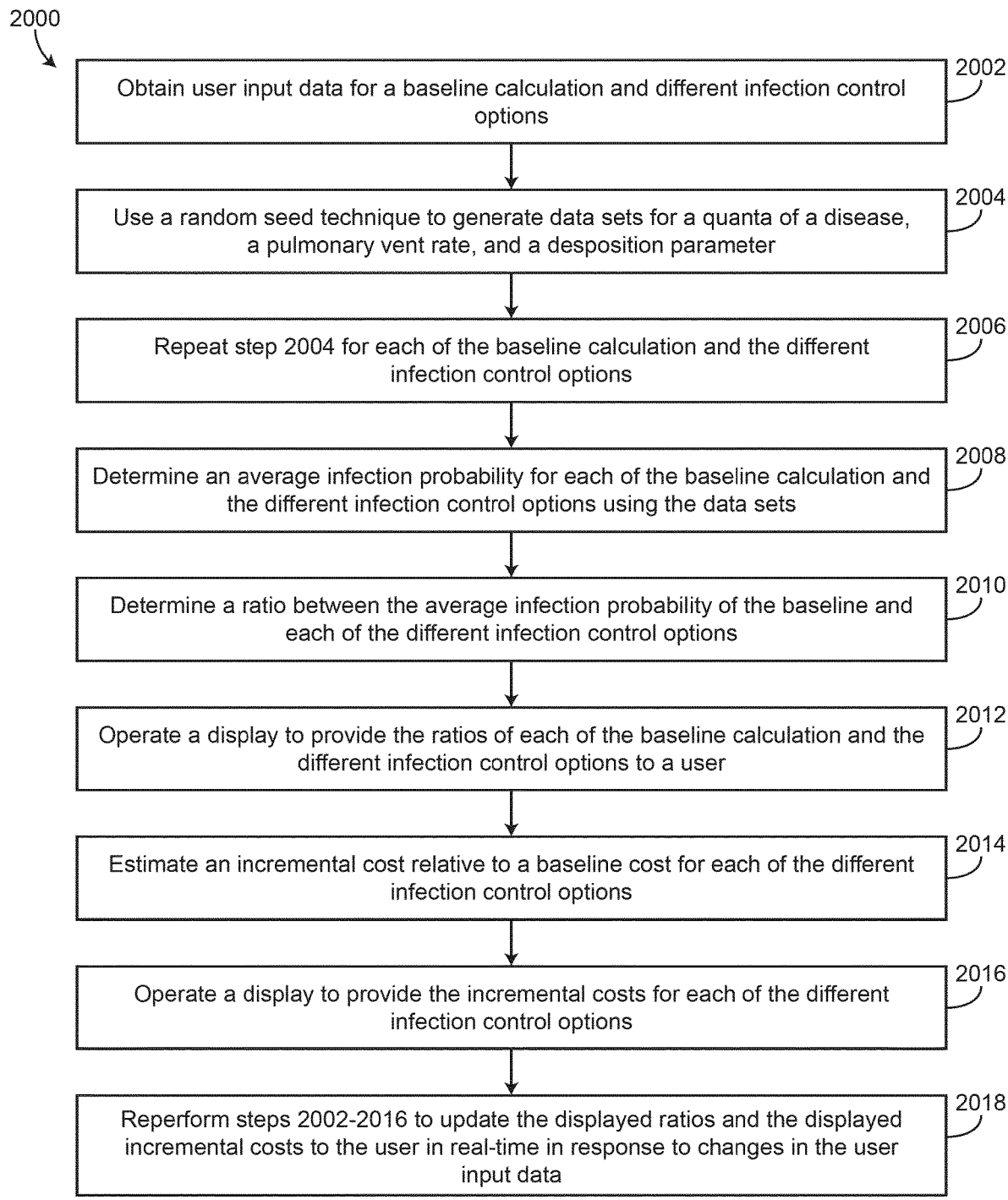
FIG. 20 is a flow diagram of a process for determining operating costs and infection risks for a baseline scenario and different infection control scenarios, according to some embodiments.

Referring particularly to FIG. 20, a process 2000 for providing a user or a manager of a building with relevant information regarding potential options to control infection spread is shown, according to some embodiments. Process 2000 includes steps 2002-2018 and can be performed by infection control system 1100.

Process 2000 includes obtaining user input data for a baseline calculation and different infection control options (step 2002), according to some embodiments. In some embodiments, the user input data includes any of the user input data described herein and shown in FIGS. 14-19. For example, the user input data can include any of:
- whether occupants are required to wear masks;
- an increased ventilation;
- whether advanced filtration is used, or which filter is selected;
- whether UV disinfection is used;
- increased recirculation rates so that the air is cleaned more frequently;
- occupancy control data (e.g., a reduced capacity);
- an average airflow (e.g., percent of the design airflow of the equipment);
- a supply airflow (e.g., in CFM);
- a ventilation rate (e.g., a percent of outdoor air);
- a filter rating of a selected filter;
- a UVC kill tunnel effectiveness (e.g., between 0% and 100% or between 0 and 1);
- a UVC troffer percentage;
- a MACH 10 fan filter percentage;
- occupancy data such as:
  - a total number of occupants in the space (e.g., in building 10 or in a room or space of building 10);
  - a probability of an individual becoming sick;
  - a number of sick individuals in the building 10 (e.g., assumed to be 0.5 by default);
  - an exposure time (e.g., an expected number of hours per day that an individual is expected to be within the building 10);
  - an occupancy start time of the building 10;
  - an occupancy end time of the building 10; and
  - a number of days per week that building 10 is occupied;
- building location data such as:
  - what city in which the building 10 is located;
  - a balance point at the location of building 10;
  - an occupancy category of the space or of building 10 (e.g., per ASHRAE 62.1);
  - space size information (e.g., area and/or ceiling height);
- equipment data such as:
  - a design airflow rate;
  - a cooling coefficient of performance (COP);
  - a gas heating efficiency;
  - a supply fan mechanical efficiency;
  - a supply fan electrical efficiency; and
- energy cost data such as:
  - electricity costs (e.g., in $/kWh); and
  - natural gas costs (e.g., in $/MMBTU).

In some embodiments, the user input data is obtained from a user via user interface device 1110.

Process 2000 includes using a random seed technique to generate data sets for a quanta of a disease, a pulmonary vent rate, and a deposition parameter (step 2004), according to some embodiments. In some embodiments, the data sets are generated to provide a normal distribution of each of the quanta, the pulmonary vent rate, and the deposition parameter. For example, the quanta of the disease may have a known or expected value (e.g., 122.5), and a known or expected uncertainty. Similarly, the pulmonary vent rate, and the deposition parameter may have known or expected average values and known or expected uncertainties. In some embodiments, the quanta of the disease is the variable q as described in the present disclosure. In some embodiments, the pulmonary vent rate is the variable p as described in the present disclosure. In some embodiments, the deposition parameter is the variable $k_{deposition}$ as described in the present disclosure. In some embodiments, step 2004 is performed by infection model manager 1112.

Process 2000 includes repeating step 2004 for each of the baseline calculation and the different infection control options (step 2006), according to some embodiments. In some embodiments, a data set is generated for each of the baseline calculation and the different infection control options, based on the user input data. Step 2006 can be performed by infection model manager 1112.

Process 2000 includes determining an average infection probability for each of the baseline calculation and the different infection control options using the data sets (step 2008), according to some embodiments. In some embodiments, step 2008 includes averaging a data set of infection probability values that are determined based on the data sets generated in step 2004.

Step 2008 can be performed by infection model manager 1112.

Process 2000 includes determining a ratio between the average infection probability of the baseline scenario and each of the different infection control options (step 2010), according to some embodiments. In some embodiments, step 2010 is performed by infection control tool 1102.

Process 2000 includes operating a display to provide the ratios of each of the baseline calculation and the different infection control options to a user (step 2012), according to some embodiments. In some embodiments, step 2012 is performed by display manager 1118 and display screen 1120 based on the results of infection model manager 1112. In some embodiments, providing the ratios of each of the baseline calculation and the different infection control options includes providing a graph to the user via display screen 1120.

Process 2000 includes estimating an incremental cost relative to a baseline cost for each of the different infection control options (step 2014), according to some embodiments. In some embodiments, step 2014 is performed by cost model manager 1114. In some embodiments, step 2014 is performed by summing an estimated incremental ventilation cost, an incremental filtration cost, an incremental UVC kill tunnel cost, an incremental UVC troffer cost, and an incremental MACH 10 cost. In some embodiments, the incremental cost is determined using the equation Annual $Cost=Cost_{annual}=\phi_{heating}E_{heating}+\phi_{cooling}E_{cooling}+\phi_{fan}E_{fan}+\phi_{UV}E_{UV}+\phi_{filter}M_{filter}$.

Process 2000 includes operating a display to provide the incremental costs for each of the different infection control options (step 2016), according to some embodiments. In some embodiments, step 2016 is similar to step 2012. In some embodiments, step 2016 includes providing the incremental costs for each of the different infection control options on a graph (e.g., on the graph provided in step 2012).

Process 2000 includes reperforming steps 2002-2016 to update the displayed ratios and the displayed incremental costs to the user in real-time in response to changes in the user input data (step 2018), according to some embodiments. In some embodiments, steps 2002-2016 are reperformed in response to a user adjusting any of the user input data. Advantageously, this allows the displayed data (e.g., the displayed data provided in steps 2012 and 2016) to be updated or displayed in real-time when the user changes or adjusts the user input data.

Graphs

Figure 27:
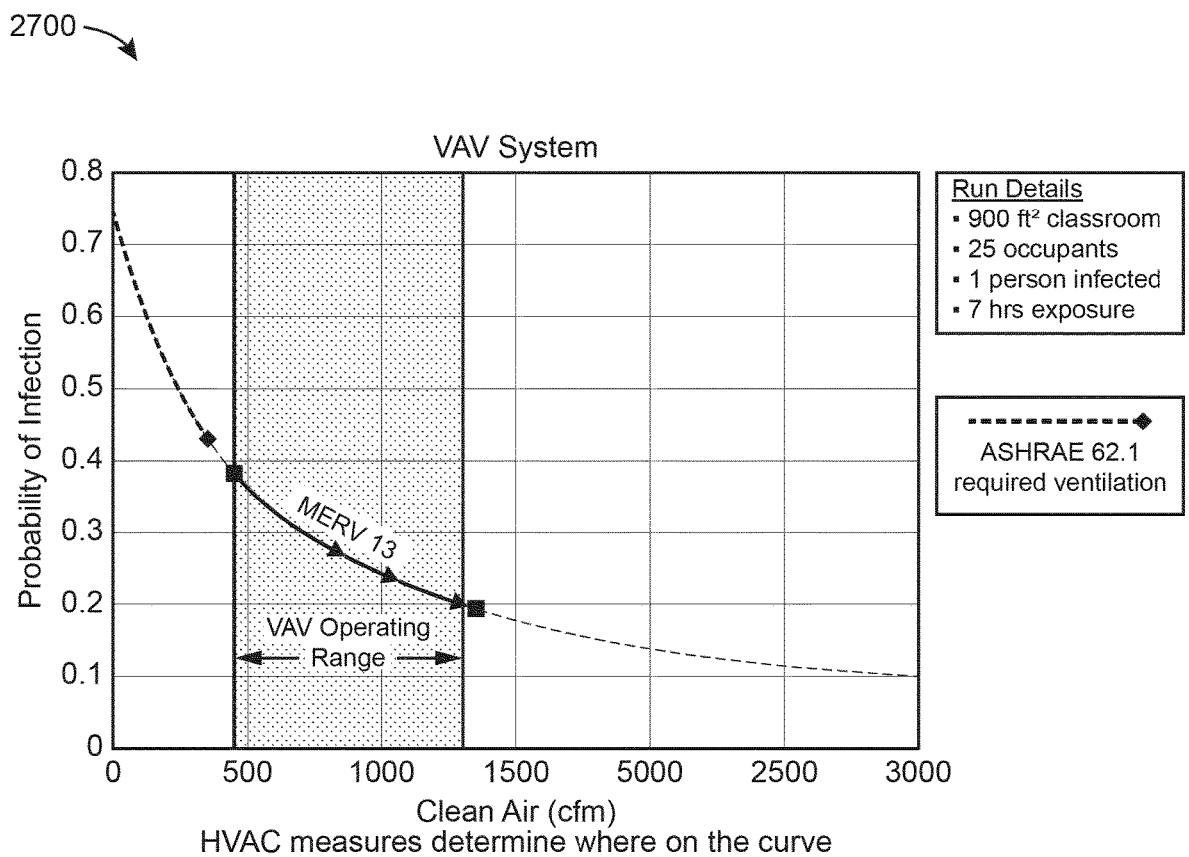
FIG. 27 is a graph showing probability of infection with respect to clean air airflow for an HVAC system that uses a MERV 13 filter, according to some embodiments.
Figure 28:
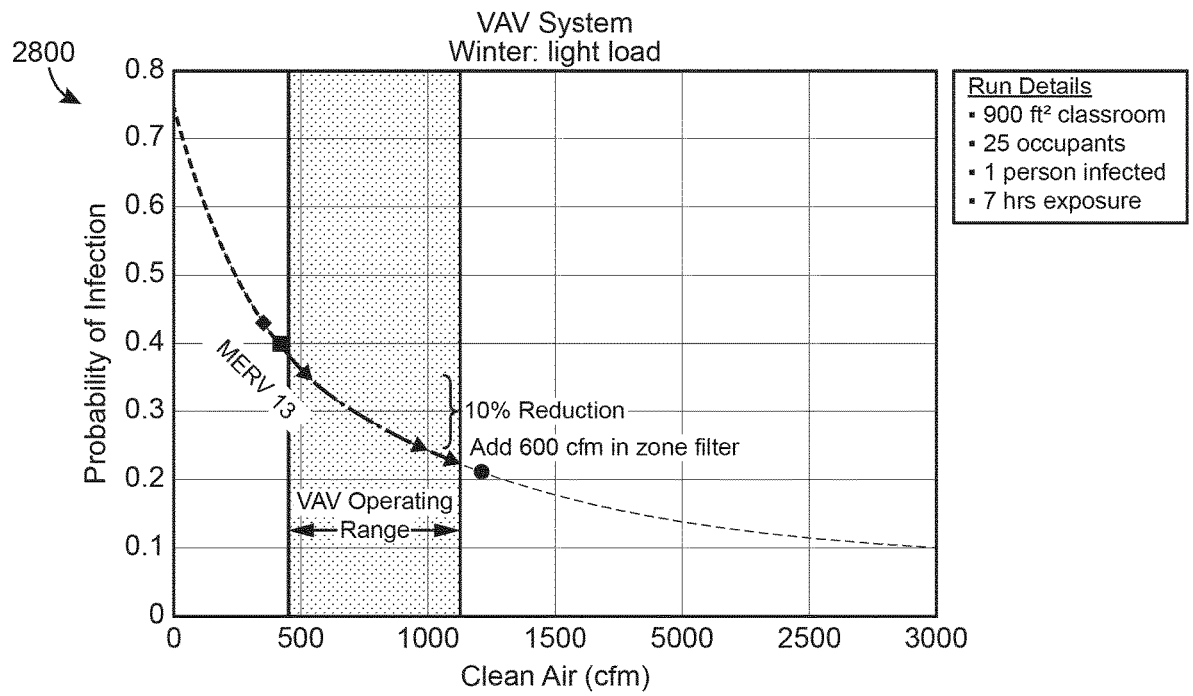
FIG. 28 is a graph showing probability of infection with respect to clean air airflow for an HVAC system that uses a MERV 13 filter and an in-zone filtration device during winter, according to some embodiments.
Figure 29:
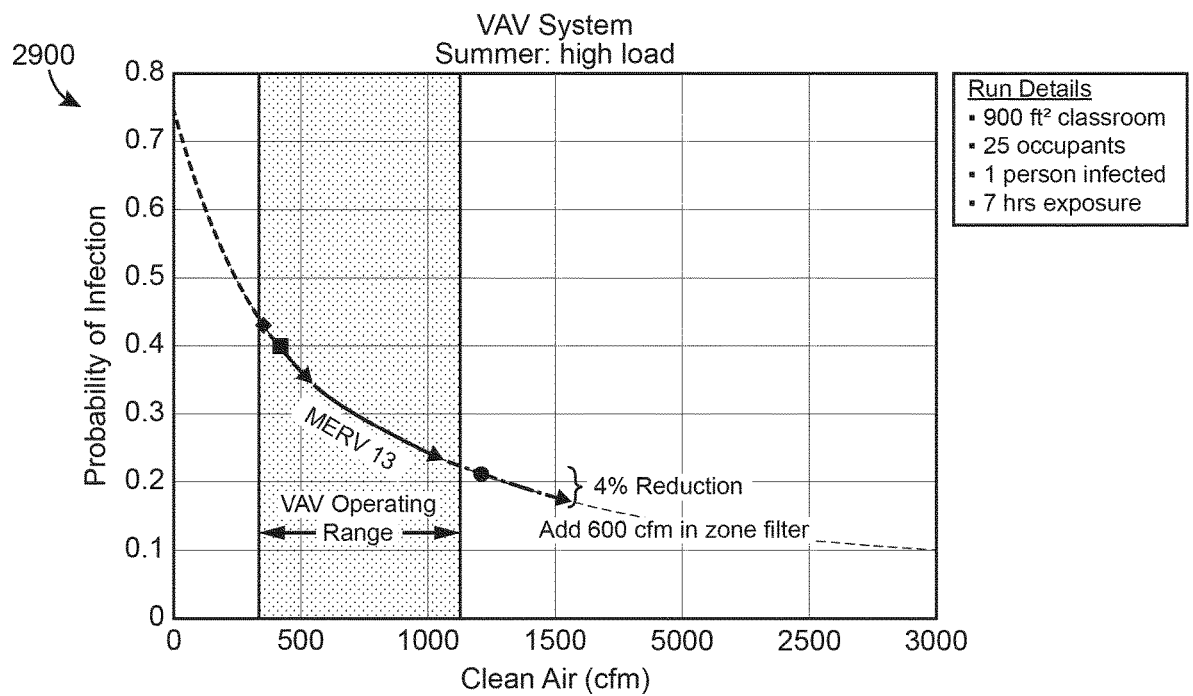
FIG. 29 is a graph showing probability of infection with respect to clean air airflow for an HVAC system that uses a MERV 13 filter and an in-zone filtration device during summer, according to some embodiments.

Referring now to FIGS. 27-29, graphs 2700-2900 illustrate an effect of using in-zone filtration devices. Graphs 2700-2900 show probability of infection (the Y-axis) with respect to clean air airflow rate in cfm (the X-axis), according to some embodiments. Graph 2700 illustrates an effect of using a MERV 13 filter that is positioned at an air handling unit of HVAC equipment. However, as shown in graphs 2800 and 2900 the probability of infection can be further reduced by adding an in-zone filtration device. For example, graphs 2800 and 2900 show the effect that a 600 cfm in-zone filtration device has, in addition to the MERV 13 filter that is positioned at the air handling unit. Graph 2800 shows that, during winter time, the in-zone filtration device can result in an additional 10% reduction in the probability of infection, according to some embodiments. Graph 2900 shows that, during summer time, the in-zone filtration device can result in an additional 4% reduction in the probability of infection.

Air Handler and In-Zone Filtration

Referring now to FIGS. 30-41, a combination of filtration at an air handler (e.g., AHU 304) and filtration in-zone (e.g., within a zone of building 10) can be used to provide a desired reduction in infection risk probability. In-zone filtration can be performed by different devices that recirculate air and are positioned locally in a zone, space, area, room, etc., of the building 10. Filtration at the air handler can be performed to provide a baseline or initial level of infection risk probability or a desired infection probability reduction (e.g., relative infection risk probability). If the filtration at AHU 304 is insufficient to solely drive the infection risk probability to a desired level, or to reduce the infection risk probability by a relative amount, additional filtration can be performed locally (e.g., at all zones of the building 10 or at specific zones of building 10) to achieve the desired infection risk probability or to achieve the desired reduction in infection risk probability (e.g., to achieve desired relative infection risk probability).

When building owners or managers attempt to adjust or improve HVAC infrastructure to achieve a desired level or a desired reduction of infection risk probability, the building owners must choose between a tradeoff of additional costs (e.g., capital and/or operating) that are incurred from changing the HVAC infrastructure and operating using the changed infrastructure, as well as an achieved infection risk probability. Furthermore, additional filtration may provide reduced improvements per cost in terms of infection risk probability. In this way, determining an optimal or most cost-effective solution in terms of infection risk probability and cost (e.g., capital and/or operating costs, or a combination thereof) may take the form of a Pareto optimization problem as discussed above. Advantageously, the techniques, systems, and methods described herein indicate the benefits from using a combination of at air-handler filtration and in-zone filtration. In some implementations, a MERV-13 filter with a combination of an in-zone filtration device may be used to achieve reduction in infection risk probability.

Even when some filtration is used (e.g., at AHU 304) to achieve desired infection risk probability, an efficiency or efficacy of the filtration may depend on operation of the HVAC system (e.g., the AHU 304). Specifically, while a particular filter may filter air that is passed through, a volume, quantity, or amount of air (e.g., filtered air, purified air, clean air, etc.) that is provided to the room (e.g., an amount of hourly air changes) affects the infection probability. For example, using a lower rated air filter and passing a high volume of air through the filter and then to a zone may result in a greater decrease in infection risk probability than using a higher rated air filter and passing a low volume of air through the filter and then to the zone.

Figure 30:
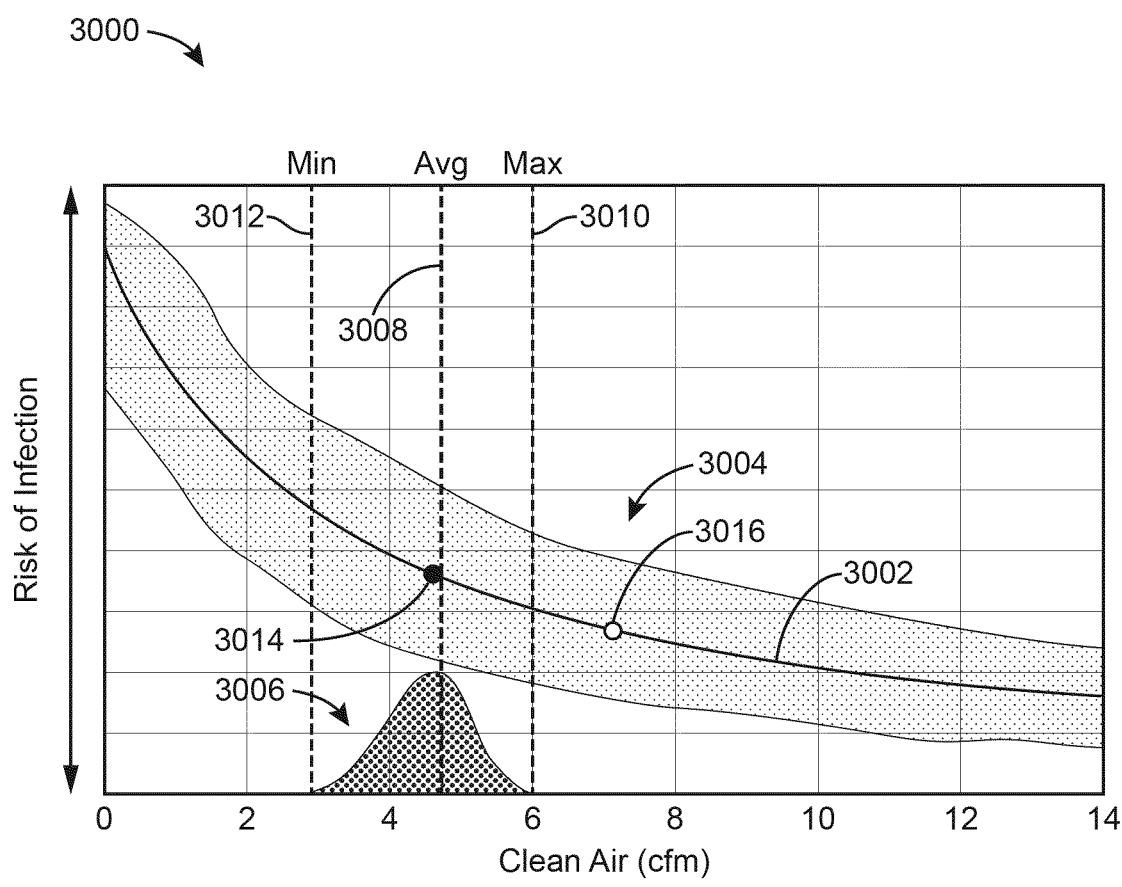
FIG. 30 is a graph illustrating risk of infection with respect to filtered air provided to a zone, according to some embodiments.

Referring particularly to FIG. 30, a graph 3000 illustrates a curve 3002 that shows risk of infection (the Y-axis) with respect to an amount of clean, filtered, or purified air delivered to a zone. Graph 3000 includes an error region 3004 that surrounds curve 3002. Graph 3000 illustrates that with increased air delivered to the zone (e.g., with the increase along the X-axis), the risk of infection decreases (e.g., curve 3002 decreases along the Y-axis). The risk of infection as illustrated in the Y-axis of graph 3000 may be a reproductive rate $R_0$ or R predicted using Wells-Riley as an input, or a variation thereof.

Graph 3000 also includes a histogram 3006 showing typical, expected, or baseline clean air delivery for an HVAC system that serves the space (assuming no additional measures or filtration is performed to achieve better infection risk reduction). As illustrated by histogram 3006 and average line 3008, an average number of hourly air changes per hour is approximately 4.7, with a maximum line 3010 indicating a maximum expected number of hourly air changes of 6, and a minimum line 3012 illustrating a minimum expected number of hourly changes of approximately 2.5. This may result in the zone receiving clean air at a rate of approximately 4.7 air changes per hour (e.g., 4700 cfm), reducing infection risk by approximately 25%.

However, a user or building manager may desire a lower risk of infection. For example the customer or building manager may desire an infection risk of $R_0<1$ as illustrated by customer goal point 3016 on graph 3000. In order to achieve such infection risk, the HVAC system should provide a clean air delivery rate of at least 7000 cfm. In this way, target infection risk (e.g., $R_0<1$) can be achieved or minimized by increasing the clean air delivery rates.

Figure 31:
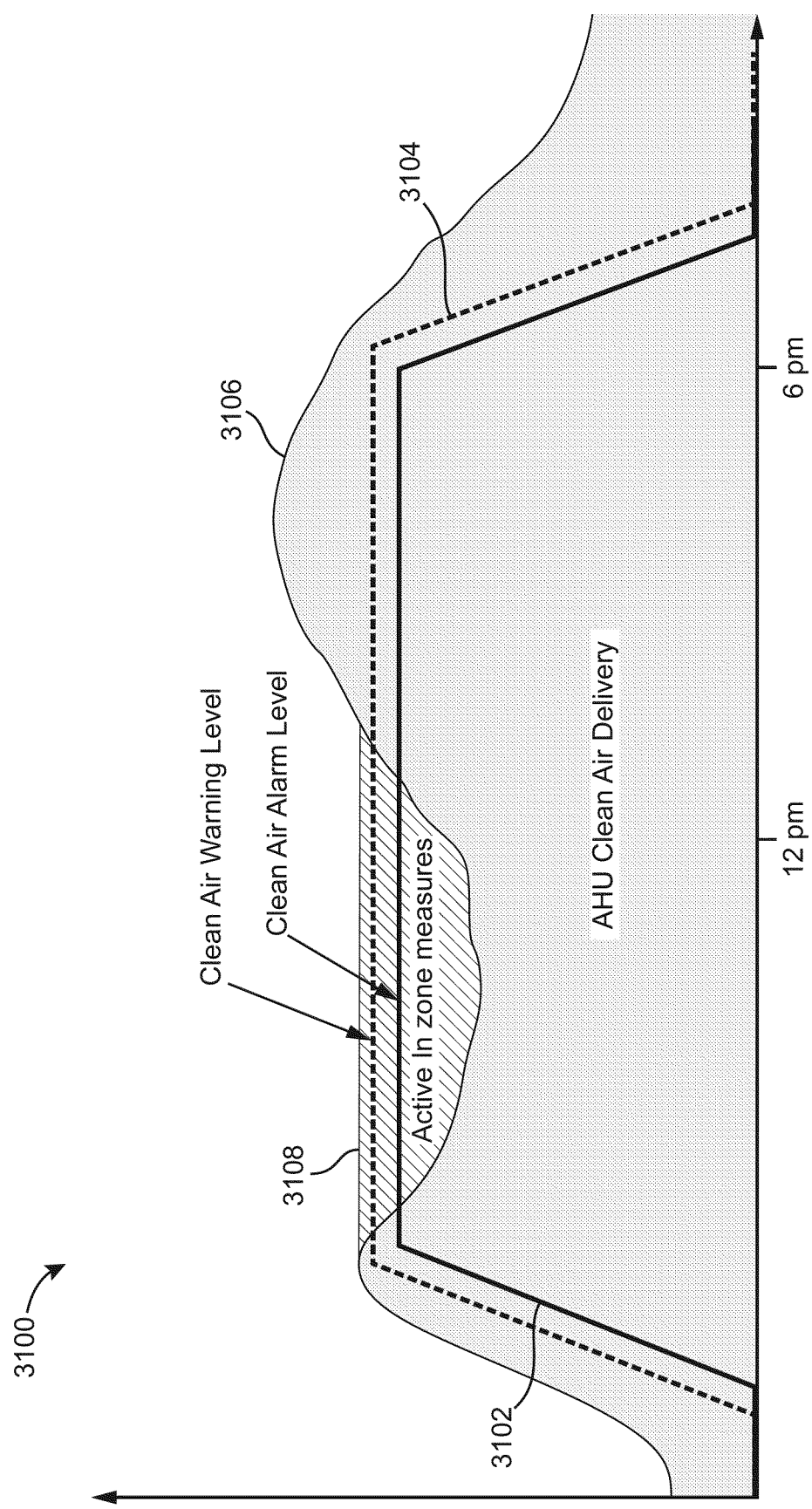
FIG. 31 is a graph illustrating time-varying thresholds for filtered air delivery to a zone over a time period of a day, according to some embodiments.

Referring now to FIG. 31, a graph 3100 shows air delivery (the Y-axis) that is provided to a room, zone, or area over the course of a day (e.g., the X-axis, a 24 hour period). Graph 3100 includes an air alarm level 3102 and an air warning level 3104. The air alarm level illustrates a predetermined, predefined, or desired minimum alarm threshold, such that if an amount of currently provided air (e.g., clean air, filtered air, purified air, etc.) decreases below the air alarm level 3102, additional approaches (e.g., in-zone filtration) can be initiated to ensure that the infection probability or infection risk for all times of day is adequately met. In some embodiments, graph 3100 illustrates the operation of a control system that operates both a centralized air-handling unit filtration device and a local, in-zone filtration device. The local in-zone filtration device can be initiated or activated to recirculate and filter air within the zone (e.g., by a controller of the system) at different times of day (e.g., when a total amount of filtered, clean, or purified air provided by the AHU is insufficient to achieve a desired amount of risk infection reduction).

Graph 3100 also includes air warning level 3104. When a total clean air delivery (e.g., an amount of filtered, purified, cleaned, etc., air) decreases to be less than the air warning level 3104, the controller may alert or alarm a building manager. The building manager or an occupant of the room may manually operate or activate the in-zone filtration device in response to the alert or the alarm.

Graph 3100 includes series 3106, illustrating the total clean air that is provided to the corresponding zone over the course of a day. As shown in FIG. 31, the air warning level 3104 and the air alarm level 3102 vary over the course of the day. For example, the air warning level 3104 and the air alarm level 3102 may ramp up as the zone is expected to increase in occupancy, and ramp down (e.g., at an end of the day) when the zone is expected to decrease in occupancy.

As shown in FIG. 31, during certain times of the day, illustrated by zone 3108, the series 3106 drops below the air warning level 3104 and/or the air alarm level 3102. During such times of day, the controller may initiate an in-zone filtration device to recirculate air locally in the zone, and provide additional filtered air to achieve the desired infection risk reduction.

Figure 39:
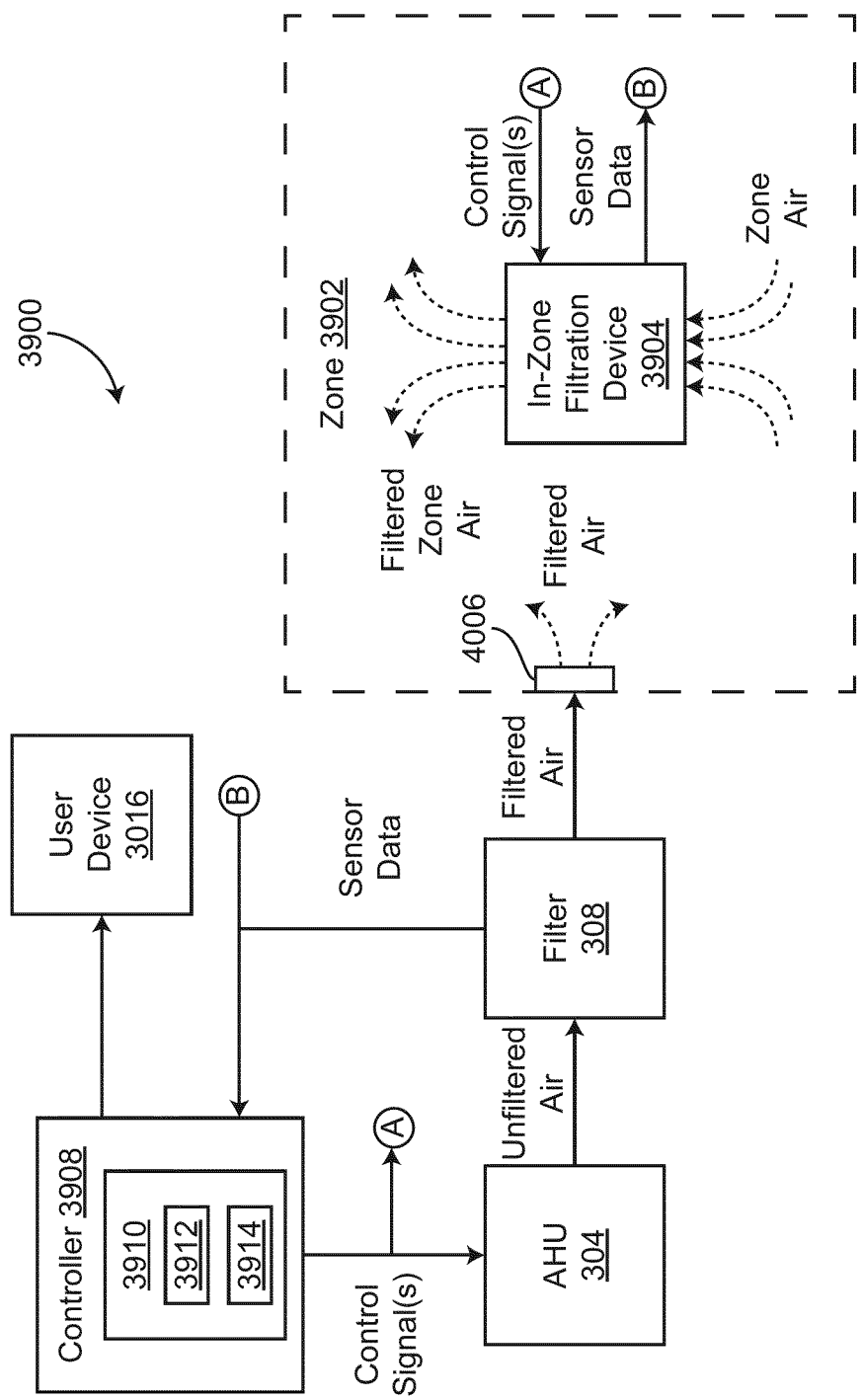
FIG. 39 is a block diagram of an HVAC system that includes both a filter at an air handler, and an in-zone filtration device, according to some embodiments.

Referring particularly to FIG. 39, an HVAC system 3900 is shown, according to some embodiments. HVAC system 3900 is a dual HVAC system that includes AHU 304 and filter 308, and an in-zone filtration device 3904. Both AHU 304 with filter 308 and in-zone filtration device 3904 operate to deliver a volume, amount, rate, etc., of filtered, purified, or clean air to a zone 3902 in order to maintain a certain amount of infection risk reduction (e.g., a desired amount as provided by the user).

HVAC system 3900 includes controller 3908 which is configured to provide control signal(s) to AHU 304 and in-zone filtration device 3904. Controller 3908 includes a processing circuit 3910 including a processor 3912 and memory 3914. Processing circuit 3910 can be communicably connected with a communications interface of controller 3908 such that processing circuit 3910 and the various components thereof can send and receive data via the communications interface. Processor 3912 can be implemented as a general purpose processor, an application specific integrated circuit (ASIC), one or more field programmable gate arrays (FPGAs), a group of processing components, or other suitable electronic processing components.

Memory 3914 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 3914 can be or include volatile memory or non-volatile memory. Memory 3914 can include database components, object code components, script components, or any other type of information structure for supporting the various activities and information structures described in the present application. According to some embodiments, memory 3914 is communicably connected to processor 3912 via processing circuit 3910 and includes computer code for executing (e.g., by processing circuit 3910 and/or processor 3912) one or more processes described herein.

In some embodiments, controller 3908 is implemented within a single computer (e.g., one server, one housing, etc.). In various other embodiments controller 3908 can be distributed across multiple servers or computers (e.g., that can exist in distributed locations).

Controller 3908 is configured to receive sensor data from one or more sensors (e.g., flow meters, flow sensors, etc.), of the central filtration device (AHU 304 and filter 308) and the in-zone filtration device 3904. Controller 3908 may monitor a total amount of clean, filtered, or purified air that is provided to zone 3902. Controller 3908 can store the air alarm level 3102 and/or the air warning level 3104 in memory 3914. When the total air that is provided to zone 3902 by AHU 304 and filter 308 decreases below the air warning level 3104 or the air alarm level 3102, controller 3908 can operate a user device 3916 to provide a user or a building manager with an alarm that additional (e.g., in-zone) filtration should be initiated or activated to achieve the desired level of infection risk reduction. When controller 3908 determines that additional filtration is needed or required so that the risk reduction as desired by a building manager is met, controller 3908 can generate and provide control signals to in-zone filtration device 3904 to activate in-zone filtration device 3904 to provide additional filtered air for zone 3902. Controller 3908 may generate values of the air warning level 3104 and/or air alarm level 3102 based on a desired infection risk reduction as provided by a building manager, and expected occupancy times, expected occupancy amounts, whether or not occupants are wearing masks, etc., or various other input information as described herein.

In some embodiments, the controller 3908 generates control signals or setpoints for the in-zone filtration device 3904 and/or the AHU 304 that are predicted to maintain (e.g., over a future time horizon) the amount of filtered air in the zone 3902 below a threshold. In some embodiments, the control signals or setpoints that are used to operate the in-zone filtration device 3904 or the AHU 304 are determined by the controller 3908 by performing an optimization as described in greater detail above with reference to FIGS. 3-8 that accounts for or includes clean air delivery. For example, any of or an additional dynamic model that predicts clean or filtered air delivery as a function of operation of the in-zone filtration device 3904 and/or the AHU 304 may be used to determine setpoints of the in-zone filtration device 3904 and/or the AHU 304. In some embodiments, a filtered or clean air constraint is applied to the objective function described in greater detail above so that a minimum clean or filtered air amount is satisfied in the zone 3902. In this way, activation, operation, and setpoints of the in-zone filtration device 3904 can be integrated into an optimization or control process for an entire HVAC system of a building (e.g., the building 10) so that operation of the in-zone filtration device 3904 are also control decisions of the optimization. In other systems, in-zone filtration devices 3904 are entirely stand-alone, and are not used by a central HVAC system in the determination of optimal operation of the HVAC system and equipment thereof. However, integrating the in-zone filtration device 3904 (e.g., equipped with wireless or wired communications) provides an additional point of controllability for the HVAC system or the controller 3908 so that the operation of the filtration device 3904 can be accounted for when determining control decisions for the AHU 304. In some embodiments, the in-zone filtration device 3904 is treated in the optimization as a device that can control an amount of filtered air provided to the zone 3902 without significantly affecting or controlling temperature in the zone 3902. Advantageously, providing clean or filtered air to the zone 3902 can mitigate infection risk, infection probability, or reduce carbon dioxide in the zone 3902 (e.g., thereby improving cognitive functioning of occupants in the zone 3902).

In some embodiments, energy consumption or cost that results from operation of the in-zone filtration device 3904 can also be accounted for in determination of the control decisions of the AHU 304 and/or the in-zone filtration device 3904. For example, the optimization or control decision determination process can be performed to satisfy various infection probability, temperature, humidity, or filtered air constraints, in a cost effective manner (e.g., minimize energy cost or energy consumption subject to the infection probability, temperature, humidity, or filtered air constraints). For example, the E cost function described in detail above can be modified to include a term or model of the in-zone filtration device that defines energy cost or energy consumption of the in-zone filtration device 3904 (e.g., over a future time period, at a current time, over a previous time period, etc.) as a function of one or more control decisions, setpoints, or operating parameters of the in-zone filtration device 3904. Further, a model of the in-zone filtration device 3904 that defines filtered air delivery as a function of the same one or more control decisions, setpoints, or operating parameters of the in-zone filtration device 3904 can be used so that control decisions that are predicted to satisfy a clean or filtered air constraint are satisfied. In some embodiments, the control decisions, setpoints, or operating parameters include whether or not to activate the in-zone filtration device 3904, and other operating parameters of the in-zone filtration device 3904 such as fan speed that determine a quantity of clean air that is provided by the in-zone filtration device 3904. In this way, the control decisions or setpoints for the in-zone filtration device 3904 are configured to both define whether the in-zone filtration device 3904 is activated or not, and also to determine how the in-zone filtration device 3904 should be operated once activated (e.g., how fast the fan should be run to provide a specific quantity, amount, or rate of filtered or clean air to the zone 3902). In some embodiments, the setpoints that define how the in-zone filtration device 3904 should be operated, or the rate of filtered or clean air provided to the zone 3902 are control decisions in an optimization that also includes control decisions of the AHU 304 such that optimization of operation of the in-zone filtration device 3904 is determined while also accounting for operations of the AHU 304 or other equipment of a central HVAC system. In some embodiments, the optimization results in a schedule of setpoints for a future time period, and the in-zone filtration device 3904 can be operated (e.g., activated or deactivated) automatically according to the schedule of setpoints.

As shown in FIGS. 39 and 31, zone 3902 is served filtered, purified, clean, or fresh air by both AHU 304 (through filter 308) and in-zone filtration device 3904. AHU 304 provides the filtered air from filter 308 through various ducts, conduits, etc., and vents 4006. AHU 304 may draw outdoor air, and/or air from zone 3902. AHU 304 can provide unfiltered air to filter 308 which provides filtered air to zone 3902 through vents 4006. In-zone filtration device 3904 draws zone air, passes the zone air through a filter (e.g., a filter that is the same as or similar to filter 308) and outputs filtered zone air to zone 3902. In-zone filtration device 3904 can include a fan, an electric motor, etc., to draw the air into an inner volume of in-zone filtration device 3904 where the filter is located, and expel the filtered zone air to zone 3902. It should be understood that AHU 304 can be configured to serve multiple zones 3902 and deliver a required amount of filtered air to each of the multiple zones as determined by controller 3908. Similarly, while FIG. 39 shows only one in-zone filtration device 3904, multiple in-zone filtration devices 3904 can be used in zone 3902. A number or rating of in-zone filtration devices 3904 can be determined based on a size of zone 3902, a quantity of air within zone 3902, a capacity of in-zone filtration devices 3904, a rating of filter 308, etc., or other building of HVAC system parameters. In some embodiments, controller 3908 is configured to perform an optimization to determine a number, rating, type, capacity, etc., of in-zone filtration device 3904.

Figure 32:
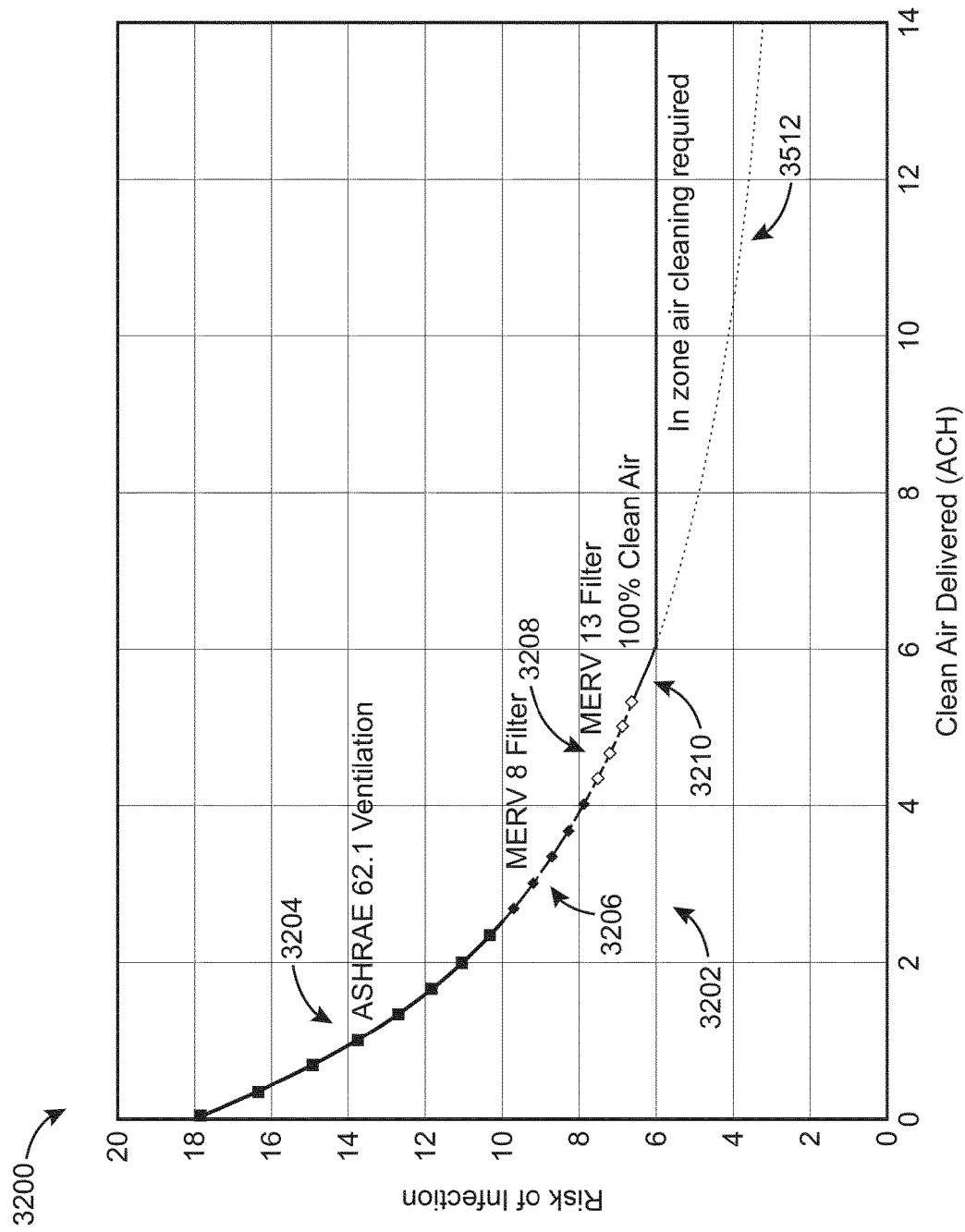
FIG. 32 is a graph illustrating various approaches to reduce a risk of infection in a zone for a constant air volume HVAC system, according to some embodiments.

Referring particularly to FIG. 32, graph 3200 illustrates various measures that can be taken or techniques that can be used to reduce a risk of infection in a zone, space, room, etc., of building 10. As shown in FIG. 32, graph 3200 includes a curve 3202 that is similar or the same as curve 3002. Curve 3202 illustrates an output of the Wells-Riley equation with respect to clean, filtered, purified, etc., air that is provided to a room, space, or zone of a building (e.g., building 10).

Curve 3202 includes a ventilation portion 3204, a first filter portion 3206, a second filter portion 3208, a clean air portion 3210, and an in-zone filtration portion 3212. Providing different amounts of ventilation (e.g., according to ASHRAE 62.1) as described in greater detail above with reference to FIGS. 11-20 can achieve a risk of infection at the right and lowermost point of ventilation portion 3204 (e.g., to a risk of infection of approximately 10.5). Using a MERV 8 filter at AHU 304 may allow the risk of infection to be further reduced (e.g., achieving a risk of infection of approximately 8) as illustrated by first filter portion 3206. Using a MERV 8 filter at AHU 304 can allow the risk of infection to be further reduced (e.g., achieving a risk of infection of approximately 6.5) as illustrated by second filter portion 3208. Using 100% clean air with the MERV 13 filter allows further reduction of the risk of infection (e.g., achieving a risk of infection of approximately 6). In order to achieve further reduction of the risk of infection, (e.g., to achieve risk of infections levels within the in-zone filtration portion 3212), in-zone filtration or air cleaning may be required (e.g., installation and use of one or more in-zone filtration devices 3904). Graph 3200 illustrates different examples for an HVAC system assuming a constant air volume (CAV).

Figure 35:
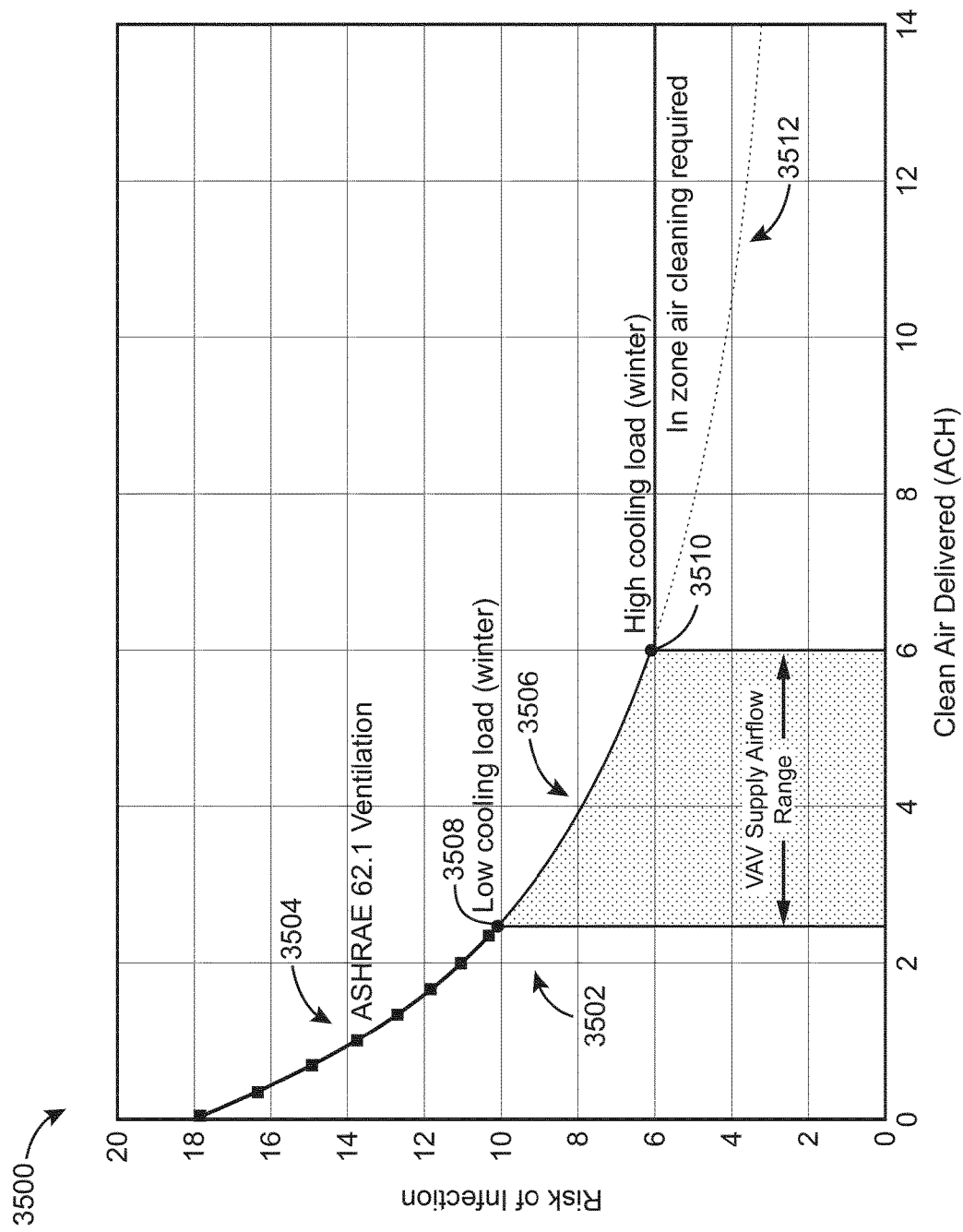
FIG. 35 is a graph illustrating various approaches to reduce a risk of infection in a zone for a variable air volume HVAC system, according to some embodiments.

However, in many cases, the HVAC system that serves a zone is not a CAV system, but is rather a variable air volume (VAV) system. Referring now to FIG. 35, graph 3500 illustrates risk of infection (the Y-axis) with respect to a delivery of clean, filtered, or purified air (the X-axis), according to some embodiments. Similarly to graph 3200, graph 3500 includes curve 3502 which includes ventilation portion 3504. Curve 3502 also includes a VAV airflow range

3506 that is bounded by a low cooling airflow point 3508 and a high cooling airflow point 3510. An actual airflow may be varied between the low cooling airflow point 3508 and the high cooling airflow point 3510, thereby changing the risk of infection between approximately 10 and 6, respectively. In order to achieve additional reduction of the risk of infection (e.g., beyond the high cooling airflow point 3510) and to push the risk of infection into zone 3512, additional in-zone air cleaning may be required.

Figure 36:
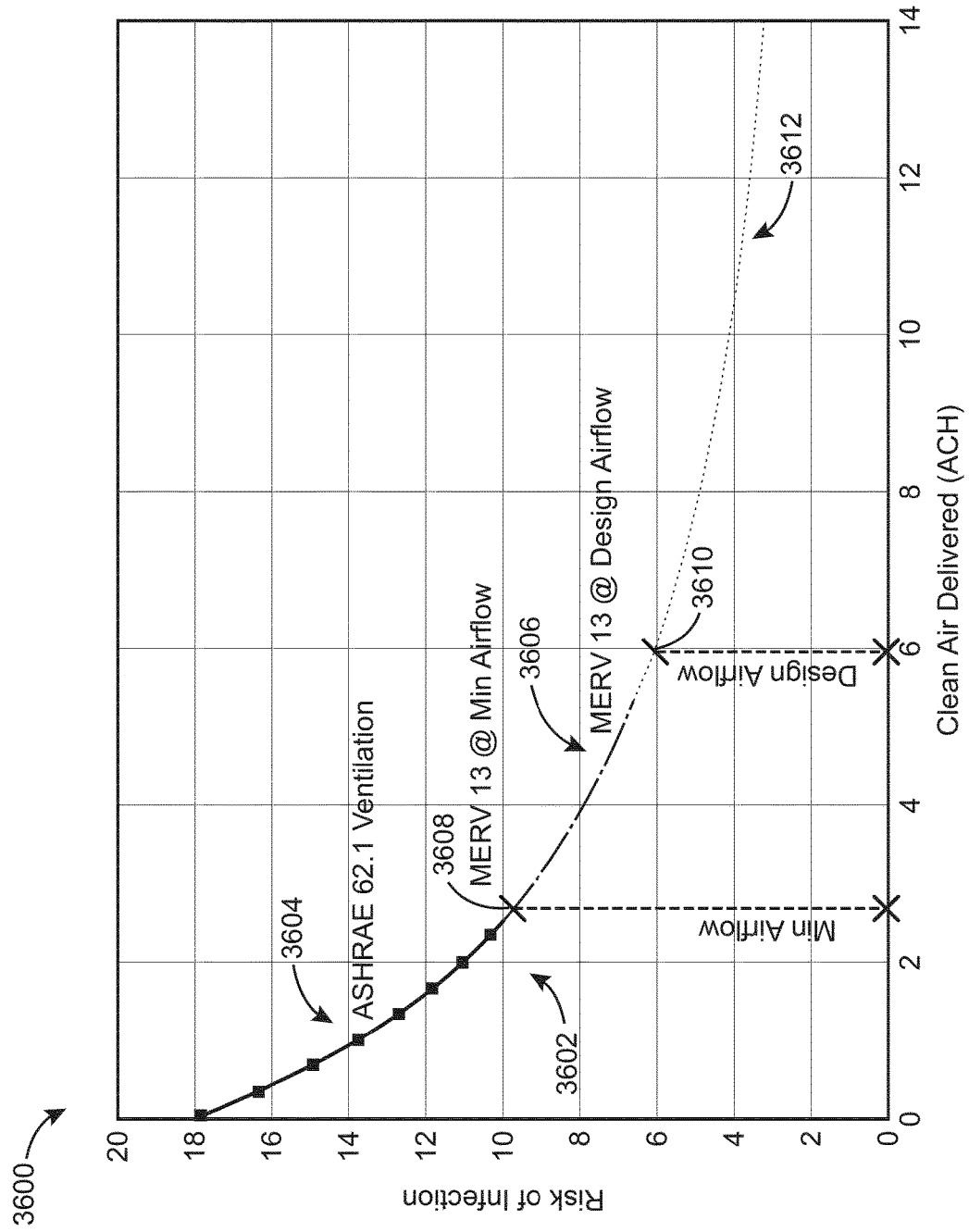
FIG. 36 is a graph illustrating an effect that an airflow has on an efficacy of at-air handler filtration, according to some embodiments.
Figure 37:
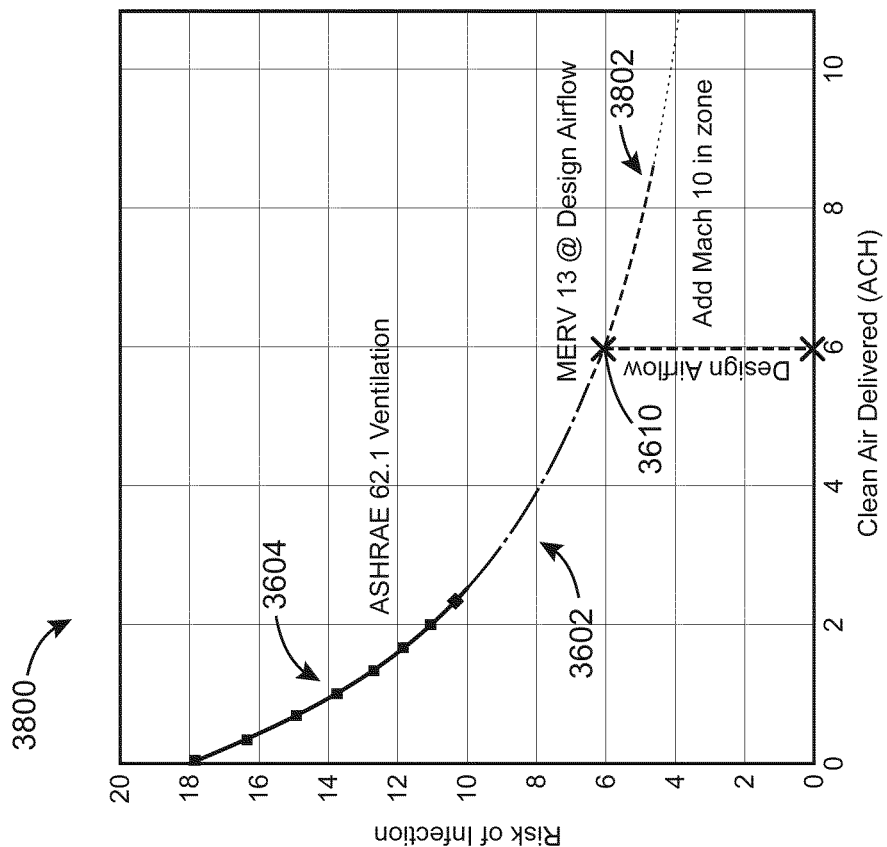
FIG. 37 is a graph illustrating a reduction of risk of infection when operating an air handler at a minimum airflow rate and installing an in-zone filtration device, according to some embodiments.

Referring now to FIG. 36, a graph 3600 illustrates risk of infection (the Y-axis) with respect to clean, filtered, or purified air delivery (the X-axis), according to some embodiments. Graph 3600 includes curve 3602 which may be the same as or similar to curve 3502, curve 3202, or series 3004. Curve 3602 includes ventilation portion 3604 that is the same as or similar to ventilation portion 3504 or ventilation portion 3204. Curve 3602 also includes a filter portion 3606 that illustrates an affect that using a MERV 13 filter can have on the risk of infection. Filter portion 3606 includes a minimum airflow point 3608 and a design airflow point 3610 that is greater than the minimum airflow point 3608. As illustrated by filter portion 3606, minimum airflow point 3608, and design airflow point 3610, using a MERV 13 filter may have different effects on the risk of infection depending on a rate of air that is passed through the MERV 13 filter. For example, at the minimum airflow point 3608, the risk of infection may be significantly higher than the risk of infection as at the design airflow point 3610. In this way, an efficacy of a filter that is used may depend on a rate of the air that is passed through the filter. In order to achieve additional reduction of the risk of infection and transition into zone 3612 along curve 3602, Referring now to FIGS. 37 and 38, graph 3700 and graph 3800 illustrate an affect that installing and using an in-zone filtration device can have on a risk of infection. Graph 3700 illustrates curve 3604 when the AHU is operated at the minimum airflow point 3608. Adding an in-zone filtration device results in achieving a reduced risk of infection, illustrated by in-zone portion 3702. Specifically, adding the in-zone filtration device may result in a risk of infection of approximately 6 when the AHU includes a MERV 13 filter and is operated at the minimum airflow point 3608. As shown in FIG. 37, the risk of infection is initially approximately 18, is reduced to less than 10 by operating the AHU and using a MERV 13 filter, and is further reduced to approximately 6 when an in-zone filtration device is installed.

Figure 38:
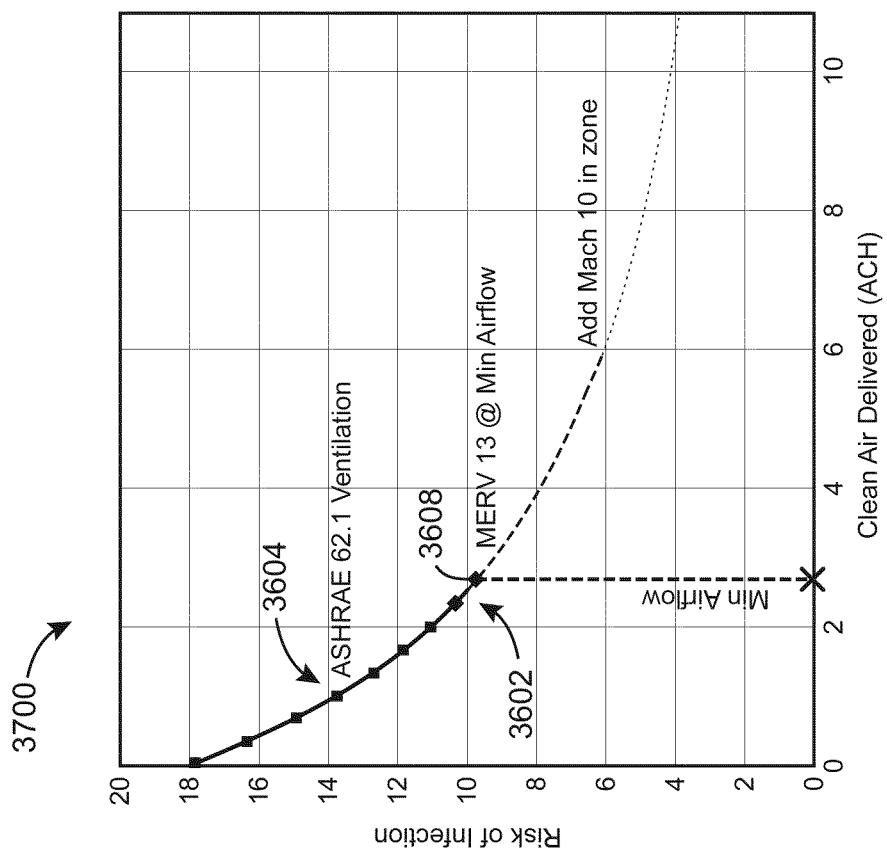
FIG. 38 is a graph illustrating a reduction of risk of infection when operating an air handler at a design airflow rate and installing an in-zone filtration device, according to some embodiments.

Graph 3800 of FIG. 38 shows a similar result but for the case when the AHU is operated at the design airflow for the MERV 13 filter (e.g., at the design airflow point 3610). The risk of infection can be reduced to approximately 6 through operation of the AHU at the design airflow point 3610 and using the MERV 13 filter. Portion 3802 of curve 3602 further shows that the risk of infection can be reduced to less than 5 by installing and using an in-zone filtration device.

It should be understood that any of the in-zone filtration devices as described herein can be free-standing, ceiling mounted, wall-mounted, etc., devices that include a mechanism (e.g., a fan) for drawing air into an inner volume of the device and a mechanism to filter, purify, clean, etc., the air (e.g. using a filter). The in-zone filtration device then expels the air from the inner volume to the zone. For example, the in-zone filtration device may be a Mach 10 600 cfm MERV 13 filter unit that is positioned locally within the zone.

Figure 40:
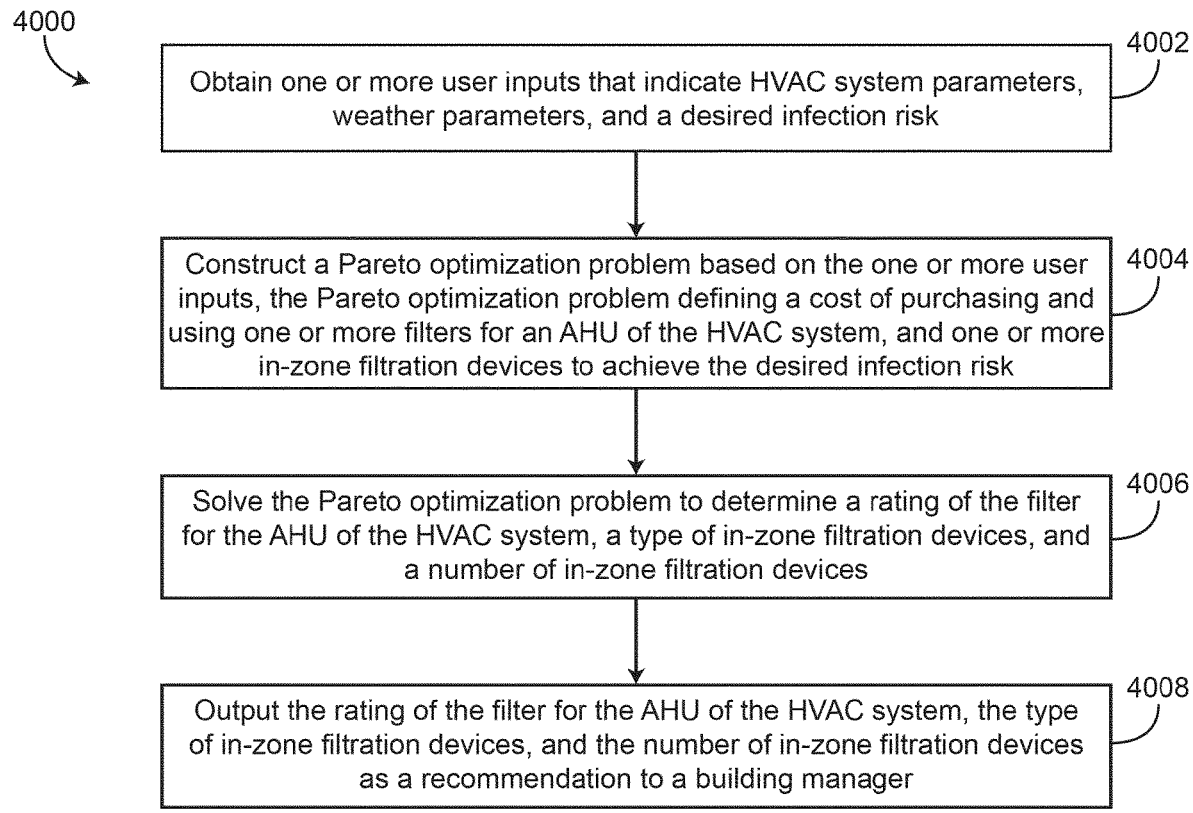
FIG. 40 is a flow diagram of a process for performing a Pareto optimization to determine a recommended rating of an at-air handling unit filter, and a type and number of in-zone filtration devices, according to some embodiments.

Referring now to FIG. 40, a process 4000 for determining a rating of a filter to use at an AHU and a rating and number of in-zone filtration devices is shown, according to some embodiments. Process 4000 includes steps 4002-4008 and can be performed by any of the controllers described herein. In some embodiments, process 4000 is performed using any of the techniques described in greater detail above with reference to FIGS. 11-20.

Process 4000 includes obtaining one or more user inputs that indicate HVAC system parameters, weather parameters, and a desired infection risk (step 4002), according to some embodiments. In some embodiments, step 4002 includes receiving a desired relative infection risk (e.g., a desired reduction of infection risk, infection probability, disease generation rate or transmission rate, etc.).

Process 4000 includes constructing a Pareto optimization problem based on the one or more user inputs (step 4004), according to some embodiments. The Pareto optimization problem can define a cost of purchasing and using one or more filters for an AHU of the HVAC system, and a cost of purchasing and using one or more in-zone filtration devices to achieve the desired infection risk. In some embodiments, the costs are predicted into a future time horizon. In some embodiments, a rating, type, or size of the in-zone filtration devices, a number of the in-zone filtration devices, and a rating of the filter for the AHU of the HVAC system are control parameters of the optimization problem. In some embodiments, the desired infection risk is a constraint for the optimization problem. In some embodiments, the desired infection risk and a total cost (e.g., over the future time horizon) are both optimization objectives and the optimization is performed to minimize a difference between the desired infection risk and a predicted infection risk and to minimize the total cost over the future time horizon.

Process 4000 includes solving the Pareto optimization problem to determine a rating of the filter for the AHU of the HVAC system, a type of in-zone filtration devices, and a number of the in-zone filtration devices (step 4006) and outputting the rating of filter for the AHU of the HVAC system, the type of in-zone filtration devices, and the number of in-zone filtration devices as a recommendation to a building manager (step 4008), according to some embodiments. Steps 4004-4008 can be performed by any of the controllers as described herein.

While process 4000 and various other embodiments disclosed herein are discussed in relation to meeting a desired infection risk level, it should be understood that, in some embodiments, the features described herein could be used in conjunction with meeting a particular clean air goal, in addition to or rather than infection risk level. For example, in some implementations, process 4000 could be used to identify components to meet a particular rate of turnover of air in a space, or a particular clean air delivery rate (e.g., a certain minimum cubic feet per minute (CFM) of clean airflow). All such modifications are contemplated within the scope of the present disclosure.

Figure 41:
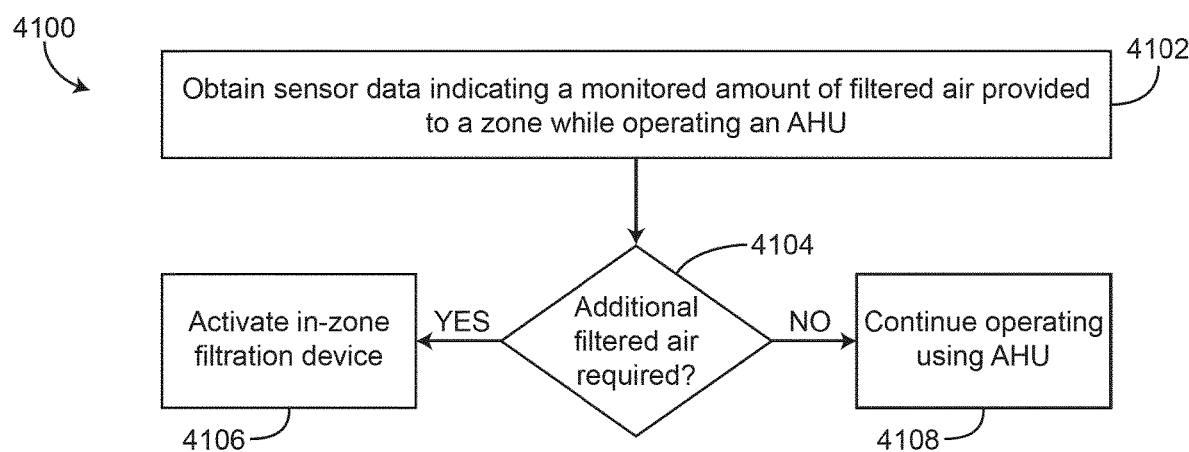
FIG. 41 is a flow diagram of a process for operating an HVAC system that includes both a filter at an air handler, and an in-zone filtration device, according to some embodiments.

Referring now to FIG. 41, a process 4100 for operating an HVAC system that includes an AHU with a filter and one or more in-zone filtration devices is shown, according to some embodiments. Process 4100 can be performed by controller 3908 for system 3900. Process 4100 includes steps 4102-4108.

Process 4100 include obtaining sensor data indicating a monitored amount of filtered air that is provided to a zone while operating an AHU (step 4102), according to some embodiments. The sensor data may indicate an amount of filtered air that is output from the AHU to the zone. The sensor data can be obtained as feedback from the AHU (e.g., based on an operational voltage or speed of a fan of the AHU) or from a flowmeter sensor.

Process 4100 includes determining if additional filtered air is required (step 4104), according to some embodiments. Step 4104 can be performed by controller 3908 based on the sensor data. Step 4104 may include comparing the sensor data to a corresponding threshold to determine if a sufficient amount of filtered air is being provided to the zone. The corresponding threshold may be a time-varying threshold that changes throughout the day. The corresponding threshold can be a threshold that, when satisfied or met, results in a desired risk of infection or a sufficiently low risk of infection being met. If additional filtered air is required (step 4104, "YES"), process 4100 proceeds to step 4106. If no additional filtered air is required (step 4104, "NO"), process 4100 proceeds to step 4108.

Process 4100 includes activating an in-zone filtration device (step 4106) in response to step 4104, according to some embodiments. In some embodiments, step 4106 is performed by controller 3908. Step 4106 can be performed in response to determining that additional filtered air is required to maintain a desired degree of infection risk reduction. Step 4106 can include generating and providing control signals to the in-zone filtration device (e.g., in-zone filtration device 3904).

Process 4100 includes continuing to operate using only the AHU (step 4108), according to some embodiments. Step 4108 can include returning to step 4102. Step 4108 may be performed in response to determining that additional filtered air is not required to maintain the desired infection risk reduction in the zone (step 4104, "NO").

Figure 33:
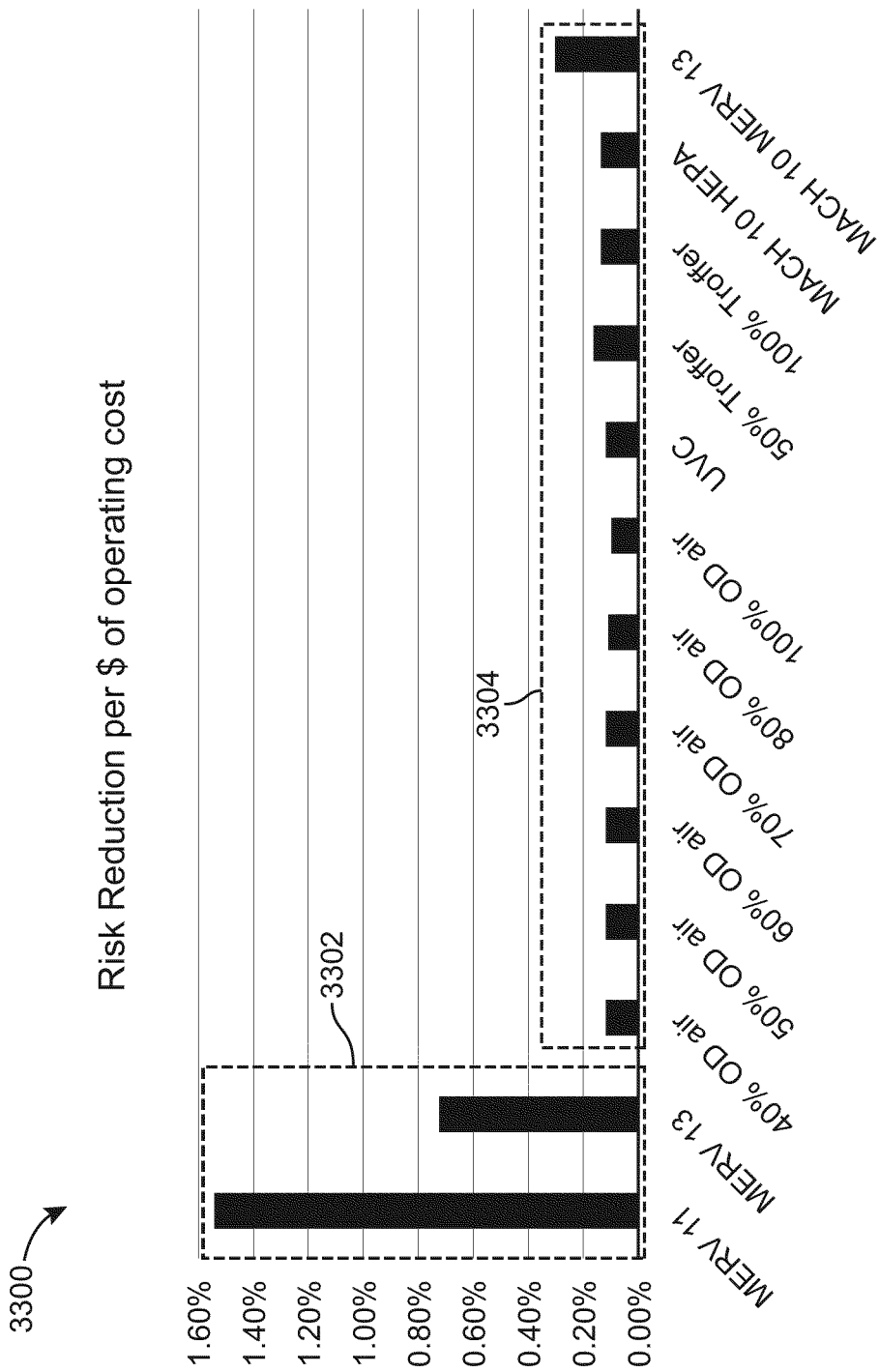
FIG. 33 is a graph illustrating an effectiveness of at-air handler filtration and in-zone filtration devices for infection risk reduction, according to some embodiments.

Referring now to FIG. 33, graph 3300 illustrates different results for various optimization scenarios. Graph 3300 illustrates risk reduction per monetary cost of operation. In some embodiments, graph 3300 illustrate an output of process 4000, or an output of the infection control tool as described in greater detail above with reference to FIGS. 11-20. The two left-most options 3302 of graph 3300 illustrate risk reduction for installing a MERV 11 or a MERV 13 filter at an AHU of the HVAC system. Options 3304 illustrate various in-zone filtration devices or other approaches. As shown in graph 3300, a most cost-effective initial step to achieve risk reduction may be to install and use a MERV 11 or a MERV 13 filter at the AHU.

Figure 34:
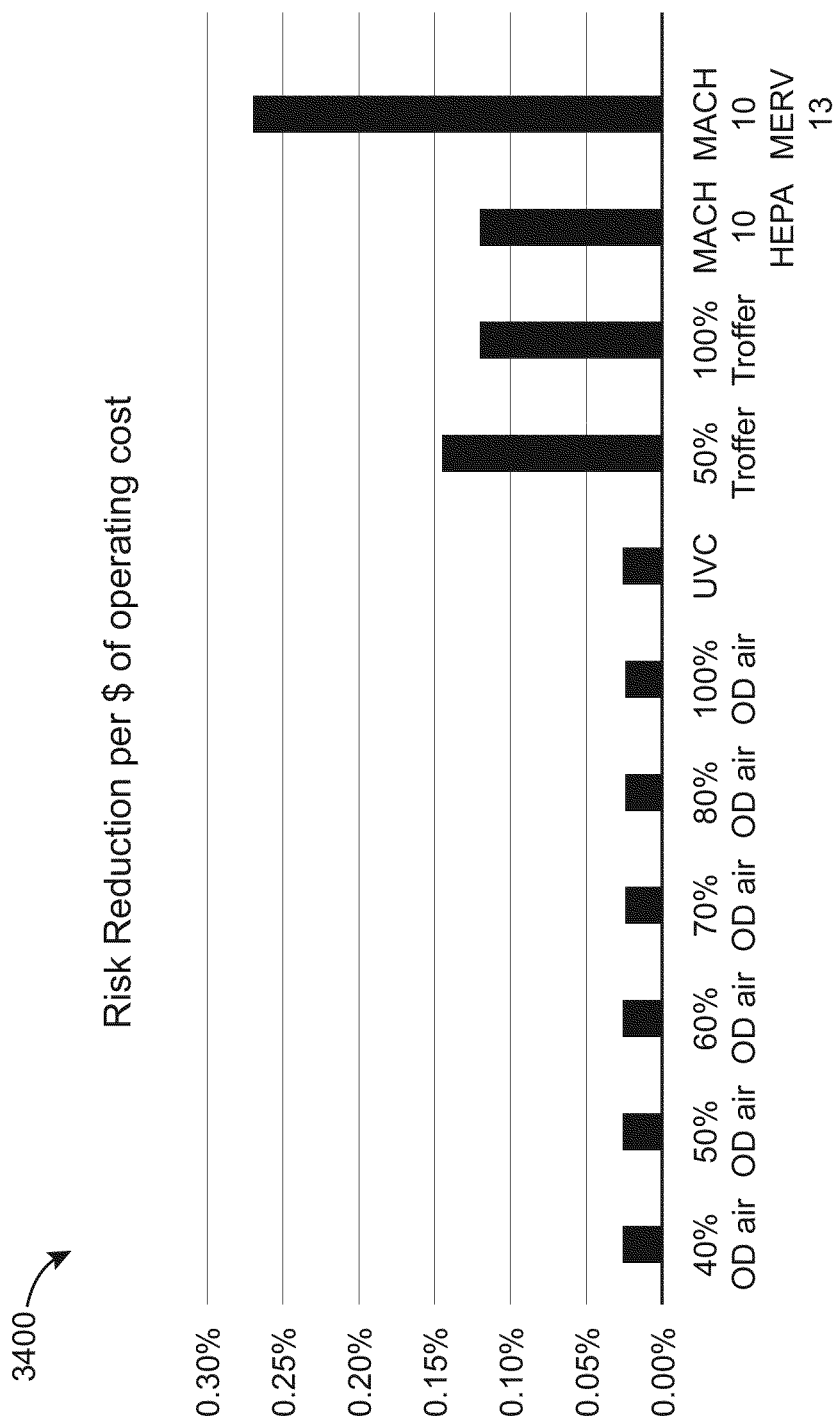
FIG. 34 is a graph illustrating an effectiveness of different and in-zone filtration devices for infection risk reduction, according to some embodiments.

Referring now to FIG. 34, graph 3400 illustrates different results for various optimization scenarios. Graph 3400 also illustrates risk reduction per monetary cost of operation. Graph 3400 may illustrate an output of process 4000, or an output of the infection control tool as described in greater detail above with reference to FIGS. 11-20. Graph 3400 illustrates optimization or simulation results assuming that the AHU of the HVAC system uses a MERV 13 filter. All of the options of graph 3400 show different in-zone or additional measures that can be taken to achieve additional risk reduction (e.g., a secondary approach in addition to using the MERV 13 filter at the AHU). As shown in graph 3400, the MACH 10 MERV 13 filter device (e.g., an in-zone filtration device that uses a MERV 13 filter) is determined to be the most cost effective.

In-Zone Plume Control/Air Filtration System

Figure 42:
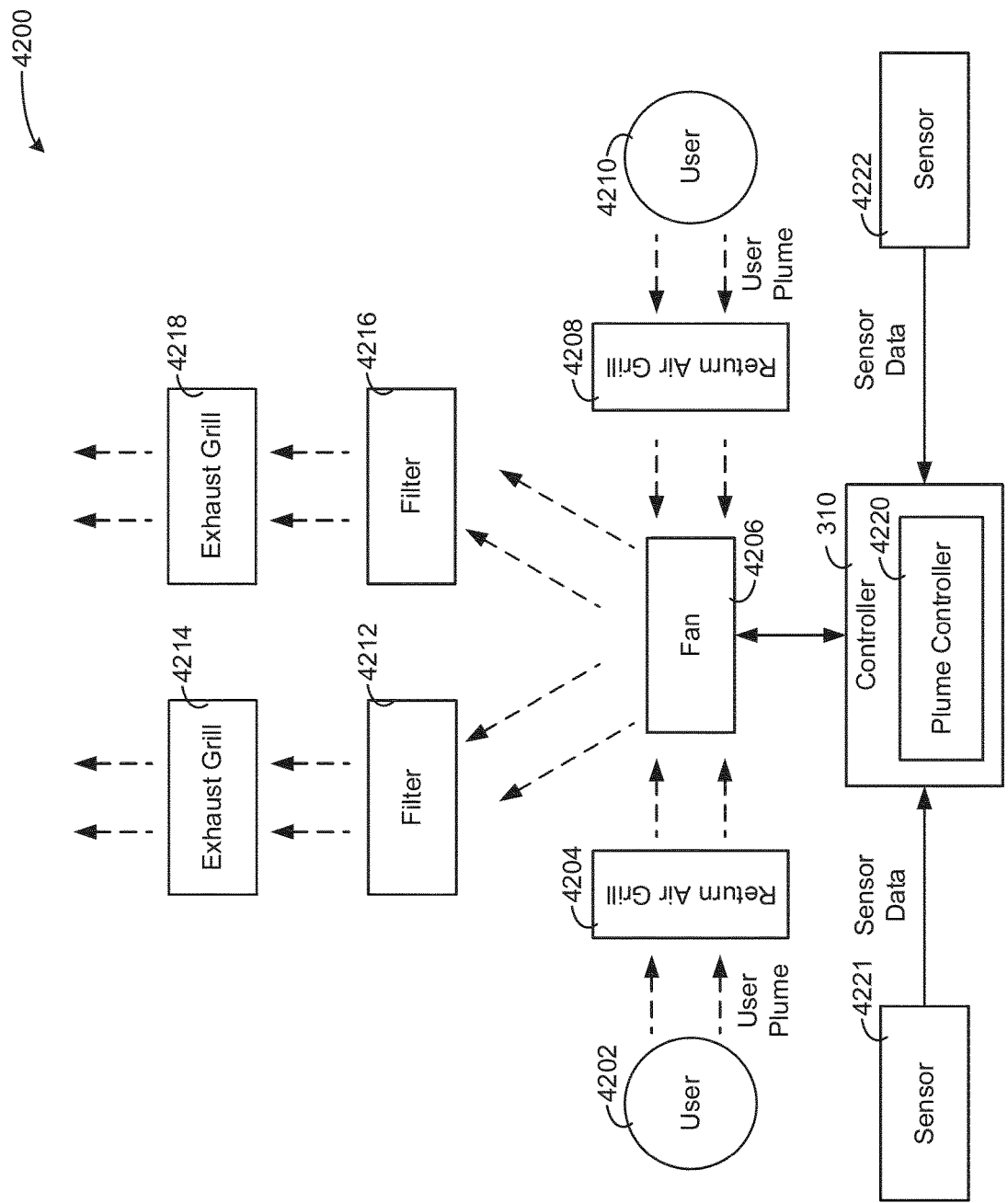
FIG. 42 is a block diagram of a plume control system that filters exhaled air of users seated at the table, according to an exemplary embodiment.

Referring now to FIG. 42, a plume control system 4200 that filters exhaled air of users seated at a table is shown, according to an exemplary embodiment. The plume control system 4200 can be configured to receive a user plume from a user 4210, filter the user plume, and discharge the filtered plume. In some embodiments, the plume control system may discharge the filtered plume away from other users. The system 4200 can be located entirely within a zone of a building and be separate from an airside system (e.g., VAVs, AHUS, etc.) of the building. In some implementations, the system 4200 may not be located entirely within a zone of the building, but may pull air from the zone of the building, filter it, and return air to the zone of the building. The plume control system 4200 includes the controller 310 which includes a plume controller 4220. In some implementations, the plume control system 4200 may be designed to remove infectious disease particles from the air. In other implementations, the plume control system 4200 may additionally, or alternatively, be designed to remove other types of particles from the air (e.g., may be designed to improve overall air quality in the zone).

The plume controller 4220 can be a software and/or hardware component of the controller 310. The plume control system 4200 can provide infection control within a building. In some embodiments, the plume control system 4200 can be installed in furniture of a building, e.g., in a table (e.g., a conference room table, a dining table, a work desk, a classroom desk, a lecture hall desk, a vaccine refrigerator, etc.), a chair, a couch, etc. In some embodiments, the plume control system 4200 can be designed as a kit or retrofit assembly, such that it can be installed in or on existing furniture (e.g., furniture designed for the addition of such a kit or furniture not specifically designed for such a kit). In some embodiments, the plume controls system 4200 may be a standalone device, such as a device placed at a particular location or particular locations within the zone and not installed in or otherwise integrated with furniture.

The plume control system 4200 can be configured to draw potentially infectious air away from the users 4202 and 4210, e.g., pull air plumes generated by the users 4202 and 4210 away from the users 4202 and 4210. This can allow for users to avoid being in an air plume of another user. The plume control system 4200 can clean the air plumes of the users 4202 and/or 4210 and move the cleaned air away from the users 4202 and/or 4210. In some embodiments, the plume control system 4200 is located in a conference room table where multiple users are seated. The plume control system 4200 can draw potentially infectious air away from the users seated at the table toward the center of the table and away from the users. In such an implementation, the plume control system 4200 may be implemented in an interior portion of the table (e.g., near a center of the table) because such a placement allows for pulling and filtering plumes from users without drawing the plumes across other users, possibly exposing the other users to potentially infectious air.

The plume controller 4220 is configured to receive sensor data from sensors 4221 and 4222 but may receive sensor data from any number of sensors. The sensors may be occupancy sensors (e.g., passive infrared (PIR) sensors, occupant gas generated sensors, electric switches, ambient light sensors, etc.), such as sensors that detect or receive an indication of the presence of a user, e.g., the users 4210 and/or the user 4202, and/or possibly use of the zone (e.g., direct or indirect indication of use, such as a light having been turned on). A detection of the users 4202 and/or 4210 can indicate that a user generated plume is present that should be filtered by the plume control system 4200. In some implementations, the plume controller 4220 may not include such sensors. For example, in some implementations, the plume controller 4220 may be configured to operate continuously.

The sensors 4221 and/or 4222 can be infrared cameras, in some embodiments. The infrared cameras can capture plumes, e.g., exhaled air. The plume controller 4220 can, in some embodiments, use the plumes to control the plume control system 4200 and/or various other plume control systems to suck in the plumes and filter them. The plume controller 4220 can identify which plume control systems should be activated or what fan speeds should be run for the fans of the plume control systems. The IR data captured by the IR cameras can, in some embodiments, be used to populate a three dimensional view of a building space which can indicate clean air and polluted air. The three dimensional view of the building space can be a BIM and/or heat map (e.g., different colors indicating clean or dirty air). In some embodiments, the sensors 4221 and/or 4222 can be CO2 sensors that measure CO2 levels of a space. The CO2 levels can indicate whether air in the area needs to be cleaned. If the CO2 levels of a certain area of the space is over a particular level, the plume controller 4220 can activate the appropriate filtration system in the area with the high level of CO2.

In some embodiments, the plume controller 4220 can run the fan 4206 in reverse to provide clean filtered air to the users 4202 and/or 4210 to breath. The sensors 4221 and/or 4222 can be audio sensors that can collect audio data. The plume controller 4220 can detect a cough or sneeze based on the audio data and begin operating the fan 4206 to draw air away from the user that coughed or sneezed.

In response to detecting the presence of the users 4202 and/or 4210 or otherwise receiving an indication to turn on, the plume controller 4220 can be configured to activate the fan 4206. The fan may be any type of fan configured to circulate air. In some embodiments, the fan is an axial, centrifugal, and/or tangential fan. In FIG. 42, the fan may be a tangential fan. When the fan is activated, a motor of the fan may operate causing air to be drawn in through the return air grills 4204 and 4208. The drawing in of the air through the return air grills 4204 and 4208 can draw in the user generated plumes. The fan 4206 can discharge the air through filters 4212 and/or 4216, removing any type of particular (e.g., an aerosol particle including an infectious disease particle).

In some embodiments, the plume control system 4200 can include one or more input dampers for controlling the direction of received air and/or one or more exhaust dampers for controlling the direction of exhausted air. The dampers can be controlled by the plume controller 4220 to divert air in a building space so that the air exhaled by one user is not drawn in a direction towards another user. Furthermore, the exhaust dampers can control the exhaust of filtered air. In this regard, the exhaust dampers can be controlled by the plume controller 4220 to divert filtered air away from occupants.

In some embodiments, when a building space has multiple plume control systems 4200, the dampers of each plume control system can operate together to create air streams within a building based on the location of each occupant and each plume control system. The fans and/or dampers of each plume control system can be operated by a controller system so that air exhaled by one user is drawn away from other users in a direction that does not cross through the other users. This can prevent a healthy user from inhaling exhaled air of an infected user infected by an infectious disease.

The plume control system 4200 includes return air grills 4204 and/or 4208. Furthermore, the plume control system 4200 includes exhaust grills 4214 and/or 4218. The return air grills 4204 and/or 4208 can be configured to pull in air through one or more openings of the return air grills 4204 and/or 4208. The exhaust grills 4214 and/or 4218 can be configured to exhaust filtered air through one or more openings of the exhaust grills 4214 and/or 4218. The grills 4204, 4208, 4214, and/or 4218 can be metal gratings, plastic gratings, and/or any other device with one or more openings.

In some embodiments, the grills 4204 and/or 4208 can be and/or can include louvers. The louvers can have an antimicrobial coating to prevent the build-up of disease particles. The coating may be a coper coating, in some embodiments. The coating can be applied in layers, in some cases. The layers can each be attached to a film that includes a pull tab. A user can pull the pull tab to remove the film and expose another layer. These layers can allow a user to pull off and discard old layers as time passes. In some embodiments, the system 4200 includes a heater system, e.g., a resistive heating system. The heater system can heat up the louvers or other components that a user may touch of the system 4200 to disinfect the components.

The fan 4206 can be configured to discharge the filtered air through the exhaust grills 4214 and 4218. In some embodiments, the exhaust grills 4214 and/or 4218 are configured to discharge air away from the users 4202 and 4210. This can prevent discharge air which may include an infectious disease particle that survives the filtering of the filters 4212 and/or 4216 to move away from the users 4202 and/or 4210, preventing the users 4202 and/or 4210 from contracting an infectious disease. In some embodiments, the fan 4206 can run at a variety of different speeds. The speed can be set via a user input by a user to increase or decrease the speed. In this regard, if a user prefers to run the fan 4206 at full speed, the fan 4206 can run at full speed.

In some embodiments, the plume control system 4200 can include a white noise generator. The plume control system 4200 can, in some embodiments, create destructive waves via a speaker to cancel out the sound of the fan 4206 running, detected by a microphone of the plume control system 4200. In some embodiments, the plume control system 4200 can play music or nature sounds via the speaker to drown out the sound of the fan 4206. In some embodiments, the plume control system 4200 can provide power, e.g., include a wireless charging station, a power outlet, a USB port, etc.

In some embodiments, the plume control system 4200 performs sensing on air plumes of the users 4202 and 4210 via one or more sensors integrated in the system 4200 to detect diseases (e.g., viruses, bacteria, etc.). The sensors can be included in the system 4200 between the return air grills 4204 and 4208 and the filters 4212 and 4216. The sensors can be configured to perform real-time disease identification in the air plumes. In some embodiments, the sensor detections can be correlated with occupant identifications of the users 4202 and/or 4210 via the sensors 4221 and 4222.

The plume controller 4220 can correlate a detection of an occupant with identifications of a disease. The plume controller 4220 therefore can perform disease testing for occupants of a space. For example, if the plume control system 4200 is installed in a lobby of a building, the plume control system 4200 can perform disease testing before occupants are permitted access to the rest of the building. Similarly, the plume control system 4200 could be installed in an airport or on a breeze between an airport and a plane to detect whether occupants are infected with a disease before the occupants fly on the plane. In some cases, the plume control system 2400 can be installed in a plane, in a hospital, in a hospital room, in conference rooms, etc. to perform disease testing of occupants of those spaces.

Figure 43:
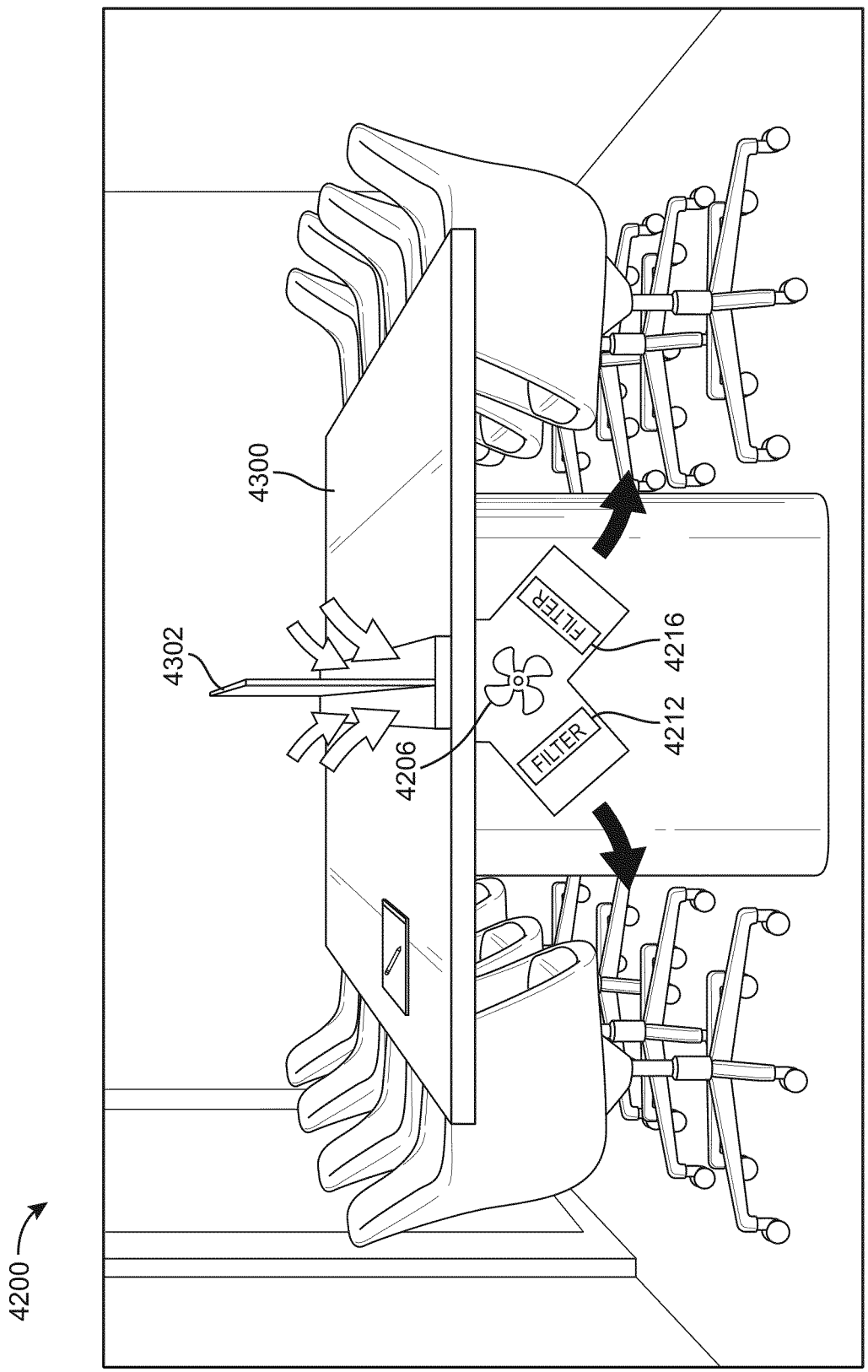
FIG. 43 is a schematic diagram of the plume control system of FIG. 42, according to an exemplary embodiment.

Referring now to FIG. 43, a schematic diagram of the plume control system 4200 is shown, according to an exemplary embodiment. In FIG. 43, the plume control system 4200 is installed in a conference room table 4300. The conference room table 4300 includes the components of the plume control system 4200, e.g., the filters 4212 and 4216, the fan 4206, etc. Furthermore, the conference room table 4300 includes a shield 4302 separating two sides of the table. In some embodiments, the shield 4302 is a glass, plexi-glass, and/or any other type of material, transparent or opaque.

In some embodiments, the fan 4206 is a tangential fan. This can cause the plumes generated by users seated at the table 4300 at a generally horizontal direction down towards the floor through the filters 4212 and/or 4216. The filters 4212 and/or 4216 can be any type of filter, e.g., any rating Minimum Efficiency Reporting Value (MERV) filter. In some embodiments, the filters 4212 and/or 4216 are low MERV filters that catch debris, e.g., exhaled particles. The filtered air can be returned to the room in a direction towards the feet of the users seated at the table 4300. In some embodiments, instead of using a physical filter, the filters 4212 and/or 4216 are disinfectant light based filters. The disinfectant light based filters can use ultraviolet light, e.g., UVC, to disinfect air. In some embodiments, when a physical filter is used, pressure sensors are used to detect a pressure drop across the filter. Based on the pressure drop, the plume controller 4220 can detect a time at which to replace the filters 4212 and/or 4216.

In some embodiments, the plume control system 4200 can be integrated within furniture, e.g., the furniture can be manufactured with the plume control system 4200. In some embodiments, the plume control system 4200 can retrofit existing furniture, e.g., the plume control system 4200 can be packed in a cassette that can be installed into existing furniture. For example, the return air grills 4204 and/or 4208 can be installed through existing power and/or network connection backplanes of a conference room table.

Figure 44:
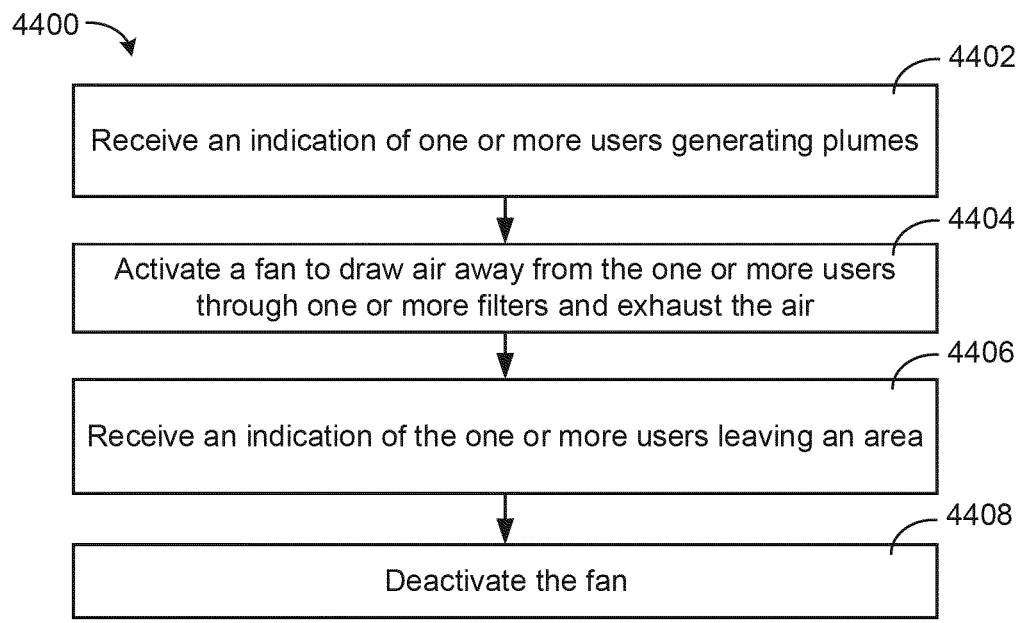
FIG. 44 is a flow diagram of a process of the plume control system of FIG. 42 operating to filter air exhaled by one or more users, according to an exemplary embodiment.

Referring now to FIG. 44, a process 4400 of the plume control system 4200 operating to filter air exhaled by one or more users is shown, according to an exemplary embodiment. In some embodiments, the process 4400 can be performed by the plume controller 4220. Any computing system described herein can be configured to perform the process 4400.

In step 4402, the plume controller 4220 receives an indication of one or more users generating plumes. For example, in some embodiments, the sensors 4222 and/or 4221 can be occupancy sensors that detect the presence of the users 4210 and/or 4202 near the plume control system 4200. In some embodiments, the sensors 4222 and/or 4221 are gas sensors that detect occupant generated gases. In some embodiments, a user may press a button or activate a switch causing the plume controller 4220 to activate the fan 4206.

In step 4404, in response to receiving the indication of the users generating the plumes, the plume controller 4220 activates the fan 4206, causing the fan 4206 to draw air away from the users 4210 and/or 4202. This sucks the user generated plumes in through the grills 4208 and/or 4204 and passing the plumes through the filters 4212 and/or 4216.

In step 4406, the plume controller 4220 can receive an indication of the users 4202 and/or 4210 leaving an area. The area may be a particular area around the plume control system 4200. In response to detecting the users 4202 and/or 4210 moving away from the plume control system 4200, the plume controller 4220 can deactivate the fan 4206, in step 4408.

Figure 45:
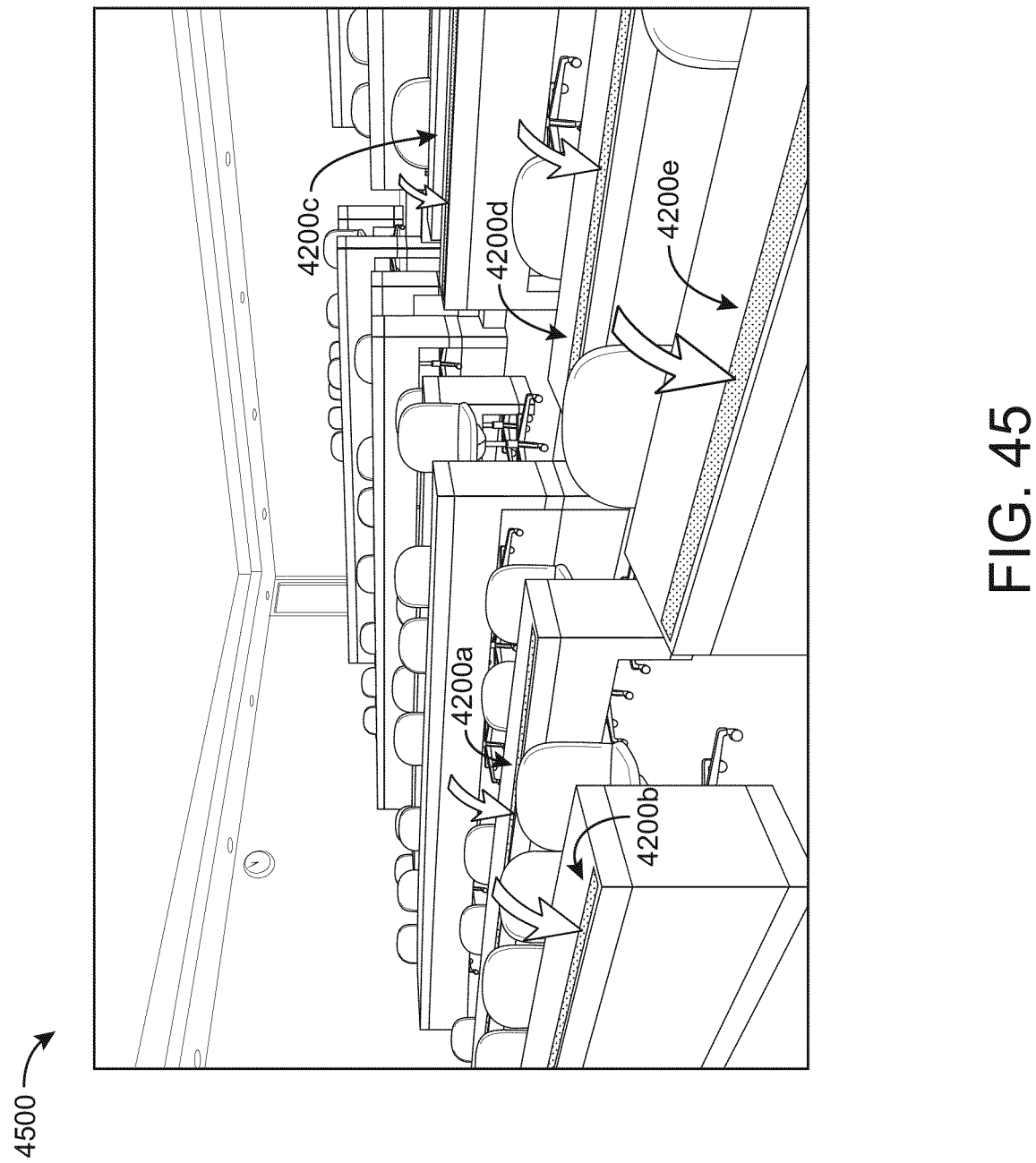
FIG. 45 is a schematic diagram of the plume control system of FIG. 42 installed in lecture hall desks, according to an exemplary embodiment.

Referring now to FIG. 45, a schematic diagram of the plume control system 4200 installed in lecture hall desks of a space 4500 is shown, according to an exemplary embodiment. In FIG. 45, lecture hall including multiple tiers of desks can each include the plume control system 4200, plume control systems 4200*a*-4200*e*. The plume control system 4200 can be installed in lecture halls, conference rooms, classrooms, and/or other gathering locations where multiple desks may be installed. Each of the plume control systems 4200*a*-4200*e* can draw the air plumes away from the users to enable a safe location where the probability of the spread of an infectious disease is low.

The control system 4200 can, in some embodiments, be a pipe or duct system laid out on top of desks or lecture tables. The pipe or duct system can include fans and/or filters laid out in front of each student to filter the plume created by each student exhaling. This pipe or duct system can enable a conference room or classroom to be at a full capacity and/or for social distancing requirements to be ignored.

Figure 46:
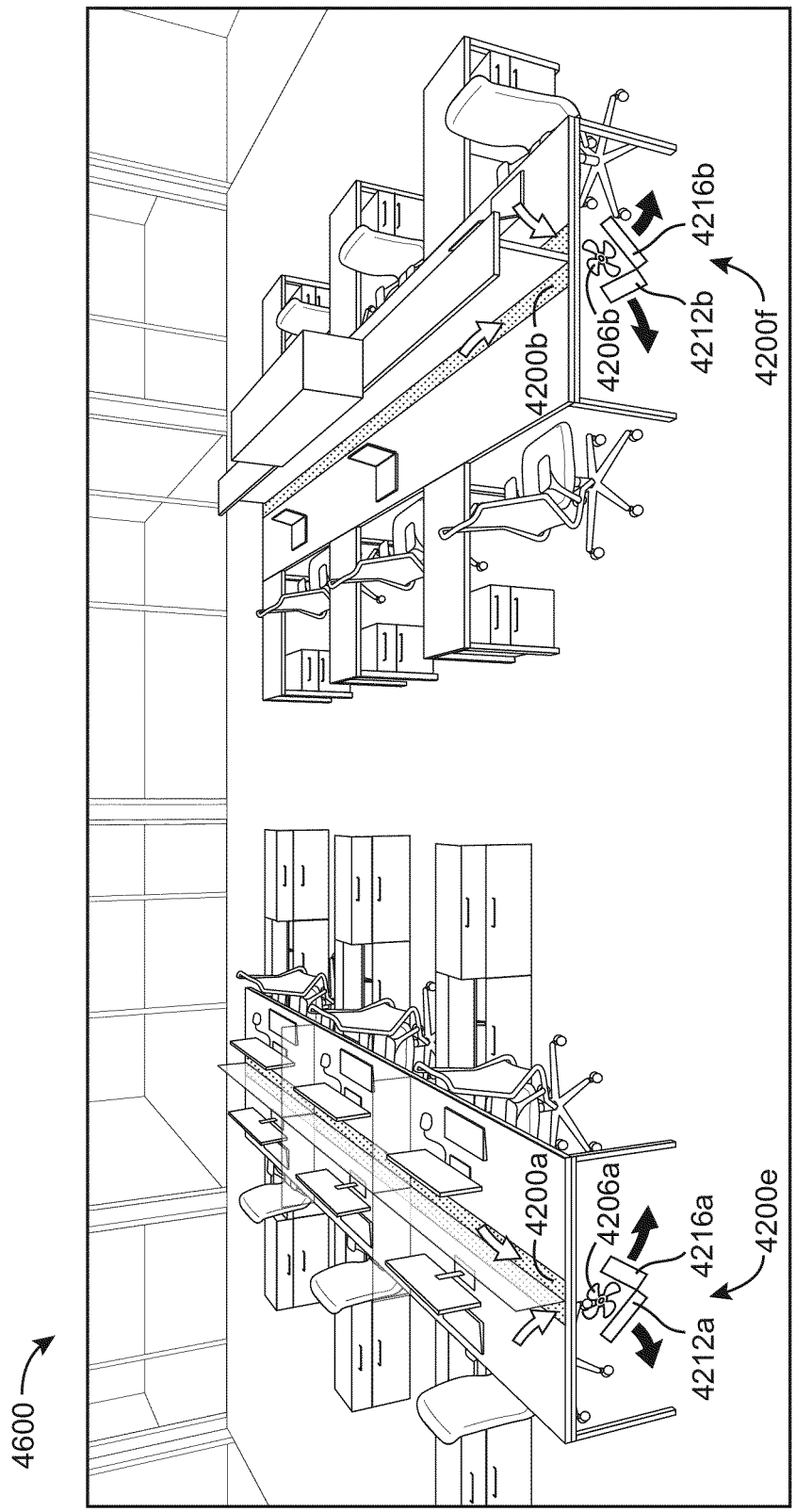
FIG. 46 is a schematic diagram of the plume control system of FIG. 42 installed in work desks of a workspace, according to an exemplary embodiment.

Referring now to FIG. 46, a schematic diagram of the plume control system 4200 installed in work desks of a workspace 4600 is shown, according to an exemplary embodiment. The workspace 4600, a commercial office, includes multiple desks where multiple users are seated while working. The workspace 4600 may be a collaborative work space where multiple plumes are generated by the users seated at the workbenches of the workspace 4600. The workspace 4600 includes a plume control system 4200*e* including a return air grill 4204*a*, a fan 4206*a*, and filters 4212*a* and 4216*a*. Plume control system 4200*f* includes a fan 4206*b* and filters 4212*b* and 4216*b*.

Figure 47:
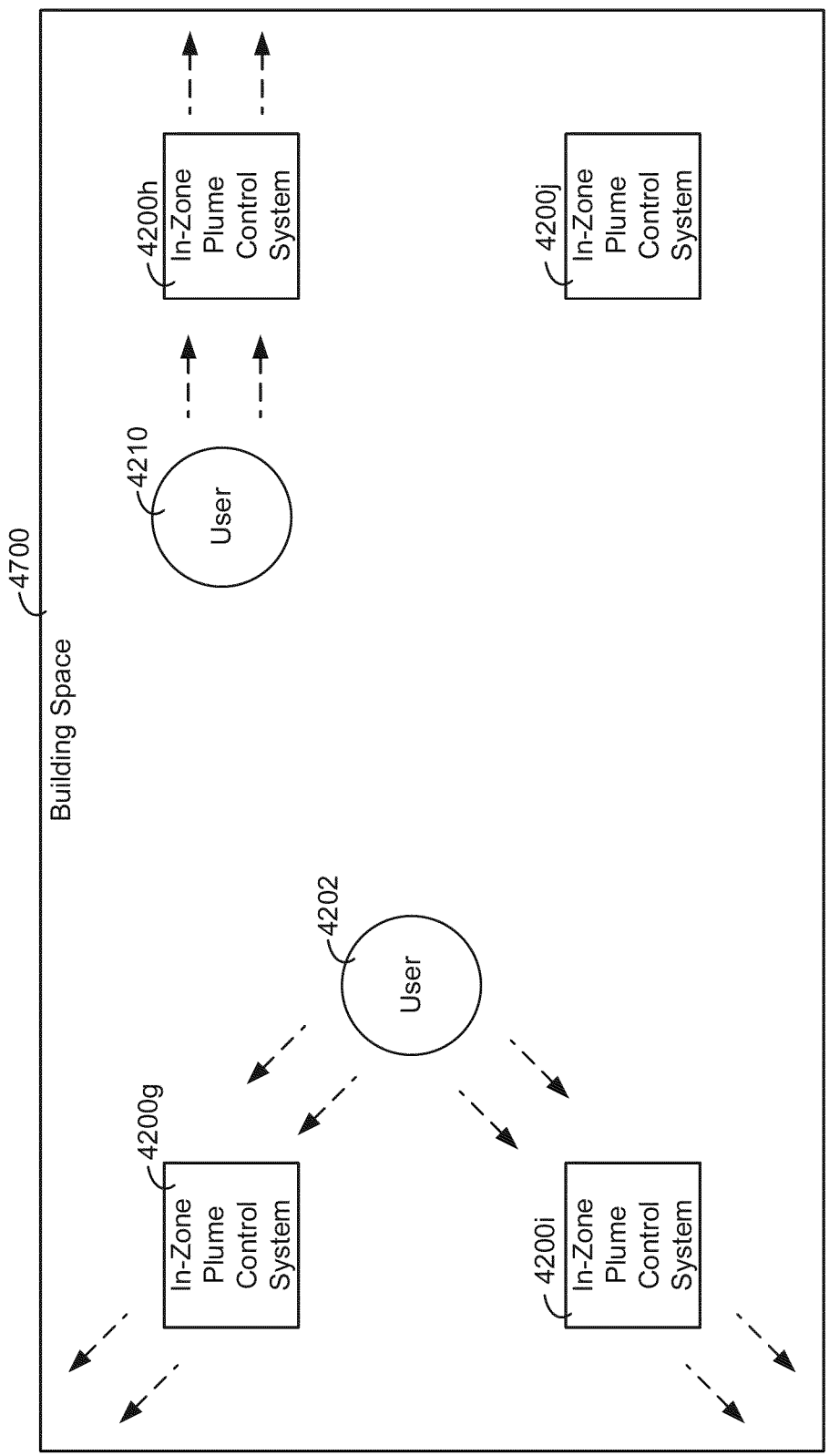
FIG. 47 is a schematic diagram of a building space with multiple in-zone plume control systems that are activated based on the locations of users within the building space, according to an exemplary embodiment.

Referring now to FIG. 47, a building space 4700 with multiple in-zone plume control systems 4200*g*-4200*j* that are activated based on the locations of the users 4202 and 4210 within the building space 4700 is shown, according to an exemplary embodiment. In some embodiments, the plume controller 4220 is configured to control the in-zone plume control systems 4200*g*-4200*j*. The plume controller 4220 can be configured to activate or deactivate each of the in-zone plume control systems 4200*g*-4200*j*. Furthermore, the plume controller 4220 can cause the in-zone plume control systems 4200*g*-4200*j* to run at particular levels, e.g., operate a variable speed drive of the in-zone plume control systems 4200*g*-4200*j* that drives the fan of the in-zone plume control systems 4200*g*-4200*j*.

The plume controller 4220 can be connected to each of the in-zone plume control systems 4200*g*-4200*j* via a wired network (e.g., an Ethernet, RS485, USB, etc.) and/or a wireless network (e.g., a Wi-Fi network, a Bluetooth network, a cellular network, a 5G network, etc.). The plume controller 4220 can receive sensor readings from each of the systems 4200*g*-4200*j* and/or issue control commands to each of the systems 4200*g*-4200*j*.

The plume controller 4220 can be configured to receive indications of the locations of users within the building space 4700, e.g., the user 4202 and/or the user 4210. The locations of the users 4202 and/or 4210 can be determined with Wi-Fi triangulation based on router communication to wireless devices (e.g., cell phones) carried by the users 4202 and/or 4210. In some embodiments, the locations of the users 4202 and/or 4210 can be determined with cameras, e.g., surveillance cameras, thermographic cameras, infrared cameras etc. that surveil the building space 4700. In some embodiments, the locations of the users 4202 and/or 4210 can be determined based on 5G tracking of wireless devices carried by the users 4202 and/or 4210. In some embodiments, the locations of the users 4202 and/or 4210 can be determined based on tag tracking (e.g., Bluetooth beacons) as described in U.S. Provisional Patent Application No.

63/004,269 filed Apr. 2, 2020 and U.S. patent application Ser. No. 17/220,795 filed Apr. 1, 2021, the entirety of each of these patent applications is incorporated by reference herein.

Based on the locations of the users 4202 and 4210, the plume controller 4220 can identify one or more in-zone plume control systems of the in-zone plume control systems 4200g-4200i to activate. The plume controller 4220 can store indications of the locations of each of the in-zone plume control systems 4200g-4200i. Based on the locations of the users 4202 and the 4210 and the locations of the in-zone plume control systems 4200g-4200j, the plume controller 4220 can determine which in-zone plume control systems of the in-zone plume control systems 4200g-4200j to activate and/or what fan speed to run the activated systems at.

The plume controller 4220 can identify in-zone plume control systems for activation to draw exhaled air of the users 4202 and 4210 away from each other and not towards each other. In this regard, the air exhaled by a first user is moved away from a second user so that the second user does not inhale the exhaled air of the first user.

In some implementations, the in-zone plume control systems may be portable/mobile, and the plume controller 4220 can identify the in-zone plume control systems for activation based on location of the users and the in-zone plume control systems, where the location of the in-zone plume control systems. For example, the in-zone plume control systems could be portable kits/units that can be placed in different locations to accommodate different spaces/events/occupancy/etc. The plume controller 4220 may receive data indicating locations of users and data indication locations of the in-zone plume control systems and determine which in-zone plume control systems in a similar manner as described above. In various implementations, the locations of the in-zone plume control systems may be determined using similar technologies as described above, such as Bluetooth, Wi-Fi, cellular (e.g., 5G), etc.

Figure 48:
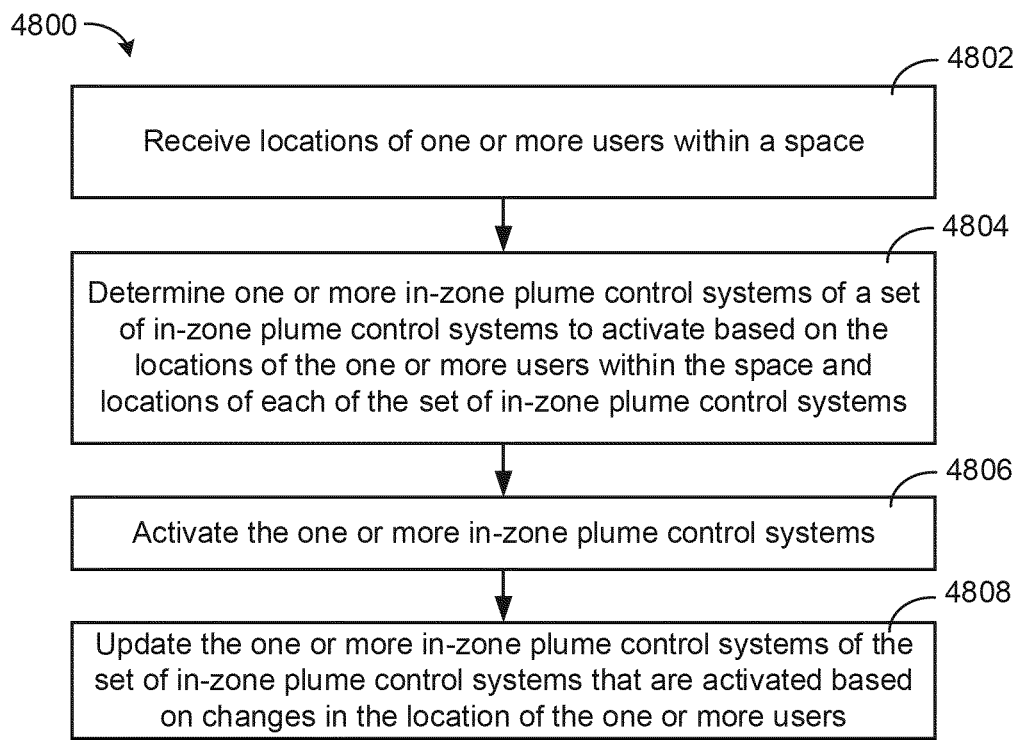
FIG. 48 is a flow diagram of a process of activating in-zone plume control systems of a building space based on the locations of users within the building space, according to an exemplary embodiment.

Referring now FIG. 48, a process 4800 of activating in-zone plume control systems of the building space 4700 based on the locations of the users 4202 and 4210 within the building space 4700 is shown, according to an exemplary embodiment. In some embodiments, the process 4800 can be performed by one controller centrally connected to all of the in-zone plume control systems 4200g-4200j. In some embodiments, the process 4800 can be performed by individual controllers of each of the in-zone plume control systems 4200g-4200j. In some embodiments, the plume controller 4220 is configured to perform the process 4800.

In step 4802, the plume controller 4220 receives locations of users within the building space 4700. The locations of the users can be received by the plume controller 4220 from a variety of different tracking systems, e.g., 5G tracking systems, Wi-Fi triangulation systems, Bluetooth beacon tracking systems, GPS, etc. In addition to receiving the locations of users within the building space 4700, the plume controller 4220 can receive locations of the in-zone plume control systems 4200g-4200j within the zone. The plume controller 4220 can receive indications of the locations of the design and layout of the building space 4700 which may indicate the location of each in-zone plume control system.

In step 4804, the plume controller 4220 can determine one or more in-zone plume control systems of the in-zone plume control systems 4200g-4200j to activate based on the locations of the users 4202 and 4210 and the locations of the in-zone plume control systems 4200g-4200j. The plume controller 4220 can select the one or more in-zone plume control systems for activation in order to prevent one user from inhaling the exhaled plume of another user. For example, in FIG. 47, in-zone plume control systems 4200g, 4200i, and 4200h are activated.

In step 4806, the plume controller 4220 can activate the one or more in-zone plume control systems identified in the step 4804. In some embodiments, the in-zone plume control systems can be activated at particular levels, e.g., the fan can run at a particular speed. The plume controller 4220 can identify the appropriate speeds for each of the in-zone plume control systems to run at and run each in-zone plume control system at the appropriate speed.

In step 4808, as the users 4202-4210 move about the building space 4700, the plume controller 4220 can update the in-zone plume control systems that are activated and/or the level at which they are activated. For example, the plume controller 4220 can repeatedly perform the steps 4802-4808.

Figure 49:
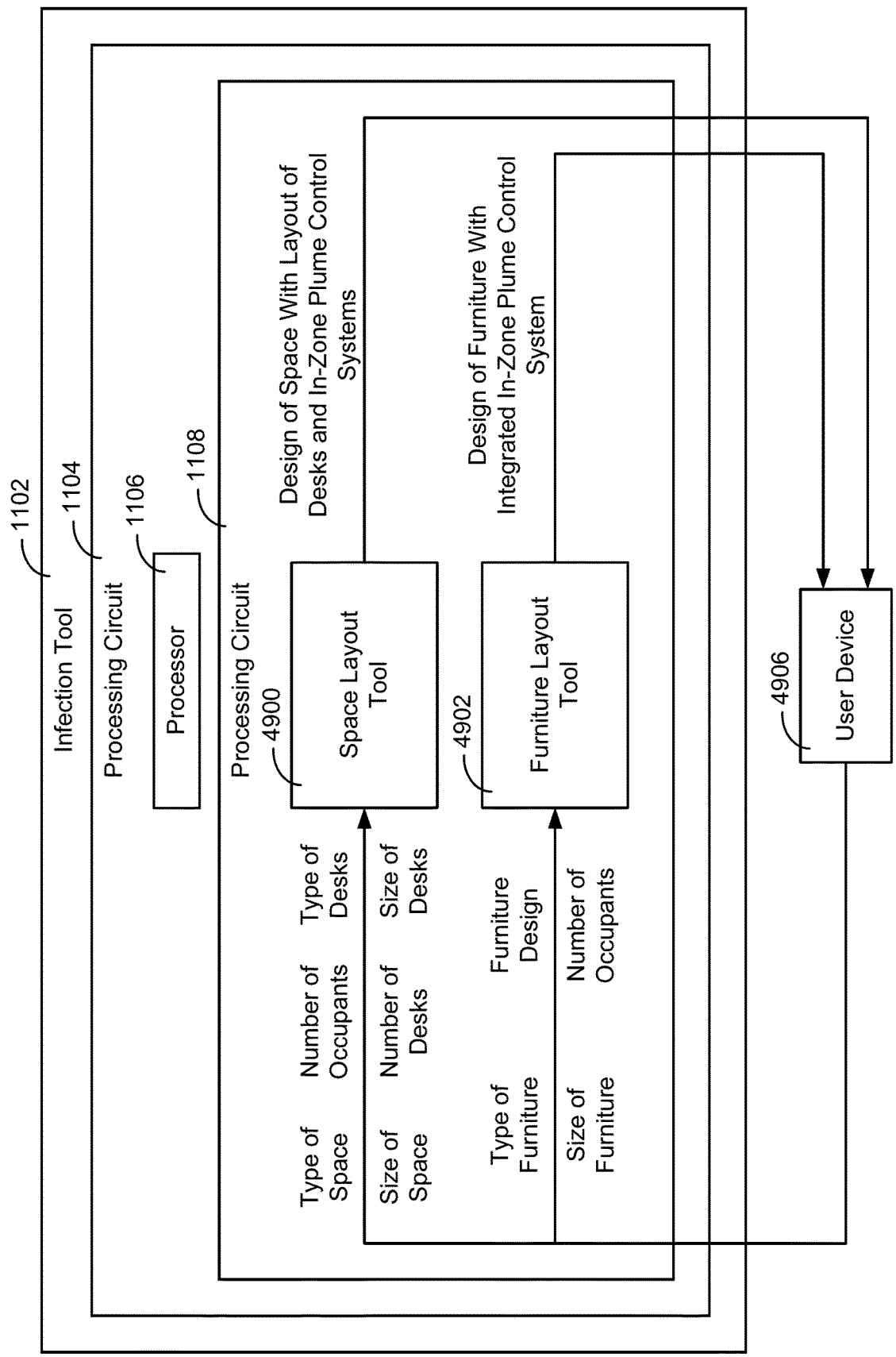
FIG. 49 is a block diagram of the infection tool including a space layout tool that generates a design of a space with a layout of desks and in-zone plume control systems and a furniture layout tool that generates a design of a piece of furniture with an integrated in-zone plume control system, according to an exemplary embodiment.

Referring now to FIG. 49, an infection tool 1102 including a space layout tool 4900 that generates a design of a space with a layout of desks and in-zone plume control systems and a furniture layout tool 4902 that generates a design of a piece of furniture with an integrated in-zone plume control system, according to an exemplary embodiment. The space layout tool 4900 and the furniture layout tool 4902 can receive input from a user device 4906. The user device 4906 can be a smartphone, a laptop, a tablet, a console, etc. The user device 4906 can include the user interface device 1110 and the display screen 1120.

The space layout tool 4900 can receive a type of the space being designed, a size of the space, a number of occupants expected to utilize the space, a number of desks for the space, a type of the desks that will be included within the space, and a size of the desks. Based on the input parameters, the space layout tool 4900 can be configured to design a space layout. The space layout can indicate the location and orientation of each desk within the zone. Furthermore, the space layout can indicate the location of each in-zone plume control system within the space.

The space layout tool 4900 can design the space to minimize the risk of the spread of the infectious disease between occupants within the space. For example, the space layout tool 4900 can generate a layout of desks so that one exhaled plume of a user is not inhaled by another user, e.g., forming a circle or half circle of designs with an in-zone plume control systems in the middle of the circle or half circle to draw exhaled air into the middle of the circle or half circle.

The furniture layout tool 4902 can be configured to design a piece of furniture based on multiple input parameters. The parameters can be type of the furniture to be designed, size of the furniture to be designed, a graphic design file of the furniture, a number of occupants for the furniture (e.g., number of users to be seated at a table), etc. The furniture layout tool 4902 can adjust the size or dimensions of a piece of furniture and/or the location of the in-zone plume control system in the piece of furniture. For example, the size, number, and locations of the return air grills and exhaust grills in the piece of furniture, the size of the fan, the number of the fans, etc.

Figure 50:
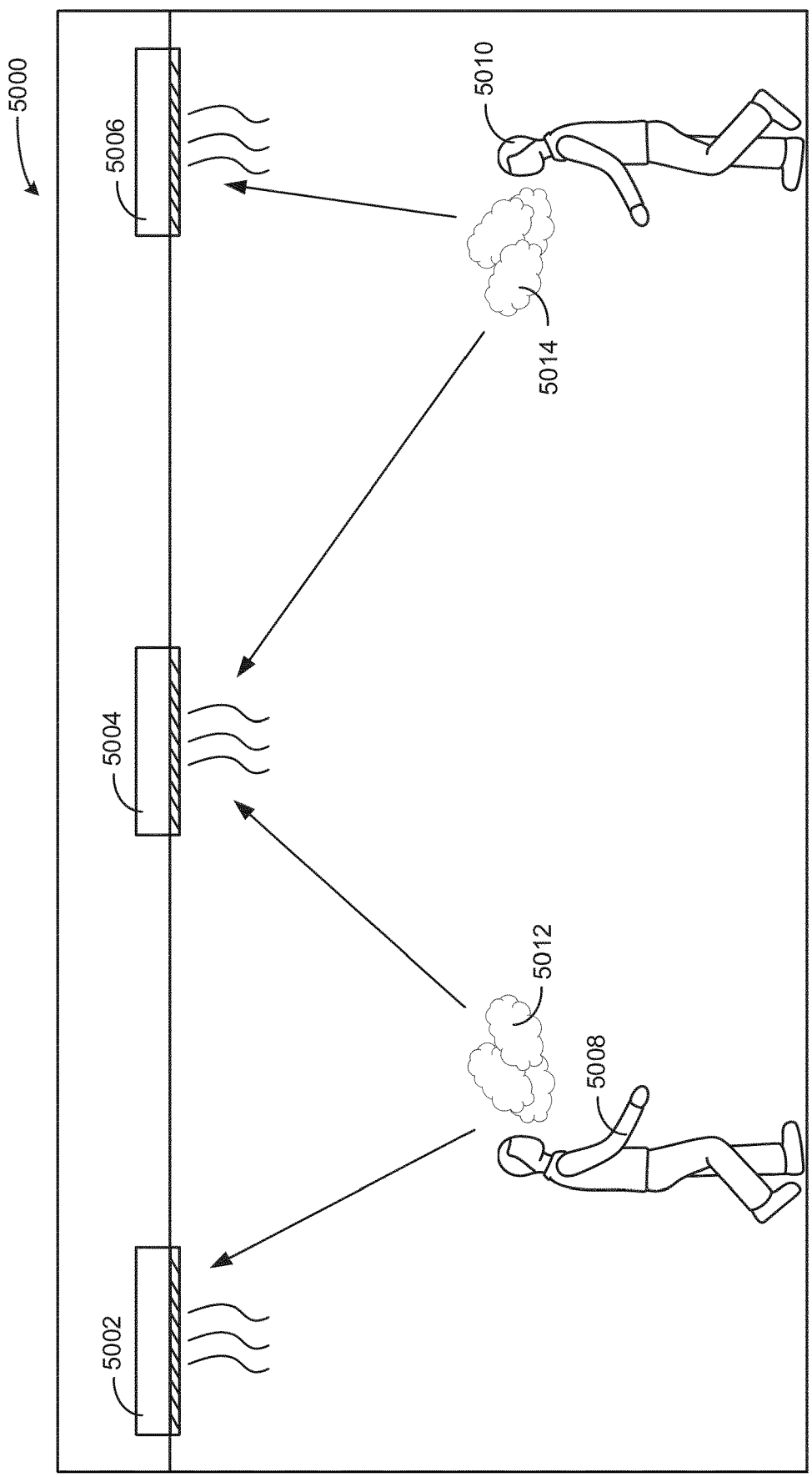
FIG. 50 is a schematic diagram of in-zone plume control systems installed in a ceiling of a building, according to an exemplary embodiment.

Referring now to FIG. 50, a schematic diagram of in-zone plume control systems installed in a ceiling of a building space 5000 is shown, according to an exemplary embodiment. The building space 5000 includes in-zone plume control systems 5002-5006 mounted in the ceiling of the building space 5000. The systems 5002-5006 can be vents of a single in-zone plume control system and/or can be connected via a single duct. The systems 5002-5006 can include their own fans and/or filtration systems. The systems 5002-5006 can be the same as or similar to the in-zone plume control system 4200 of FIG. 42. The systems 5002-5006 can operate to draw in plumes 5012 and 5014 of occupants 5008 and 5010 (e.g., exhaled air of the occupants 5008 and/or 5010).

In some embodiments, the systems 5002-5006 (or similar systems) can be spaced in the ceiling based on where occupants of the building space 5000 usually congregate. The closer the systems 502-5006 are located to occupants, the higher the performance of the systems 5002-5006 pulling in and filtering plumes exhaled by the occupants. For example, in a restaurant, shopping center, school, etc. certain spaces may have a higher average occupant concentration than other areas. For example, the infection tool 1102 can analyze an occupant heat map provided by a user or surveillance system which indicates spaces with the highest and lowest occupant dwell times. The infection tool 1102 can design a layout of in-zone plume control systems based on the heat map.

In some embodiments, the systems 5002-5006 can be run to suck air in from the systems 5002-5006 to clean the air. Furthermore, the systems 5002-5006 to push out clean air to the occupants 5006 and/or 5010. In some embodiments, the systems 5002-5006 can be run to pull air or push air based on a control system, e.g., the plume controller 4220. For example, the controller could operate to detect sounds via a microphone (e.g., detect an occupant). The controller could activate the systems 5002-5006 to begin pulling in the plumes of occupants in the space. In some embodiments, suppressing a cough or sneeze may be performed by pushing air out of the systems 5002-5006 to stop aerosol particles from being distributed through the air system of a building. Responsive to detecting a cough or sneeze via the microphone, the controller can operate the systems 5002-5006 to push air into the space 500.

Figure 51:
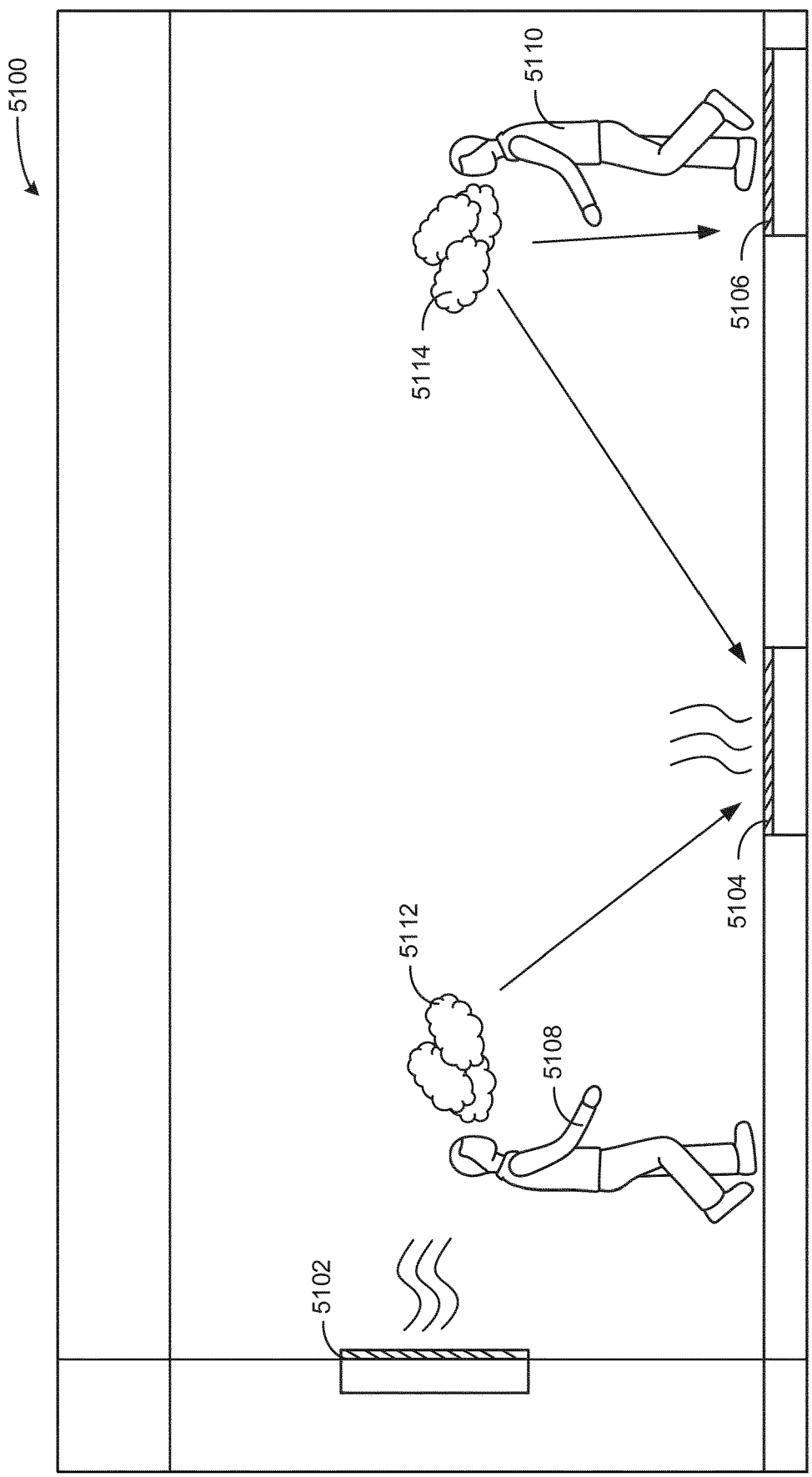
FIG. 51 is a schematic diagram of in-zone plume control systems installed in a floor and in a wall of a building, according to an exemplary embodiment.

Referring now to FIG. 51, is a schematic diagram of in-zone plume control systems 5102-5106 installed in a floor and in a wall of a building space 5100 is shown, according to an exemplary embodiment. The in-zone plume control systems 5102-5106 can be the same as or similar to the in-zone plume control system 4200. In some embodiments, the air exhaled by the occupants 5108 and/o 5110 (e.g., the plumes 5112 and/or 5114) can be pulled down towards the floor by the in-zone control systems 5104 and/or 5106. Similarly, the plume 5112 can be pulled away from the occupant 5108 by the in-zone plume control system 5102. The in-zone plume control system 5102 can, in some embodiments, be installed in walls such as cubicle office walls.

Figure 52:
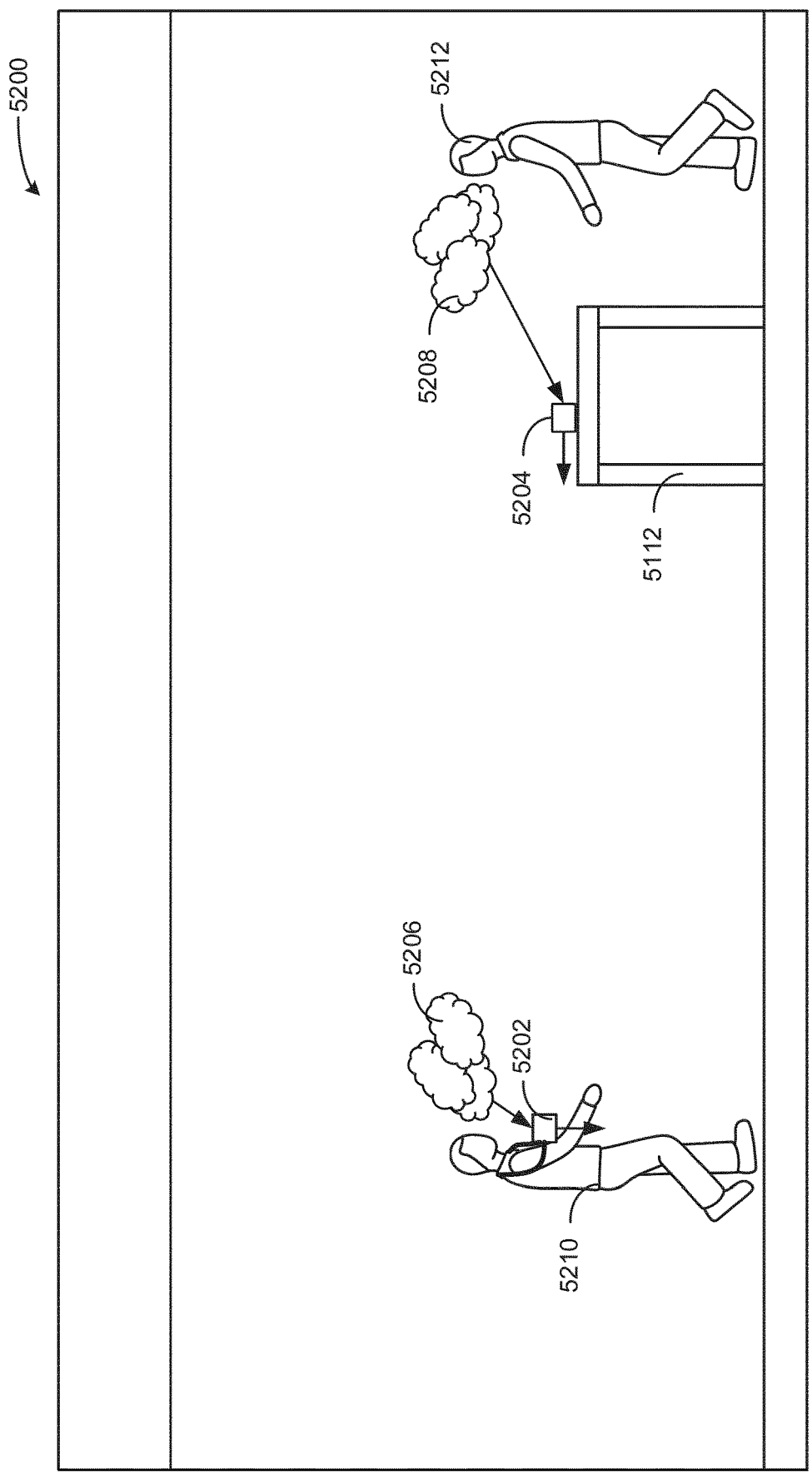
FIG. 52 is a schematic diagram of a room of a building where a mobile in-zone plume control system is carried by a user and another mobile in-zone plume control system is temporarily placed on a table, according to an exemplary embodiment.

Referring now to FIG. 52, a schematic diagram of a room 5200 of a building where a mobile in-zone plume control system 5202 is carried by a user and another mobile in-zone plume control system 5204 is temporarily placed on a table is shown, according to an exemplary embodiment. The systems 5202 and 5204 can be mobile versions of the in-zone plume control system 4200. The systems 5202 and 5204 can be battery powered devices that can be charged via a wired or wireless power outlet and then carried by a user. The systems 5202 and/or 5204 can include battery power systems that use Lithium Ion batteries, Lithium Metal Batteries, Nickel Cadmium batteries, Nickel Metal Hydride, to power control systems, user interface systems, and/or fan systems of the systems 5202 and/or 5204.

The system 5202 can be connected to a lanyard or strap based mounting system worn by the occupant 5210. The system 5202 can be worn below a chin of the occupant 5210. The system 5202 can be run to scrub the plume 5206 exhaled by the user. In this regard, the system 5202 can draw air in around the face of the occupant 5210 and discharge filtered air towards the floor. In some embodiments, the system 5202 can include a button that, when interacted with, causes the system 5202 to reverse the flow of air. The system 5202 can draw air from the flow, filter the air, and provide the filtered air to the occupant 5210 to inhale.

The system 5204 can be the same as the system 5202. The system 5204 can be moved around and carried by the occupant 5212 and then set down, e.g., on the table 5112. The user can set the system 5204 down on a desk, on a conference table, on a restaurant table, etc. In this regard, the occupant 5212 can easily have their plume 5208 filtered and discharged out of the system 5204 and/or alternatively clean filtered air provided to them to breathe. In some embodiments, the inlet and/or outlet of the system 5204 can be pointed in a variety of directions, e.g., may be moveable, e.g., the inlets and/or outlets may be nozel or hose based systems.

In some embodiments, the system 5204 can connect to a mounting system. In some embodiments, the mounting system is a charging dock for the system 5204. In some embodiments, the charging dock is a wired and/or wireless charging dock. In some embodiments, the charging dock for the system 5204 is integrated with a laptop charging dock. The mounting system can be attached to various pieces of furniture, e.g., a conference room table, a work station, etc. In some cases, the mounting system and/or the system 5204 could be placed beneath a computer monitor of a user at their desk. Whenever a user sits down at the piece of furniture, the occupant 5212 can connect their personal in-zone plume control system to the mounting system. In this regard, the system 5204 can be placed on top of furniture in some embodiments, not necessary integrated with the furniture. In some embodiments, the system 5204 can be installed in a retail point of sale (POS), connected to a shopping cart, etc. In some embodiments, the system 5204 can plug into a power outlet and include a power strip. In some embodiments, the system 5204 can replace an existing power strip.

Figure 53:
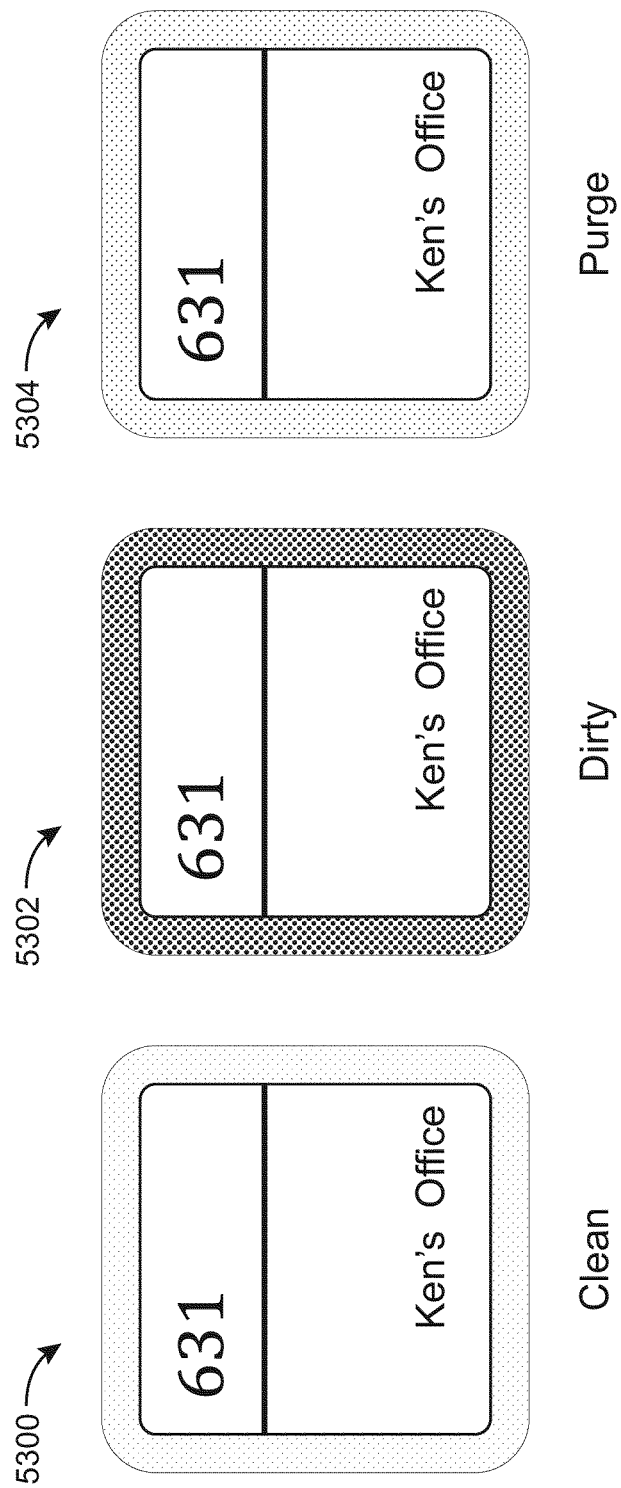
FIG. 53 is a schematic diagram of room notification systems notifying a user if the room is clean, dirty, or in a purge mode, according to an exemplary embodiment.

Referring now to FIG. 53, is a schematic diagram of room notification systems notifying a user if the room is clean, dirty, or in a purge mode is shown, according to an exemplary embodiment. The indications 5300-5304 can be examples of indications displayed by a notification system placed outside a room to notify users of a status of the room. For example, the notification system could be the halo light system described in U.S. patent application Ser. No. 16/246,366 filed Jan. 11, 2019, U.S. patent application Ser. No. 16/246,447 filed Jan. 11, 2019, and U.S. patent application Ser. No. 17/387,148 filed Jul. 28, 2021, the entirety of each of these patent applications is incorporated by reference herein. The halo light system can include a light halo surrounding a display screen. The light halo can activate various different colors, e.g., green, red, blue, etc. to represent a space being clean, dirty, or being purged.

A building control system could run in-zone plume control systems within a zone to purge the air of the zone. The notification system outside the zone could display the clean indication 5300 with a green light ring when the zone is clean and the purge has been complete, the indication 5302 (e.g., a red light indicator) when the zone is dirty (e.g., a predefined amount of time has passed since a purge or an occupant seal for the space being broken), and the purge indication 5304 (e.g., a blue light indicator) when the zone is being purged. In some embodiments, the notification system can display a green indicator after the zone is purged and display a red indicator as soon as an occupant enters the zone. The purge can include running all in-zone plume control systems at a maximum level to filter all air of the zone.

In some embodiments, when the zone is occupied, the in-zone plume control systems run at a low fan speed. Once the occupants leave the zone and the zone enters the purge mode, the in-zone plume control systems can run at a maximum level consuming high amounts of energy and potentially making noise. In some embodiments, when an infectious disease is not present in a population, the in-zone plume control system can run to provide air to the space instead of acting as a suction.

In some embodiments, the purge of the zone can be performed based on occupancy sensor measurements. For example, the purge could be performed when the zone is determined to be empty for a particular amount of time by a sensor. The purge could also be based on a schedule. In some embodiments, as a class period begins to end or a business meeting is ending, based on the scheduling, the fan speed of the in-zone plume control systems can be increased (ramped up). For example, the purge could run in between class periods of a classroom (e.g., a 5-10 minute purge), in between patient occupancy of a patients room (e.g., a 2 minute purge), etc.

In some embodiments, the building control system can run other systems in addition to the in-zone plume control system to purge the zone. For example, various purging techniques are described in U.S. patent application Ser. No. 17/013,273 filed Sep. 4, 2020, the entirety of which is incorporated by reference herein. The purging techniques can include a UV downlight purge, a full blow setting for VAV boxes in the zone, run an AHU based air change, etc.

In some embodiments, the notification system can integrate with a locking system. The locking system can lock a door of the zone during the purge period and unlock the door once the purge is completed. The locking system can lock the door such that even access badges cannot open the door. Responsive to the purge ending, the locking system can allow the doors to be unlocked by the badges.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building system of a building comprising:
    a portable in-zone plume control system structured to couple with a top side of a work surface of a piece of furniture located within a zone of the building, the portable in-zone plume control system comprising:
        one or more return air inlets comprising openings to receive one or more air plumes generated by one or more users;
        one or more exhaust outlets configured to exhaust the one or more air plumes;
        a filter; and
        a fan configured to draw the one or more air plumes in through the one or more return air inlets, through the filter, and out through the one or more exhaust outlets back into the zone, wherein the filter is configured to filter or disinfect the one or more air plumes to remove or deactivate particles from the one or more air plumes before returning the one or more air plumes to the zone; and
    a controller configured to activate or deactivate the fan based on a location of an occupant within the zone relative to a location of the portable in-zone plume control system within the zone and a location of another in-zone plume control system within the zone.

2. The building system of claim 1, wherein the filter is configured to filter the one or more air plumes to remove or deactivate infectious disease particles from the one or more air plumes.

3. The building system of claim 1, wherein the portable in-zone plume control system further comprises:
    one or more sensors configured to sense whether the one or more users are present in the building; and
    the controller configured to activate the fan in response to a detection of the one or more users being present in the building.

4. The building system of claim 1, wherein the portable in-zone plume control system is located within the zone and is separate from a central air system of the building.

5. The building system of claim 1, wherein the openings of the one or more return air inlets receive a first air plume of a first user;

wherein the one or more exhaust outlets are configured to exhaust the first air plume of the first user in a direction away from a second user.

6. The building system of claim 1, wherein the portable in-zone plume control system is structured to be carried by a user;
    wherein the portable in-zone plume control system includes a battery power system configured to power the fan.

7. The building system of claim 1, wherein the portable in-zone plume control system is structured to be installed in the piece of furniture of the building.

8. The building system of claim 7, wherein the piece of furniture is one of a conference room table, a workspace desk, a classroom desk, or a lecture hall desk.

9. The building system of claim 7, wherein the piece of furniture comprises:
    an upper surface and one or more legs suspending the upper surface from a floor of the building.

10. The building system of claim 1, the portable in-zone plume control system comprising:
    a housing structured to couple with the top side of the work surface of the piece of furniture, wherein the filter and the fan are included within the housing, wherein the one or more return air inlets are positioned on a first side of the housing facing a user of the one or more users, wherein the one or more exhaust outlets are positioned on a second side of the housing exhausting air away from the user.

11. An in-zone plume control system located within a zone of a building, the in-zone plume control system comprising:
    one or more return air inlets comprising openings to receive one or more air plumes generated by one or more users;
    one or more exhaust outlets configured to exhaust the one or more air plumes;
    a filter;
    a fan configured to draw the one or more air plumes in through the one or more return air inlets, through the filter, and out through the one or more exhaust outlets back into the zone, wherein the filter is configured to filter or disinfect the one or more air plumes to remove or deactivate particles from the one or more air plumes before returning the one or more air plumes to the zone;
    a controller configured to activate or deactivate the fan based on a location of an occupant within the zone relative to a location of the in-zone plume control system within the zone and a location of another in-zone plume control system within the zone; and
    a housing structured to couple with a top side of a work surface of a piece of furniture, wherein the filter and the fan are disposed within the housing, wherein the one or more return air inlets are positioned on a first side of the housing facing a user of the one or more users, wherein the one or more exhaust outlets are positioned on a second side of the housing exhausting air away from the user.

12. The in-zone plume control system of claim 11, wherein the filter is configured to filter the one or more air plumes to remove or deactivate infectious disease particles from the one or more air plumes.

13. The in-zone plume control system of claim 11, wherein the in-zone plume control system further comprises:
    one or more sensors configured to sense whether the one or more users are present in the building; and the controller configured to activate the fan in response to a detection of the one or more users being present in the building.

14. The in-zone plume control system of claim 11, wherein the in-zone plume control system is located within the zone and is separate from a central air system of the building.

15. The in-zone plume control system of claim 11, wherein the openings of the one or more return air inlets receive a first air plume of a first user;
wherein the one or more exhaust outlets are configured to exhaust the first air plume of the first user in a direction away from a second user.

16. The in-zone plume control system of claim 11, wherein the in-zone plume control system is a mobile in-zone plume control system structured to be carried by the user;
wherein the in-zone plume control system includes a battery power system configured to power the fan.

17. A building system of a building space comprising:
a plurality of in-zone air filtration systems located within the building space configured to draw in air of the building space and exhaust the air back into the building space, wherein at least one in-zone air filtration system of the plurality of in-zone air filtration systems is a portable in-zone plume control system structured to couple with a top side of a work surface of a piece of furniture;
a building controller system comprising one or more controllers, the building controller system configured to:
receive locations of one or more occupants in the building space;
determine one or more in-zone air filtration systems of the plurality of in-zone air filtration systems to activate or deactivate respective fans based on the locations of the one or more occupants within the building space relative to a location of one in-zone plume control system of the plurality of in-zone air filtration systems within the building space and a location of another in-zone air filtration system of the plurality of in-zone air filtration system.

18. The building system of claim 17, wherein the plurality of in-zone air filtration systems are configured to exhaust the air back into the building space in a direction away from the one or more occupants of the building space.

19. The building system of claim 17, wherein the building controller system is configured to activate the one or more in-zone air filtration systems to draw exhaled air away from a first occupant of the one or more occupants in a direction that avoids moving the exhaled air across a second occupant of the one or more occupants.

20. The building system of claim 17, wherein the piece of furniture comprises:
an upper surface and one or more legs suspending the upper surface from a floor of the building space.

* * * * *